(12) United States Patent
Robertson et al.

(10) Patent No.: US 11,077,939 B1
(45) Date of Patent: *Aug. 3, 2021

(54) LOW OBSERVABLE AIRCRAFT HAVING TANDEM LATERAL LIFT FANS

(71) Applicant: Textron Innovations Inc., Providence, RI (US)

(72) Inventors: Daniel Bryan Robertson, Southlake, TX (US); Kirk Landon Groninga, Keller, TX (US); Steven Ray Ivans, Ponder, TX (US); Matthew Edward Louis, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/833,619

(22) Filed: Mar. 29, 2020

Related U.S. Application Data

(60) Provisional application No. 63/001,286, filed on Mar. 28, 2020.

(51) Int. Cl.
*B64C 29/00* (2006.01)
*B64C 27/22* (2006.01)
(Continued)

(52) U.S. Cl.
CPC ............ *B64C 29/0025* (2013.01); *B64C 3/10* (2013.01); *B64C 19/00* (2013.01); *B64C 27/26* (2013.01);
(Continued)

(58) Field of Classification Search
CPC . B64C 29/0016; B64C 29/0025; B64C 27/20; B64C 27/22; B64C 29/0083
See application file for complete search history.

(56) References Cited

U.S. PATENT DOCUMENTS

| | | | | |
|---|---|---|---|---|
| 3,122,343 | A | * | 2/1964 | Leibach ............. B64C 29/0025 244/23 B |
| 5,312,069 | A | * | 5/1994 | Bollinger ............... F02K 3/068 244/12.3 |

(Continued)

OTHER PUBLICATIONS

Jones, Gregory S.; Pneumatic Flap Performance for a 2D Circulation Control Airfoil, Steady and Pulsed; NASA Langley Research Center; Hampton, VA; Jun. 1, 2005.

(Continued)

*Primary Examiner* — Brian M O'Hara
(74) *Attorney, Agent, or Firm* — Lawrence Youst PLLC

(57) ABSTRACT

An aircraft operable to transition between thrust-borne lift in a VTOL orientation and wing-borne lift in a forward flight orientation. The aircraft has a blended wing body and includes an engine, a binary lift fan system, a forced air bypass system and an exhaust system. The engine has a turboshaft mode and a turbofan mode. The lift fan system includes a plurality of ducted fans in a tandem lateral orientation. In the VTOL orientation of the aircraft, the engine is in the turboshaft mode coupled to the lift fan system such that the engine provides rotational energy to the ducted fans generating the thrust-borne lift. In the forward flight orientation of the aircraft, the engine is in the turbofan mode coupled to the forced air bypass system such that the bypass air combines with the engine exhaust in the exhaust system to provide forward thrust generating the wing-borne lift.

19 Claims, 39 Drawing Sheets

(51) Int. Cl.
  *B64D 33/04* (2006.01)
  *B64C 19/00* (2006.01)
  *B64C 3/10* (2006.01)
  *B64C 27/30* (2006.01)
  *B64C 27/26* (2006.01)
  *B64C 15/14* (2006.01)
  *B64C 21/00* (2006.01)

(52) U.S. Cl.
  CPC .............. *B64C 27/30* (2013.01); *B64D 33/04* (2013.01); *B64C 15/14* (2013.01); *B64C 21/00* (2013.01); *B64C 2230/04* (2013.01); *B64C 2230/06* (2013.01); *B64C 2230/16* (2013.01)

(56) References Cited

U.S. PATENT DOCUMENTS

| | | | |
|---|---|---|---|
| 5,320,305 A * | 6/1994 | Oatway | B64C 29/0025 244/12.3 |
| 6,270,038 B1 | 8/2001 | Cycon et al. | |
| 7,731,121 B2 | 6/2010 | Smith et al. | |
| 8,469,308 B2 | 6/2013 | Robertson et al. | |
| 8,636,244 B2 | 1/2014 | Groninga | |
| 8,636,246 B2 | 1/2014 | Robertson et al. | |
| 9,334,060 B2 | 5/2016 | Robertson et al. | |
| 10,384,776 B2 | 8/2019 | Choi et al. | |
| 2014/0060004 A1 | 3/2014 | Mast et al. | |
| 2018/0057157 A1 | 3/2018 | Groninga et al. | |
| 2018/0208305 A1 | 7/2018 | Lloyd et al. | |
| 2018/0273167 A1 | 9/2018 | Carr et al. | |

OTHER PUBLICATIONS

Kondor et al.; Experimental Investigation of a Morphing Nacelle Ducted Fan; NASA Langley Research Center; Hampton, VA; Jun. 1, 2005.

Warsop et al.; Fluidic Flow Control Effectors for Flight Control; American Institute of Aeronautics and Astronautics, Inc.; Aug. 13, 2018.

* cited by examiner

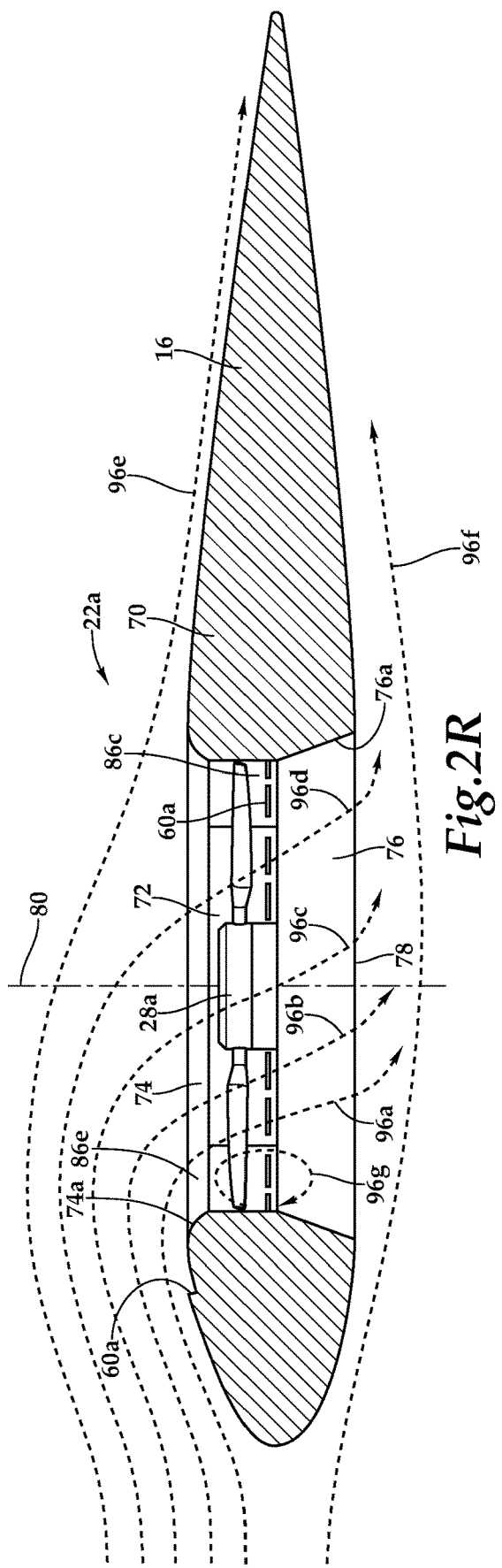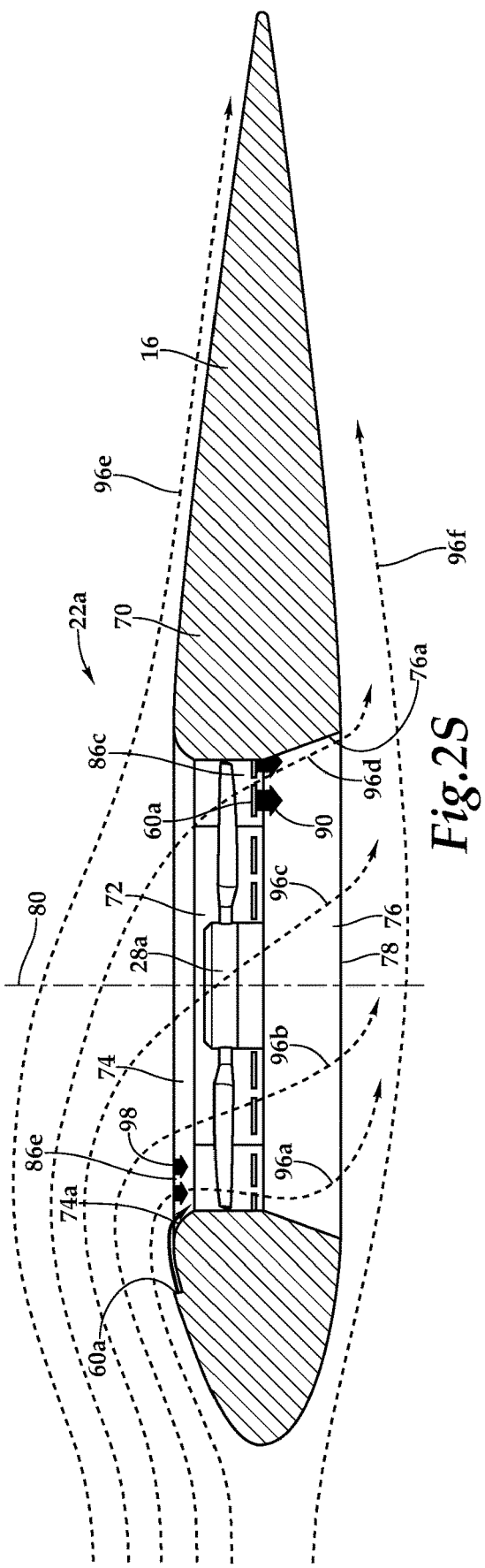

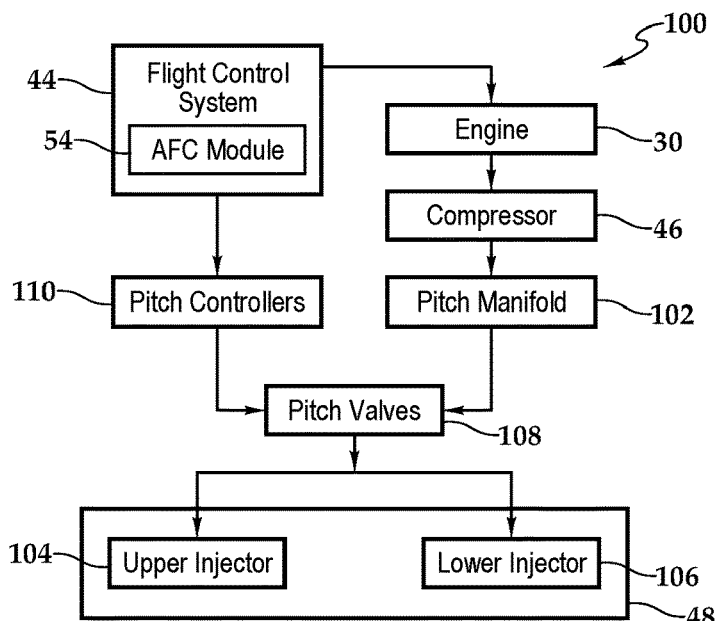
*Fig.3A*
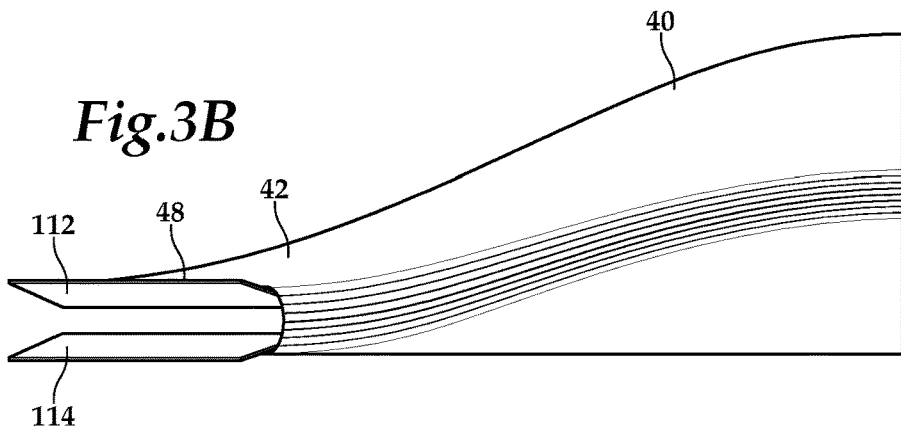
*Fig.3B*
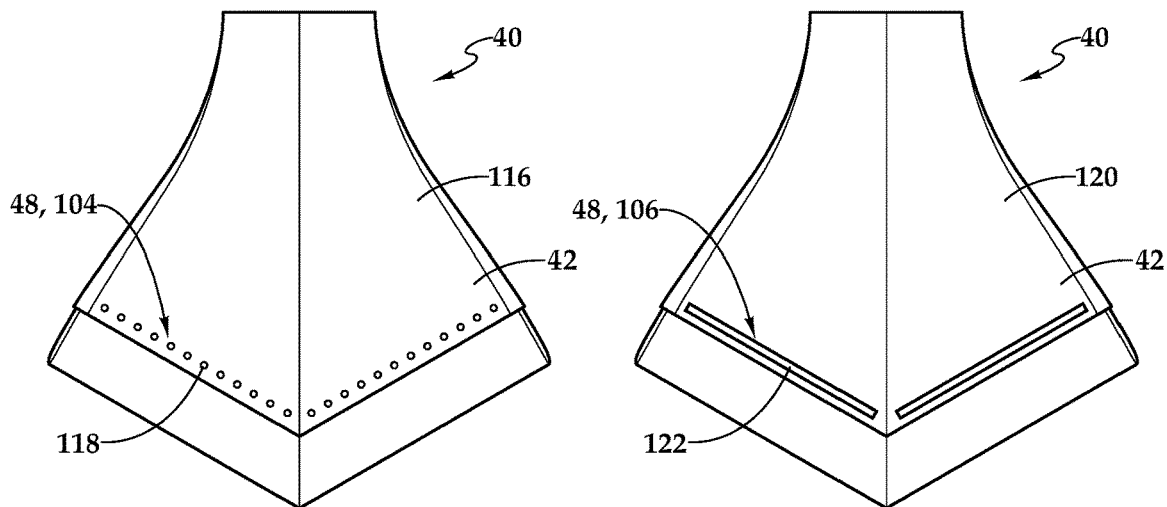
*Fig.3C*  *Fig.3D*

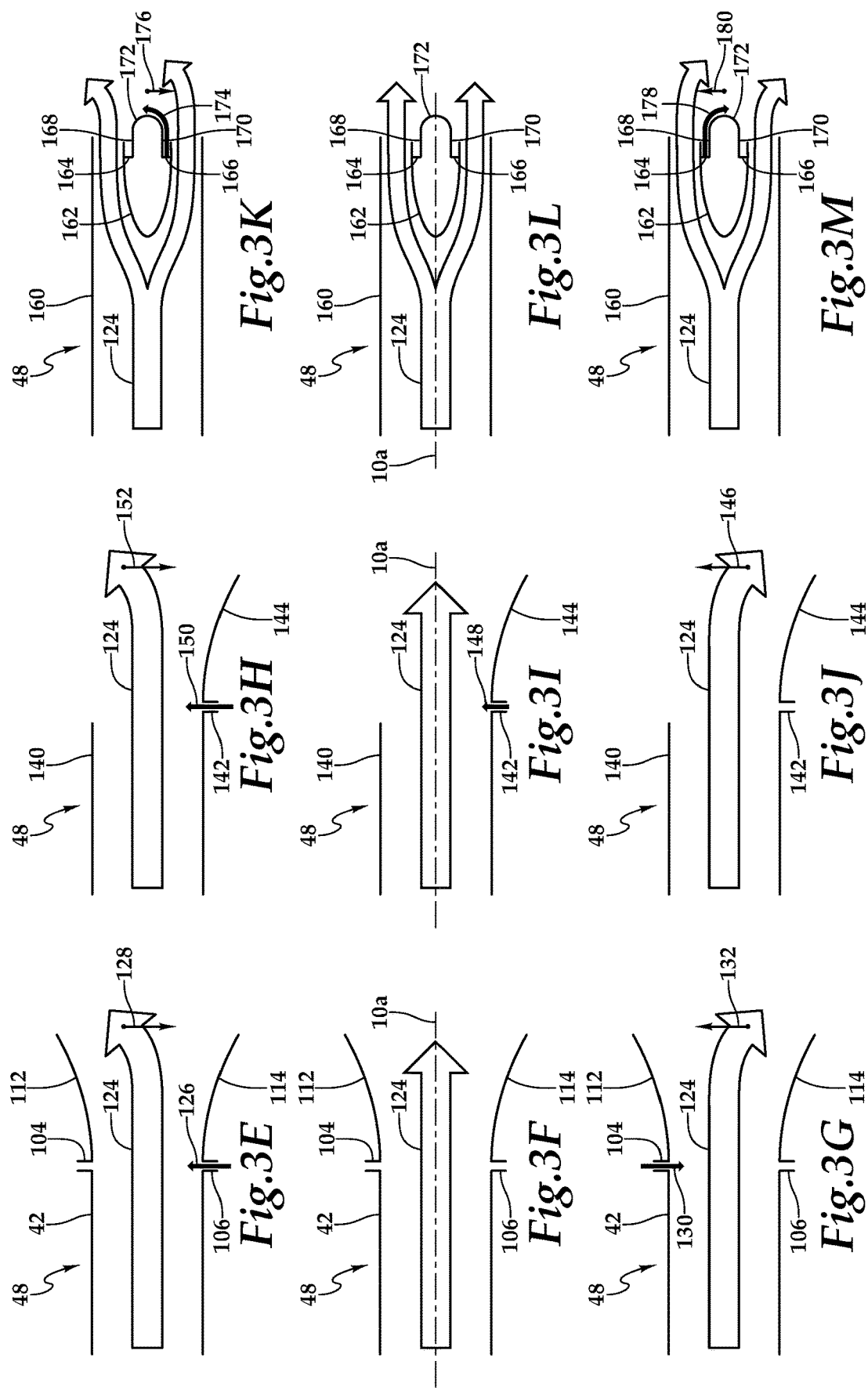

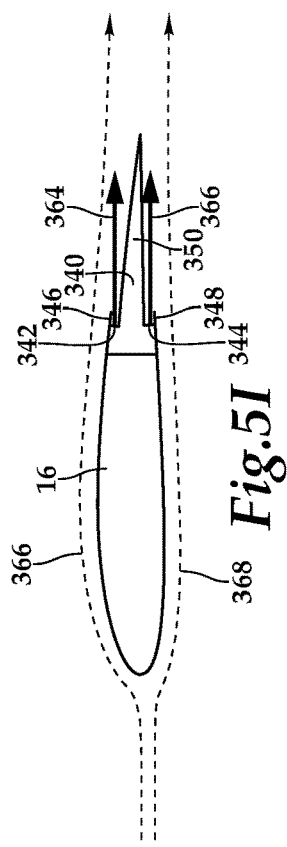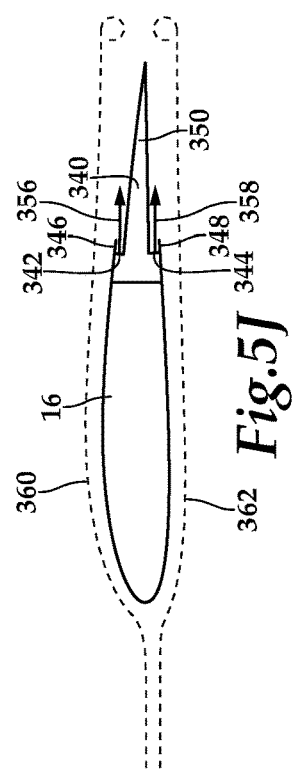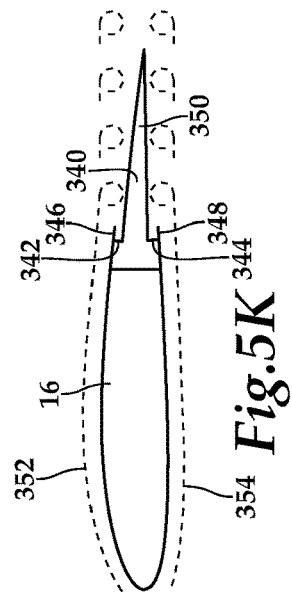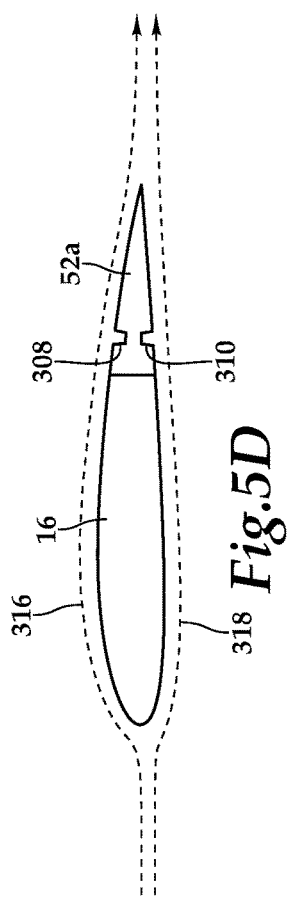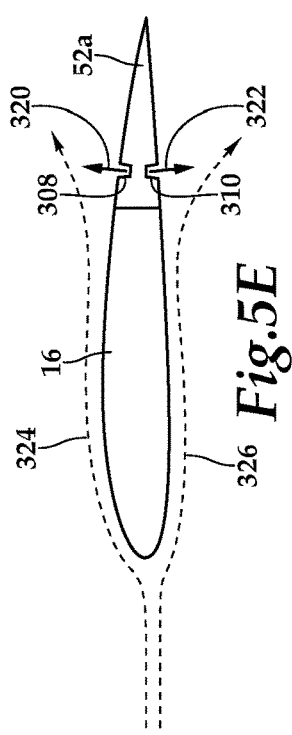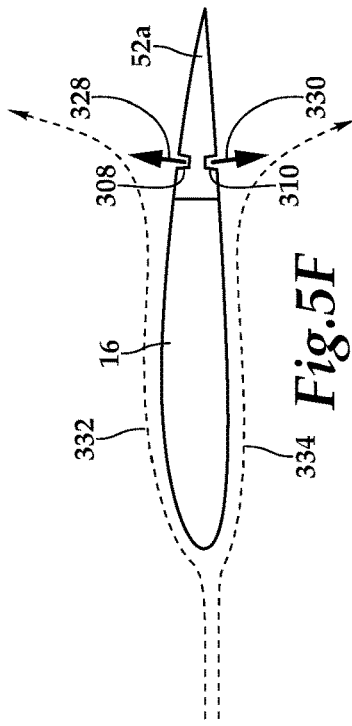

LOW OBSERVABLE AIRCRAFT HAVING TANDEM LATERAL LIFT FANS

CROSS-REFERENCE TO RELATED APPLICATIONS

The present application claims the benefit of U.S. Provisional Application No. 63/001,286, filed Mar. 28, 2020, the entire contents of which are hereby incorporated by reference.

TECHNICAL FIELD OF THE DISCLOSURE

The present disclosure relates, in general, to blended wing body aircraft having low observable characteristics and, in particular, to VTOL aircraft having a lift fan system generating thrust-borne lift, a forced air bypass system generating wing-borne lift and an active flow control system generating control moments in both thrust-borne lift and wing-borne lift flight regimes.

BACKGROUND

Unmanned aerial vehicles or UAVs are self-powered aircraft that do not carry a human operator, use aerodynamic forces to provide vehicle lift, are autonomously and/or remotely operated, may be expendable or recoverable and may carry lethal or nonlethal payloads. UAVs are commonly used in military applications such as intelligence, surveillance, reconnaissance and attack missions. Certain UAVs have the capability of being networked together enabling cooperation with one another including, for example, exhibiting swarm behavior such as the ability to dynamically adapt to changing conditions, group coordination, distributed control, distributed tactical group planning, distributed tactical group goals, distributed strategic group goals and/or fully autonomous swarming. It has been found, however, that such highly capable UAVs typically require runways for takeoff and landing or require specialized systems for launch and recovery.

Vertical takeoff and landing or VTOL aircraft are capable of taking off and landing vertically without the requirement of a runway. Rotorcraft such as helicopters, tiltrotors, tiltwings, quadcopters and other multicopters are examples of VTOL aircraft. Each of these rotorcraft utilizes one or more open rotor disks to provide lift and thrust to the aircraft. Such open rotor disks not only enable vertical takeoff and landing, but may also enable hover, forward flight, backward flight and lateral flight. These attributes make VTOL aircraft highly versatile for use in congested, isolated or remote areas. It has been found, however, that the use of open rotor disks is a detriment to the radar cross-section of typical VTOL aircraft.

Low observable aircraft use a variety of technologies to reduce reflection and emission of radar, infrared, visible light, radio frequency spectrum and/or audio to avoid detection. While no aircraft is totally invisible to radar, low observable aircraft are more difficult to detect and track, thereby increasing the odds of successfully avoiding detection by enemy radar and/or targeting by radar guided weapons. Such low observable aircraft consequently provide the operator with an enhanced ability to penetrate integrated air defense systems. What is needed is a highly capable UAV that does not require a runway for takeoff and landing or specialized systems for launch and recovery, that is capable of vertical takeoff, hover, forward flight, backward flight, lateral flight and vertical landing and that has low observable attributes.

SUMMARY

In an aspect, the present disclosure is directed to an aircraft operable to transition between thrust-borne lift in a VTOL orientation and wing-borne lift in a forward flight orientation. The aircraft includes a blended wing body with an engine disposed therein. The engine has a turboshaft mode and a turbofan mode and is configured to generate engine exhaust. A binary lift fan system is disposed within the body, the binary lift fan system includes ducted fans in a tandem lateral orientation. A forced air bypass system is disposed within the body and is configured to generate bypass air. An exhaust system is coupled to the engine and the forced air bypass system. In the VTOL orientation of the aircraft, the engine is in the turboshaft mode coupled to the lift fan system such that the engine provides rotational energy to the ducted fans generating the thrust-borne lift. In the forward flight orientation of the aircraft, the engine is in the turbofan mode coupled to the forced air bypass system such that the bypass air combines with the engine exhaust in the exhaust system to provide forward thrust generating the wing-borne lift.

In certain embodiments, the blended wing body may include a fuselage and a wing. In some embodiments, the blended wing body may be a rhombus shaped body. In other embodiments, the blended wing body may be a rhombus shaped body with winglets. In certain embodiments, each of the ducted fans may include a rotor assembly having a plurality of variable pitch rotor blades. In some embodiments, the tandem lateral orientation of the ducted fans may be configured to generate roll control moments in the VTOL orientation. In certain embodiments, the forced air bypass system may include an inlet, a bypass fan disposed within the body downstream of the inlet and a bypass duct disposed within the body downstream of the bypass fan, wherein the bypass duct is coupled to the exhaust system. In other embodiments, the forced air bypass system may include first and second inlets; first and second bypass fans disposed within the body downstream of the first and second inlets, respectively; and first and second bypass ducts disposed within the body downstream of the first and second bypass fans, respectively, wherein the first and second bypass ducts are coupled to the exhaust system. In some embodiments, the exhaust system may include a mixing nozzle. In other embodiments, the exhaust system may include a film cooled nozzle.

In certain embodiments, a transmission may be disposed between the engine and the lift fan system such that the transmission engages the engine with the lift fan system when the engine is in the turboshaft mode and disengages the engine from the lift fan system when the engine is in the turbofan mode. In some embodiments, a transmission may be disposed between the engine and the forced air bypass system such that the transmission engages the engine with the forced air bypass system when the engine is in the turbofan mode and disengages the engine from the forced air bypass system when the engine is in the turboshaft mode.

In certain embodiments, in the forward flight orientation, the forced air bypass system may be configured to generate a bypass ratio of between 8 to 1 and 12 to 1. In some embodiments, an active flow control system may be configured to generate control moments in the VTOL orientation and the forward flight orientation. In such embodiments, at least a portion of the active flow control system may be integral with the binary lift fan system. Also, in such embodiments, at least a portion of the active flow control system may be integral with the exhaust system. In certain embodiments, the active flow control system may include a pitch effector configured to generate pitch control moments in the VTOL orientation and the forward flight orientation. In some embodiments, the active flow control system may include roll effectors configured to generate roll control moments in the forward flight orientation. In certain embodiments, the active flow control system may include yaw effectors configured to generate yaw control moments in the VTOL orientation and the forward flight orientation.

In another aspect, the present disclosure is directed to an aircraft operable to transition between thrust-borne lift in a VTOL orientation and wing-borne lift in a forward flight orientation. The aircraft includes a blended wing body with an engine disposed therein. The engine has a turboshaft mode and a turbofan mode and is configured to generate engine exhaust. A binary lift fan system is disposed within the body. The binary lift fan system includes ducted fans in a tandem lateral orientation configured to generate roll control moments in the VTOL orientation. A forced air bypass system is disposed within the body and is configured to generate bypass air. An exhaust system is coupled to the engine and the forced air bypass system. An active flow control system is configured to generate pitch and yaw control moments in the VTOL orientation and pitch, roll and yaw control moments in the forward flight orientation. In the VTOL orientation of the aircraft, the engine is in the turboshaft mode coupled to the lift fan system such that the engine provides rotational energy to the ducted fans generating the thrust-borne lift. In the forward flight orientation of the aircraft, the engine is in the turbofan mode coupled to the forced air bypass system such that the bypass air combines with the engine exhaust in the exhaust system to provide forward thrust generating the wing-borne lift.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3M are schematic illustrations of a pitch effector system and component parts thereof for a fan-in-wing blended wing body aircraft in accordance with embodiments of the present disclosure;

FIGS. 5A-5K are schematic illustrations of a yaw effector system and component parts thereof for a fan-in-wing blended wing body aircraft in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
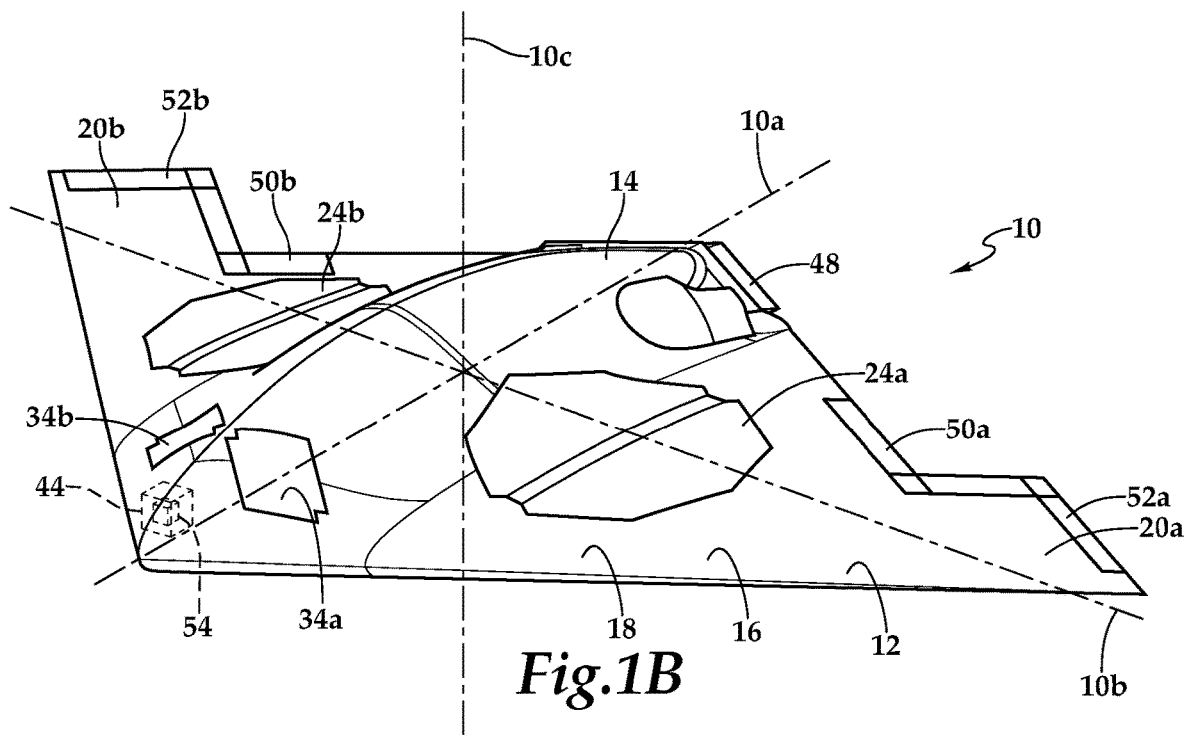
FIGS. 1A-1H are schematic illustrations of a fan-in-wing blended wing body aircraft and component parts thereof in accordance with embodiments of the present disclosure.
Figure 1A:
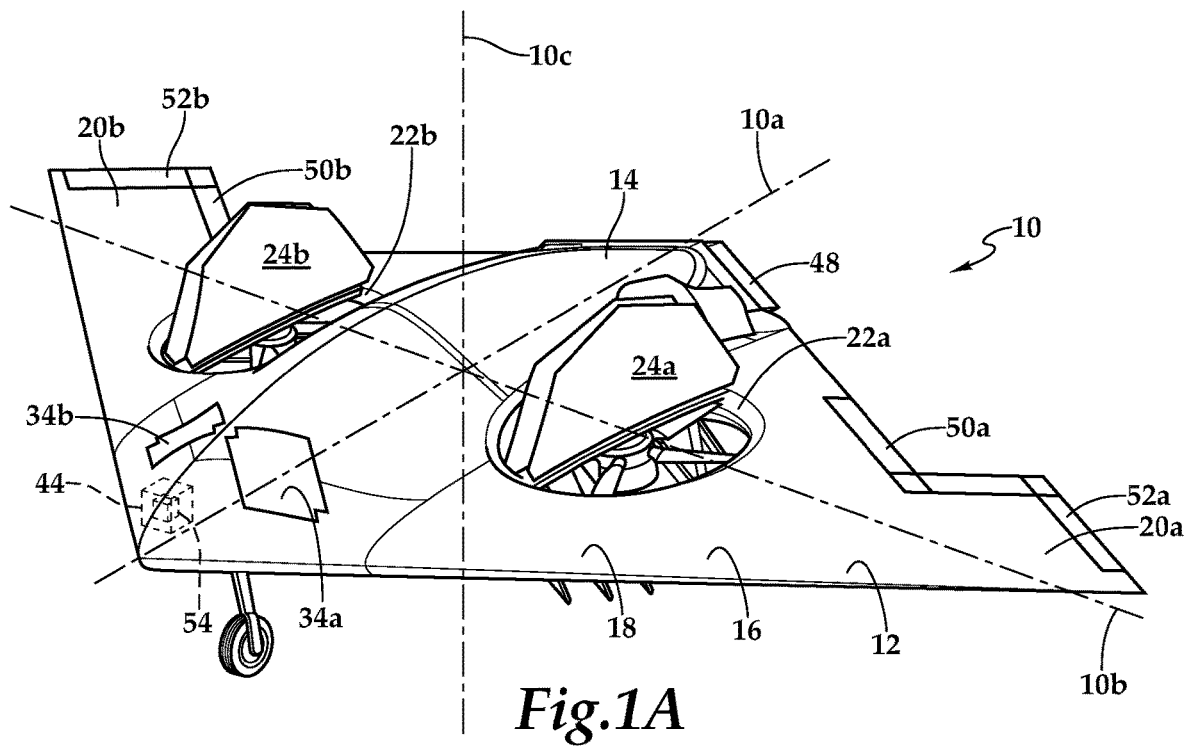
Figure 1D:
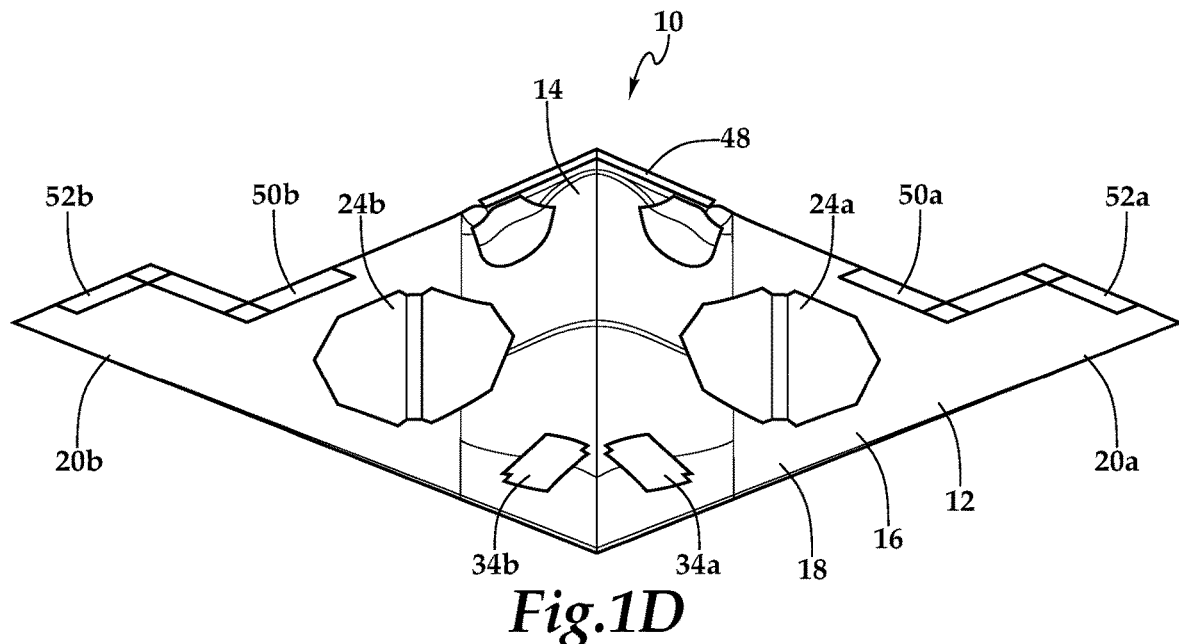
Figure 1C:
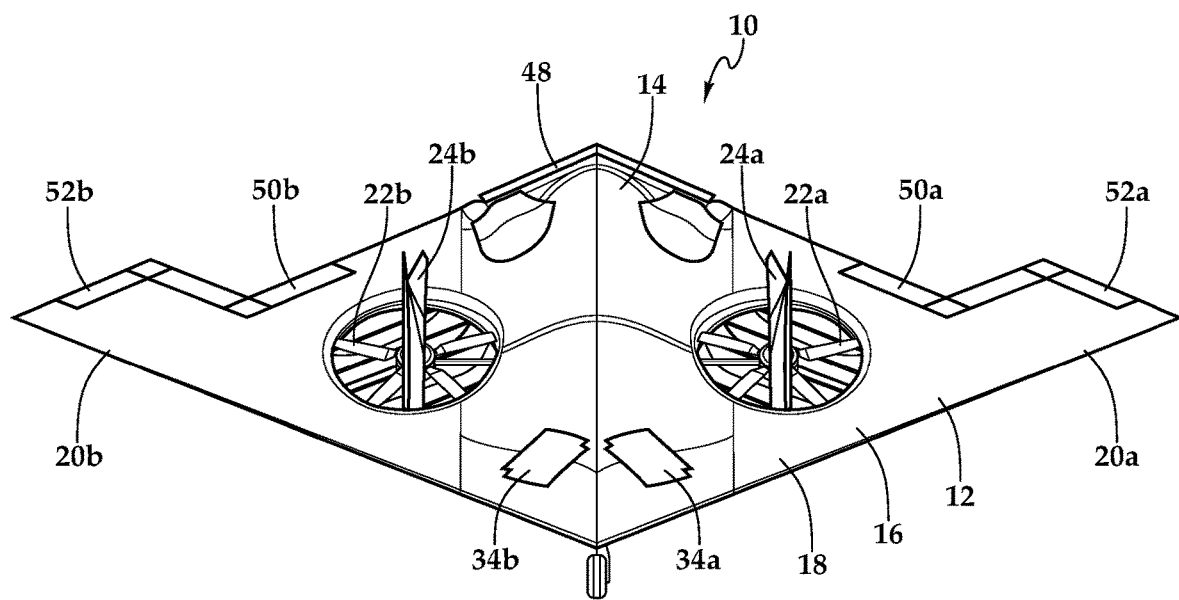
Figure 1F:
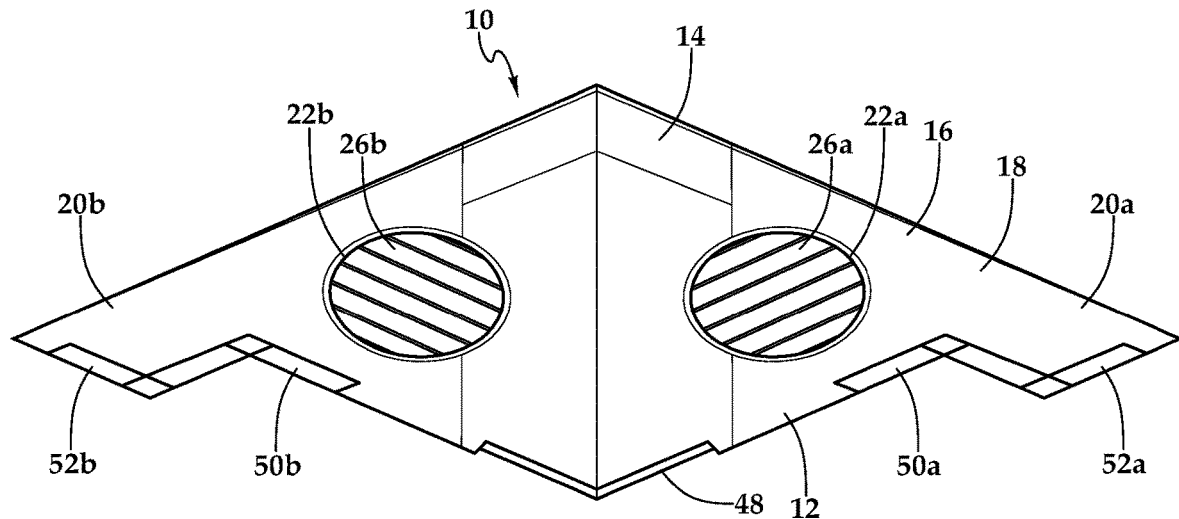
Figure 1E:
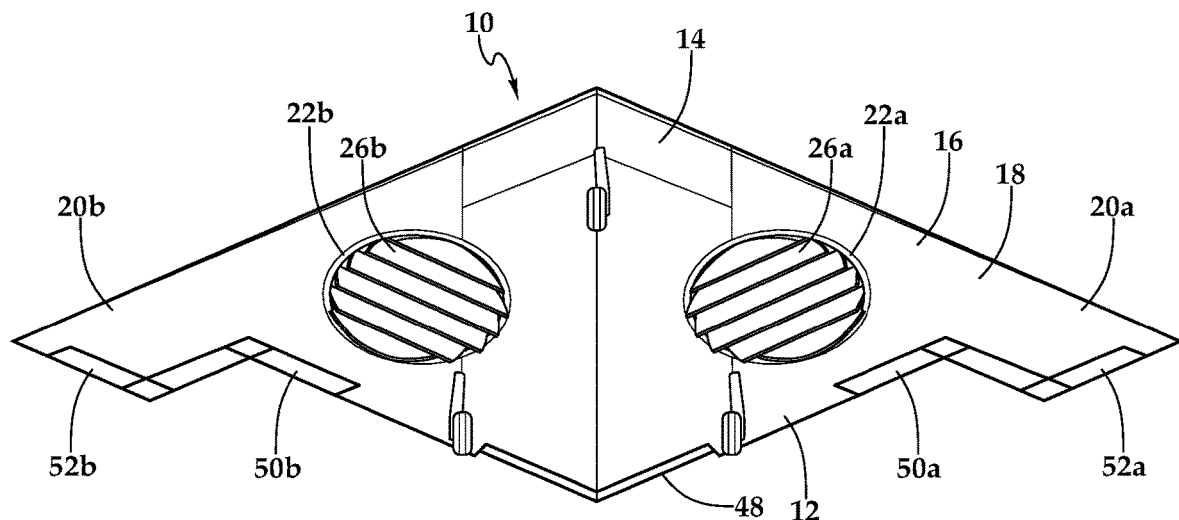

Referring to FIGS. 1A-1F in the drawings, various views of a fan-in-wing blended wing body aircraft 10 operable to transition between thrust-borne lift in a VTOL orientation and wing-borne lift in a forward flight orientation are depicted. FIGS. 1A, 1C and 1E depict aircraft 10 in the VTOL orientation wherein a lift fan system provides thrust-borne lift to the aircraft. FIGS. 1B, 1D and 1F depict aircraft 10 in the forward flight orientation wherein a forced air bypass system provides bypass air that combines with engine exhaust to generate forward thrust with the forward airspeed of aircraft 10 providing wing-borne lift enabling aircraft 10 to have a high speed, high endurance, low observable forward flight mode. Aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1A-1B. When longitudinal axis 10a and lateral axis 10b are both in a horizontal plane, normal to the local vertical in the earth's reference frame, aircraft 10 has a level flight attitude.

In the illustrated embodiment, aircraft 10 has an airframe 12 including a fuselage 14 and a fixed wing 16 in the form of a blended wing body 18 having an airfoil cross-section that generates lift responsive to the forward airspeed of aircraft 10. The outer skin of blended wing body 18 may preferably be formed from high strength and lightweight materials such as carbon, metal, fiberglass, plastic or other suitable material or combination of materials. In the illustrated embodiment, blended wing body 18 has a rhombus shaped body with winglets 20a, 20b. As best seen in FIGS. 1A, 1C and 1E, aircraft 10 has a binary lift fan system including lift fans 22a, 22b that are in a tandem lateral orientation symmetrically disposed about longitudinal axis 10a and symmetrically disposed relative to the center of gravity of aircraft 10. In the illustrated embodiment, lift fans 22a, 22b are depicted as ducted fans in a fan-in-wing configuration.

During VTOL or hover operations when the lift fan system is providing thrust-borne lift for aircraft 10, butterfly doors 24a, 24b on the upper surface of blended wing body 18 and louvers 26a, 26b on the lower surface of blended wing body 18 are open to enable lift fans 22a, 22b to generate airflow therethrough, thereby producing a vertical thrust. In other embodiments, louvers could be on the upper surface and butterfly doors could be on the lower surface, louvers could be on the upper and lower surfaces or butterfly doors could be on the upper and lower surfaces. In the illustrated embodiment, louvers 26a, 26b are hinged parallel with the trailing edges of wing 16 such that differential positioning of louvers 26a, 26b may be used to generate yaw control moments for aircraft 10 in VTOL flight mode and in transition flight modes, which are the flight modes during transitions between VTOL flight mode and forward flight mode. In other embodiments, louvers 26a, 26b could have other orientations such as parallel with longitudinal axis 10a or lateral axis 10b. In still other embodiments, the orientation of louvers 26a, 26b may be adjustable. Louvers 26a, 26b may be electro-mechanically or hydraulically operated between the open position of FIG. 1E and the closed position of FIG. 1F, wherein louvers 26a, 26b form a portion of the lower airfoil surface of aircraft 10. Likewise, butterfly doors 24a, 24b may be electro-mechanically or hydraulically operated between the open position of FIG. 1A and the closed position of FIG. 1B, wherein butterfly doors 24a, 24b form a portion of the upper airfoil surface of aircraft 10.

Figure 1G:
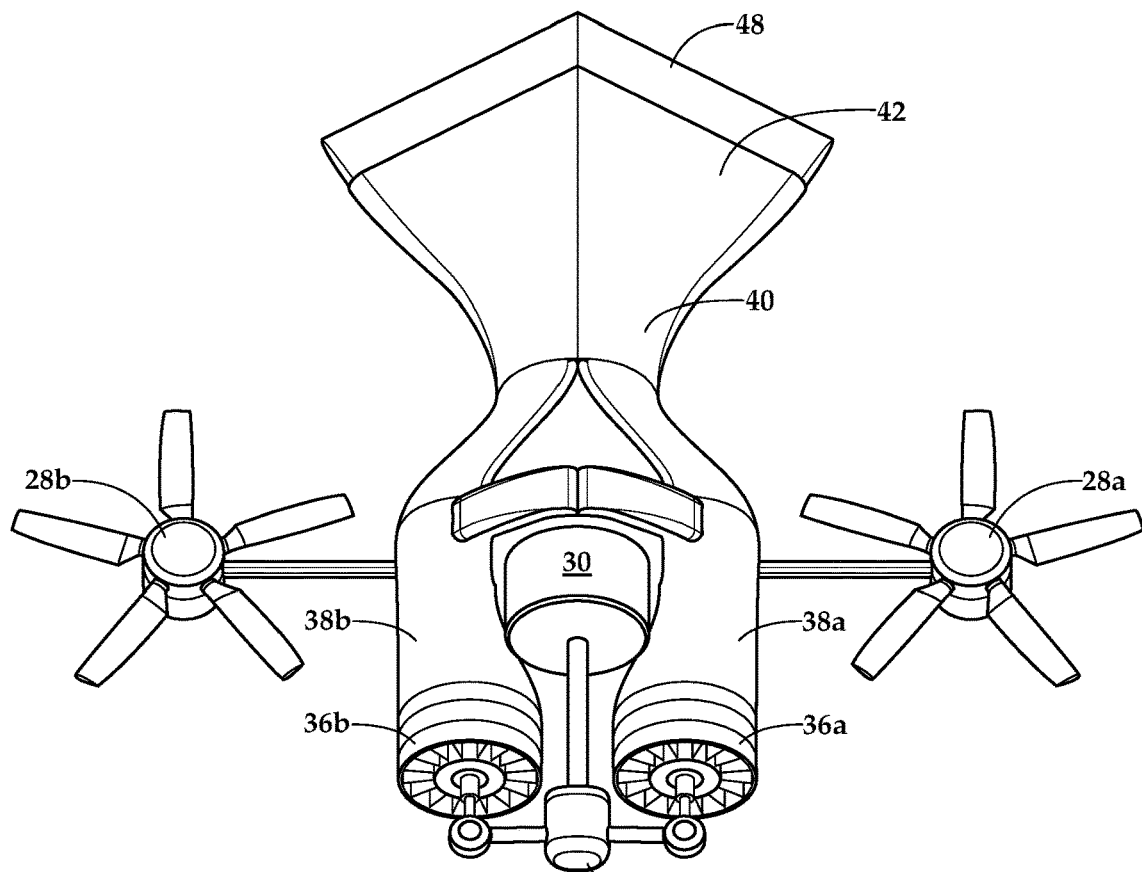
Figure 1H:
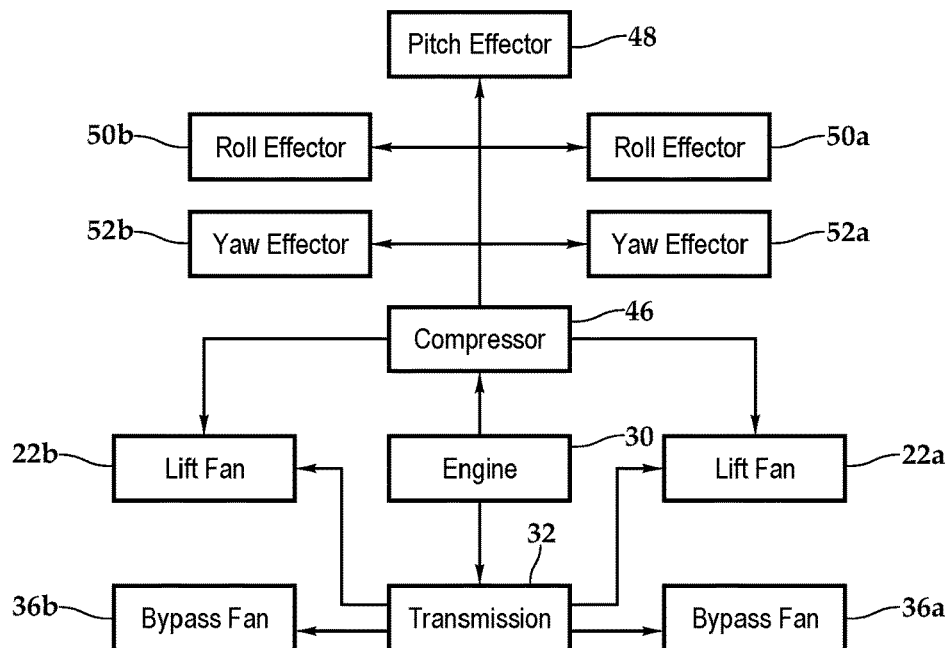

Referring additionally to FIGS. 1G-1H, lift fans 22a, 22b include rotor assemblies 28a, 28b, respectively, each having a plurality of variable pitch rotor blades such that collective control of the rotor blades generates a variable thrust output at a constant rotor speed. In other embodiments, the rotor assemblies could be fixed pitch, variable speed rotor assemblies. Rotor assemblies 28a, 28b are coupled to a turboshaft engine 30 by suitable driveshafts and a transmission 32. In other embodiments, rotor assemblies 28a, 28b could be driven by electric motors. In the illustrated embodiment, engine 30 and transmission 32 are disposed within blended wing body 18. Transmission 32 preferably includes a clutching mechanism such that torque and rotational energy may be selectively provided from engine 30 to rotor assemblies 28a, 28b. More particularly, when aircraft 10 is operating in the VTOL mode, engine 30 is coupled to rotor assemblies 28a, 28b by transmission 32 such that lift fans 22a, 22b generate thrust-borne lift for aircraft 10. When engine 30 is coupled to rotor assemblies 28a, 28b, this will be referred to herein as the turboshaft configuration or turboshaft mode of engine 30. In addition, when aircraft 10 is operating in the forward flight mode, engine 30 is decoupled to rotor assemblies 28a, 28b by the clutching mechanism of transmission 32 or other suitable clutching mechanism such that rotor assemblies 28a, 28b do not rotate and are housed, respectively, between closed butterfly doors 24a, 24b and closed louvers 26a, 26b. In the transition modes of aircraft 10, engine 30 is preferably coupled to rotor assemblies 28a, 28b by transmission 32 such that lift fans 22a, 22b generate at least a portion of the lift for aircraft 10.

During forward flight, propulsive forward thrust is provided by a forced air bypass system that is disposed within blended wing body 18. In the illustrated embodiment, the forced air bypass system includes inlets 34a, 34b located proximate the nose of aircraft 10. The forced air bypass system also includes bypass fans 36a, 36b that are disposed within blended wing body 18 downstream of inlets 34a, 34b, respectively. Bypass fans 36a, 36b provide air for engine 30 and also provide bypass air that travels around engine 30 via bypass ducts 38a, 38b that are coupled to an exhaust system 40 of engine 30. In the illustrated embodiment, bypass fans 36a, 36b are coupled to engine 30 via transmission 32 such that torque and rotational energy may be selectively provided from engine 30 to bypass fans 36a, 36b. It is noted that transmission 32 may be housed in a single gearbox or multiple independent gearboxes to provide suitable gear reduction from engine 30 to lift fans 28a, 28b and bypass fans 36a, 36b, such that each can operate at an optimum speed. When aircraft 10 is operating in the forward flight mode, engine 30 is coupled to bypass fans 36a, 36b by transmission 32 such that bypass fans 36a, 36b generate bypass air that combines with the engine exhaust in exhaust system 40 to provide forward thrust, thereby generating wing-borne lift responsive to the forward airspeed of aircraft 10. In addition, when aircraft 10 is operating in the forward flight mode, engine 30 is decoupled to rotor assemblies 28a, 28b as discussed herein. When engine 30 is coupled to bypass fans 36a, 36b and decoupled from rotor assemblies 28a, 28b, this will be referred to herein as the turbofan configuration or turbofan mode of turboshaft engine 30, wherein shaft power extracted from engine 30 is used to power bypass fans 36a, 36b to generate the bypass air. When aircraft 10 is operating in the VTOL mode, engine 30 may be decoupled from bypass fans 36a, 36b by the clutching mechanism of transmission 32 or other suitable clutching mechanism, such that bypass fans 36a, 36b do not rotate. Alternatively, engine 30 may remained coupled to bypass fans 36a, 36b in the VTOL mode such that bypass fans 36a, 36b continue to rotate and provide cooling air for mixing with engine exhaust. In the transition modes of aircraft 10, engine 30 is preferably coupled to bypass fans 36a, 36b such that propulsive thrust can generate forward airspeed and thus wing-borne lift.

In the illustrated embodiment, bypass fans 36a, 36b have a pressure ratio of between 1.08 and 1.12. In other embodiments, the bypass fans could have a pressure ratio either greater than 1.12 or less than 1.08. Also, in the illustrated embodiment, bypass fans 36a, 36b generate a very high bypass ratio (the mass flow rate of the bypass air to the mass flow rate of air entering the engine) of between 8 to 1 and 12 to 1. In other embodiments, the bypass fans could generate a bypass ratio either greater than 12 to 1 or less than 8 to 1. The bypass air generated by bypass fans 36a, 36b combines with the engine exhaust in exhaust system 40, which is configured with a thruster nozzle 42, to provide propulsive thrust. Thruster nozzle 42 may be a mixing nozzle in which case the bypass air mixes with the engine exhaust for a low-temperature exhaust. Alternatively, thruster nozzle 42 may be a film cooled nozzle in which case the bypass air surrounds the engine exhaust forming an insulating blanket along the internal surface of thruster nozzle 42 keeping hot engine exhaust suitably remote from the components of exhaust system 40.

Aircraft 10 is a fly-by-wire aircraft that operates responsive to command and control from a flight control system 44 that is preferably a redundant digital flight control system including multiple independent flight control computers. For example, the use of a redundant flight control system 44 improves the overall safety and reliability of aircraft 10 in the event of a failure in flight control system 44. Flight control system 44 may be implemented in a variety of forms including hardware, software, firmware, special purpose processors and combinations thereof. Flight control system 44 preferably includes non-transitory computer readable storage media including a set of computer instructions executable by one or more processors for controlling the operation of aircraft 10. Flight control system 44 may be implemented on one or more general-purpose computers, special purpose computers or other machines with memory and processing capability. For example, flight control system 44 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 44 may be a microprocessor-based system operable to execute program code in the form of machine-executable instructions. In addition, flight control system 44 may be selectively connectable to other computer systems via a proprietary encrypted network, a public encrypted network, the Internet or other suitable communication network that may include both wired and wireless connections.

Flight control system 44 communicates via a wired communications network within blended wing body 18 with various sensors, controllers and actuators associated with the systems of aircraft 10 such as lift fans 22a, 22b, engine 30, transmission 32 and bypass fans 36a, 36b as well as compressor 46, a pitch effector system including pitch effector 48, a roll effector system including roll effectors 50a, 50b and a yaw effector system including yaw effectors 52a, 52b, as discussed herein. Flight control system 44 sends flight command information to the various systems to individually and independently control and operate each system. For example, flight control system 44 is operable to individually and independently control the thrust vectors generated by lift fans 22a, 22b, the pitch control moments generated by pitch effector 48, the roll control moments generated by roll effectors 50a, 50b and the yaw control moments generated by yaw effectors 52a, 52b. Flight control system 44 may autonomously control some or all aspects of flight operation for aircraft 10. Flight control system 44 may communicate with sensors, such as positioning sensors, attitude sensors, speed sensors, environmental sensors, fuel sensors, temperature sensors, location sensors and the like to enhance autonomous control capabilities. Flight control system 44 is also operable to communicate with remote systems, such as a ground station via a wireless communications protocol. The remote system may be operable to receive flight data from and provide commands to flight control system 44 to enable remote flight control over some or all aspects of flight operation for aircraft 10. As one example, flight control system 44 may receive a flight plan and/or mission parameters from a remote system and thereafter autonomously control all aspects of flight during the mission.

Flight control system 44 may be configured to communicate with similar flight control systems in similar aircraft such that the flight control systems are networked together enabling cooperation and/or swarm behavior. For example, such swarm behavior may include the ability to dynamically adapt responsive to changing conditions or parameters including the ability for group coordination, distributed control, distributed tactical group planning, distributed tactical group goals, distributed strategic group goals and/or fully autonomous swarming. More generally, aircraft 10 may be used in military, commercial, scientific, recreational and other applications. For example, military applications may include intelligence, surveillance, reconnaissance and attack missions. Civil applications include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Flight control system 44 is the centralized host of all the functionality for the command and control of aircraft 10. Flight control system 44 may execute any number of flight control modules and other modules that may be implemented in a variety of forms including hardware, software, firmware, special purpose processors and combinations thereof. For example, flight control system 44 may execute an active flow control module 54 that is configured to provide command and control over selective mass flow injections that influence lift coefficients, generate control moments and/or generate thrust vectors for aircraft 10 throughout the flight envelope that enable aircraft 10 to have low observable characteristics compared to aircraft using traditional moving control surfaces such as open rotor disks, ailerons, elevators and rudders that can cause spikes in radar signature when they are activated.

Figure 2A:
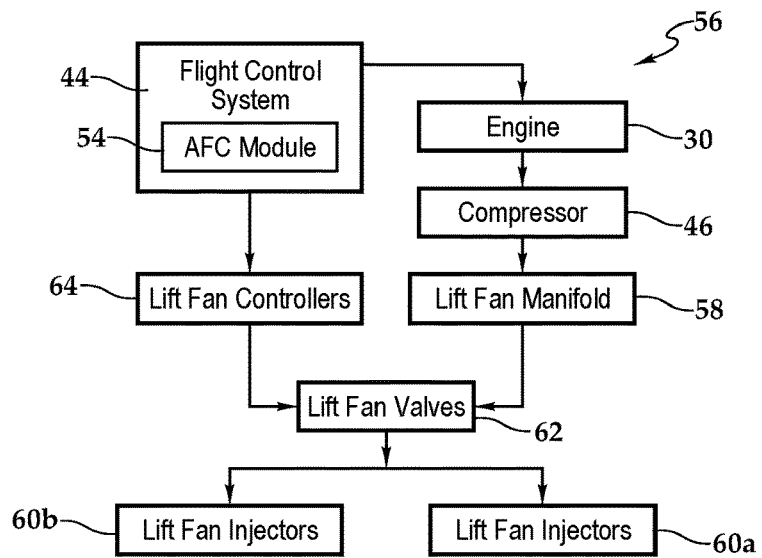
FIGS. 2A-2S are schematic illustrations of ducted fans for a fan-in-wing blended wing body aircraft in accordance with embodiments of the present disclosure.

Referring additionally to FIG. 2A, a pressurized air system depicted as active flow control system 56 will now be described. In the illustrated embodiment, active flow control system 56 is associated with and may be at least partially integral with the lift fan system. Active flow control system 56 includes active flow control module 54 that is executed by flight control system 44. Active flow control system 56 also includes engine 30 and a pressurized air source depicted as compressor 46. In other embodiments, the pressurized air source could be bleed air from engine 30. In the illustrated embodiment, compressor 46 that is mechanically coupled to engine 30 such that shaft power extracted from engine 30 is used to drive compressor 46 in all flight modes of aircraft 10 including VTOL flight mode, forward flight mode and transition flight modes. A lift fan manifold 58 is coupled to compressor 46 to distribute pressurized air from compressor 46 to lift fan injectors 60a associated with lift fan 22a and lift fan injectors 60b associated with lift fan 22b. The injection of pressurized air is controlled by a lift fan valve system 62 and a lift fan controller system 64 that includes electro-mechanical actuators in communication with active flow control module 54 that selectively open and close the valves within lift fan valve system 62 for continuous and/or intermittent mass flow injections.

Figure 2B:
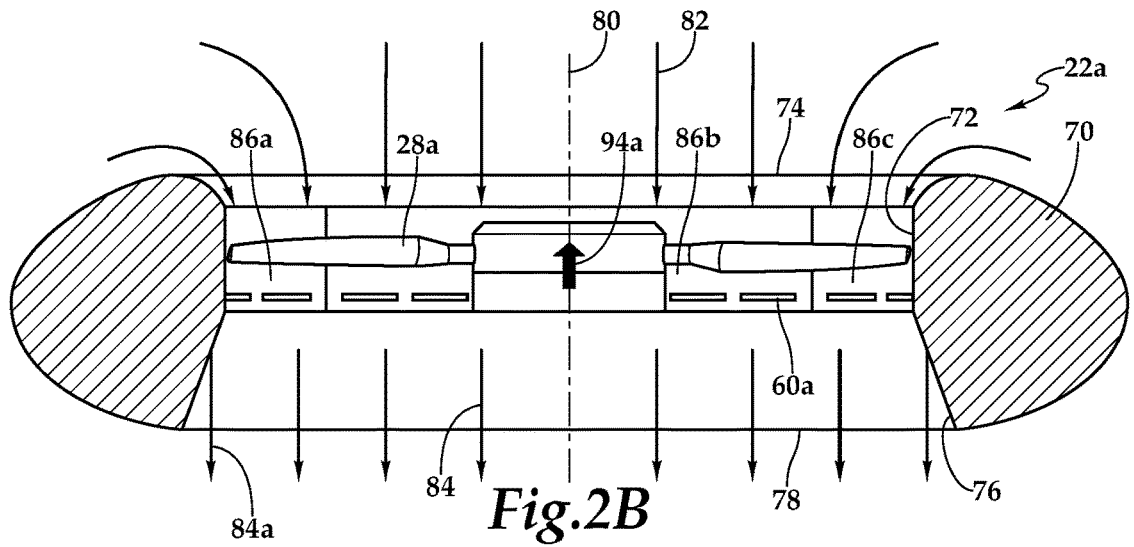
Figure 2C:
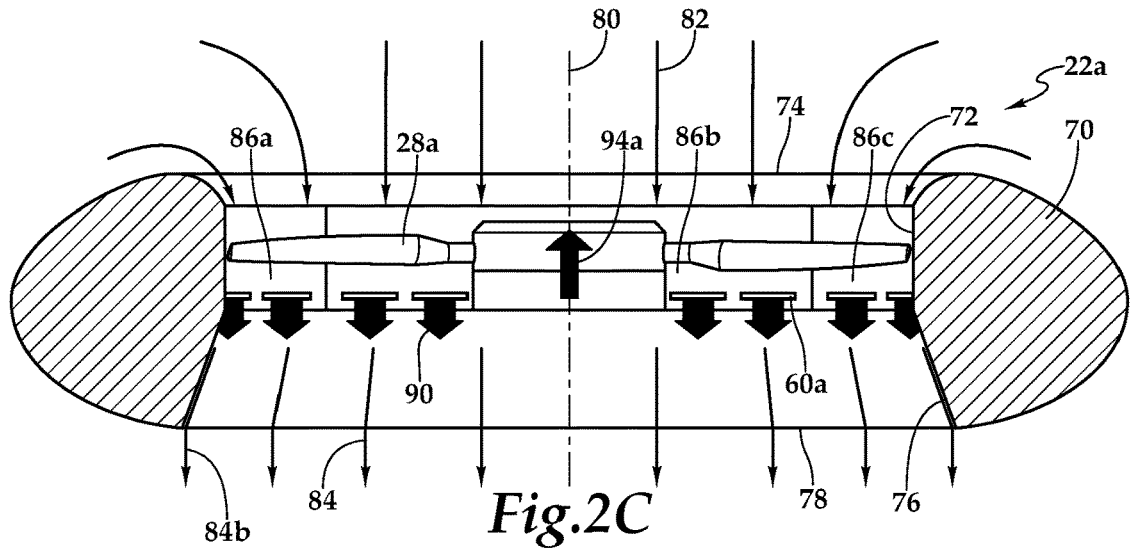
Figure 2D:
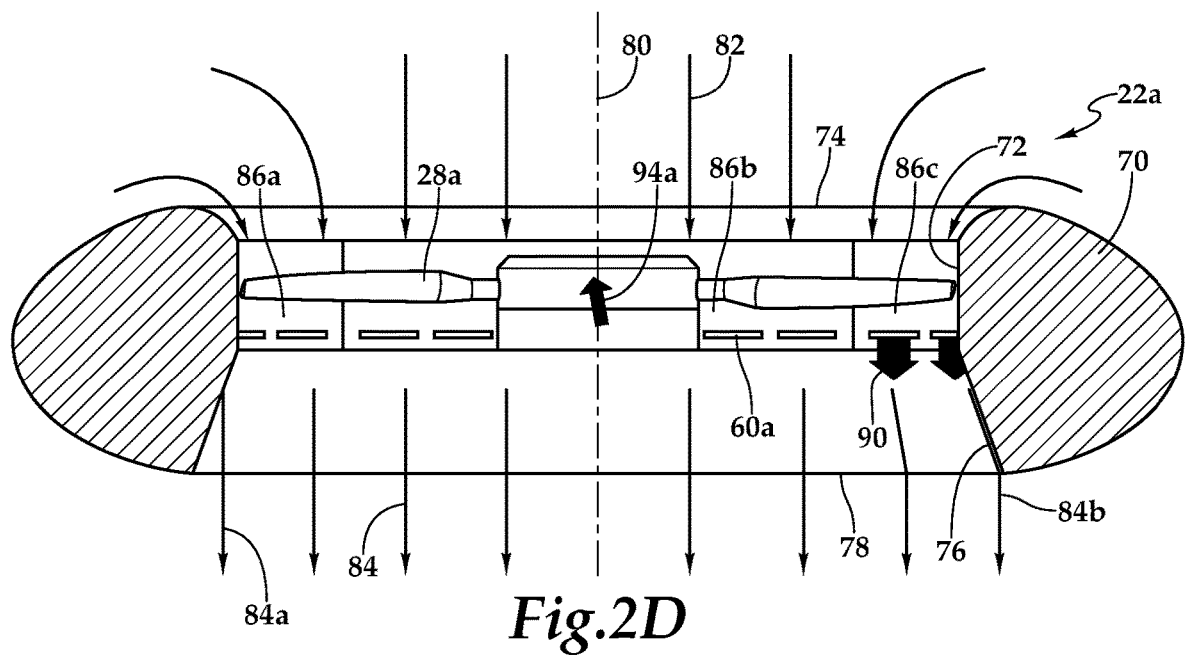
Figure 2E:
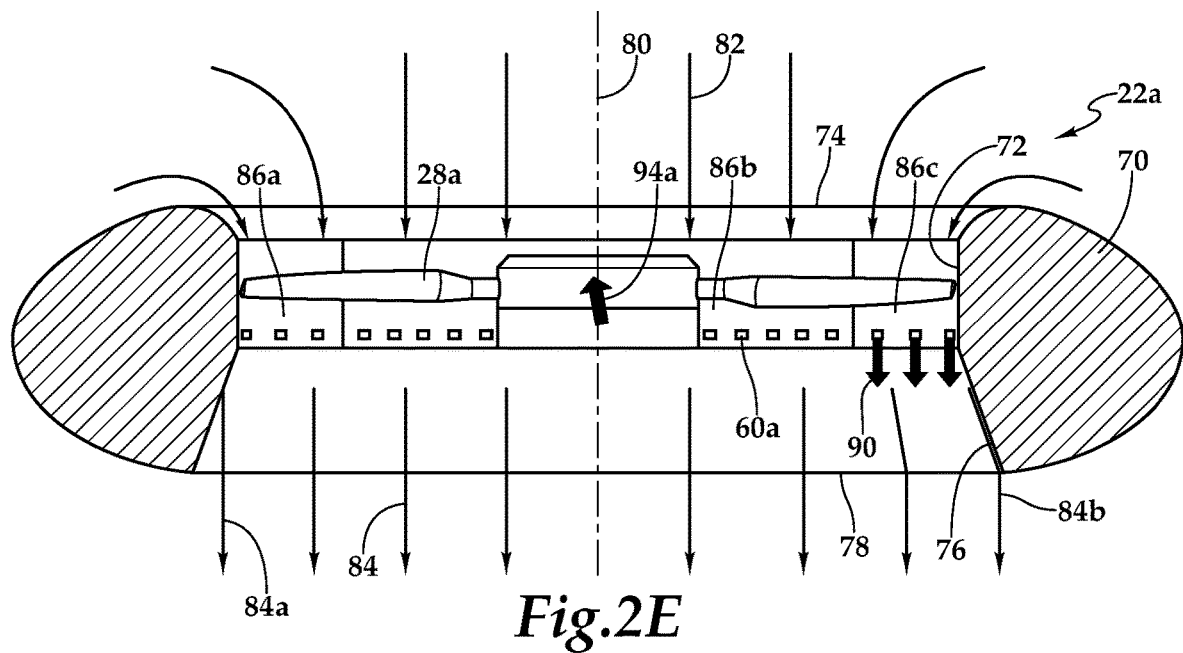
Figure 2F:
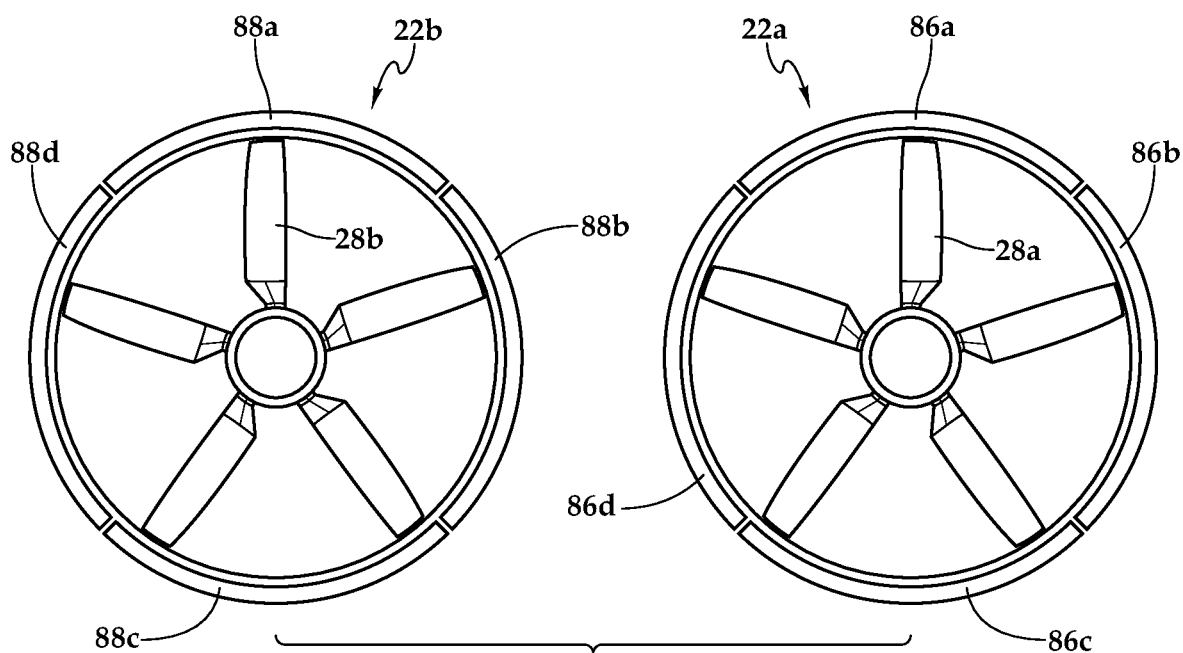
Figure 2G:
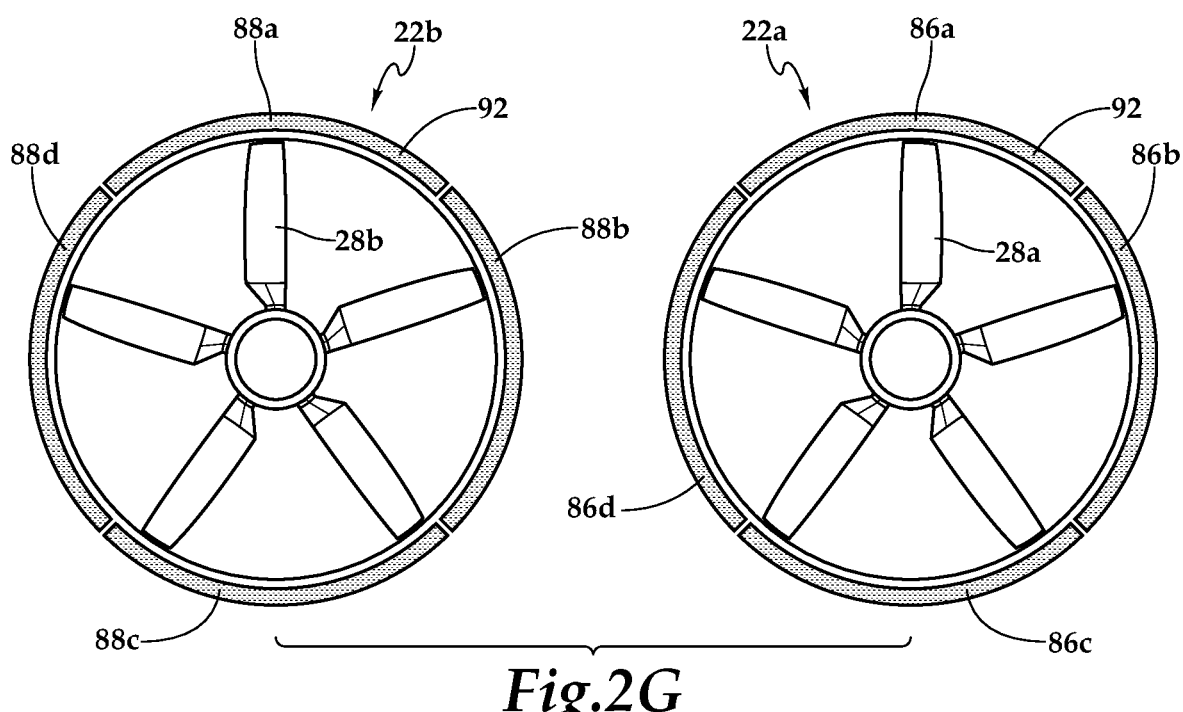
Figure 2H:
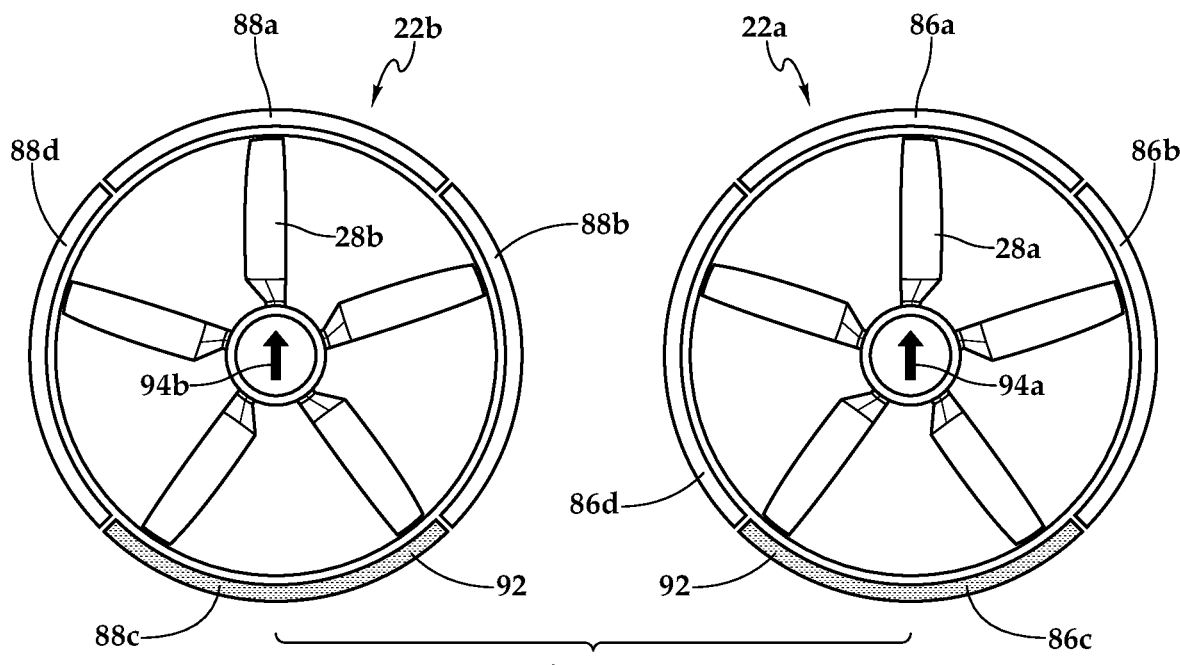
Figure 2I:
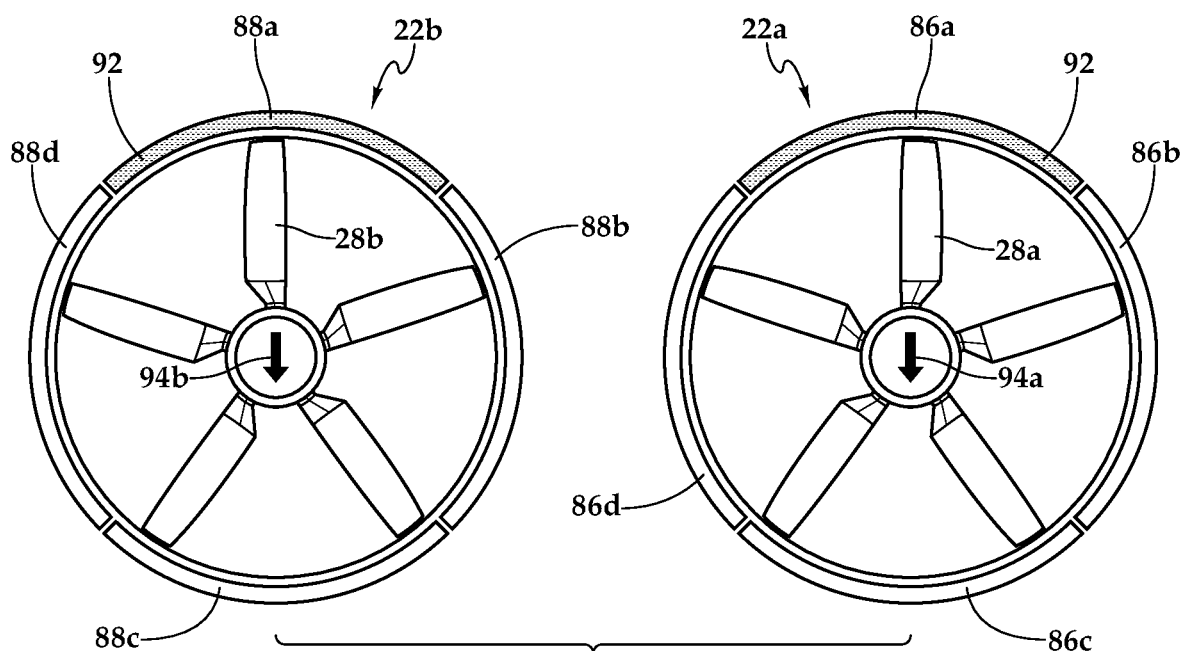
Figure 2J:
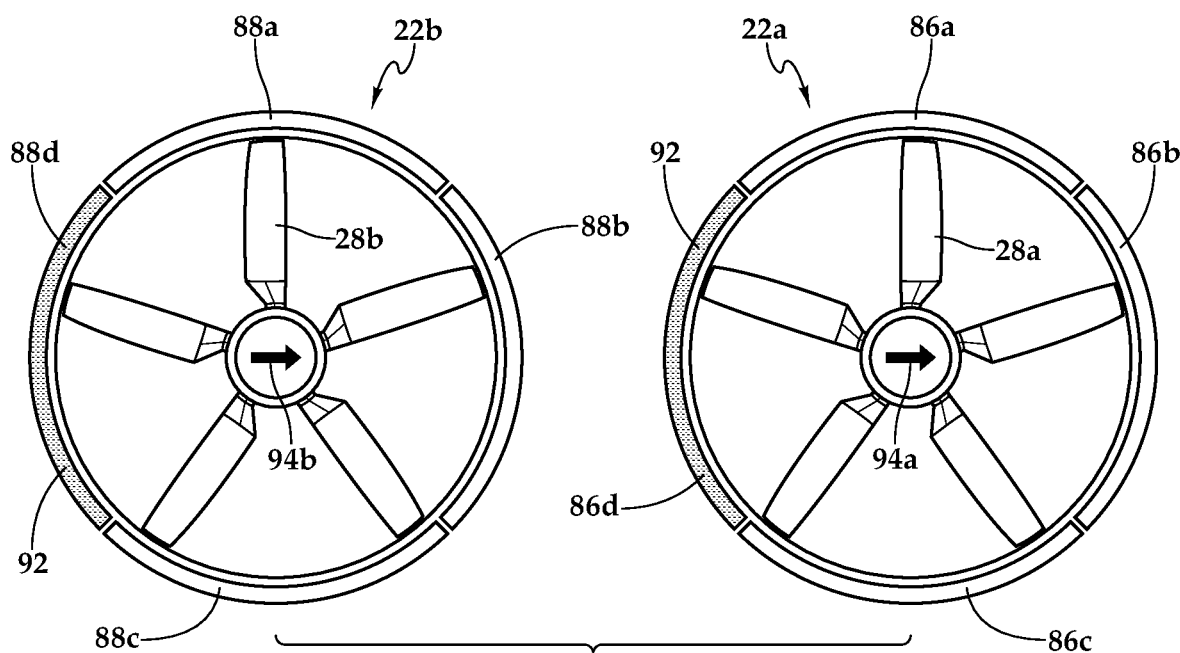
Figure 2K:
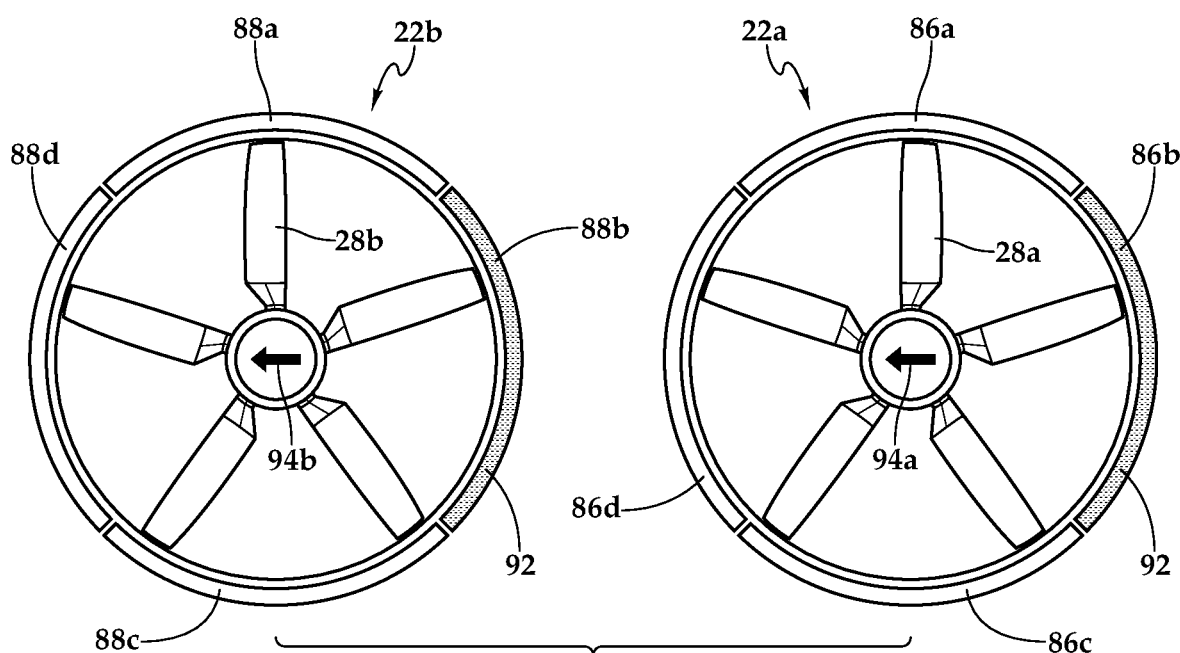
Figure 2L:
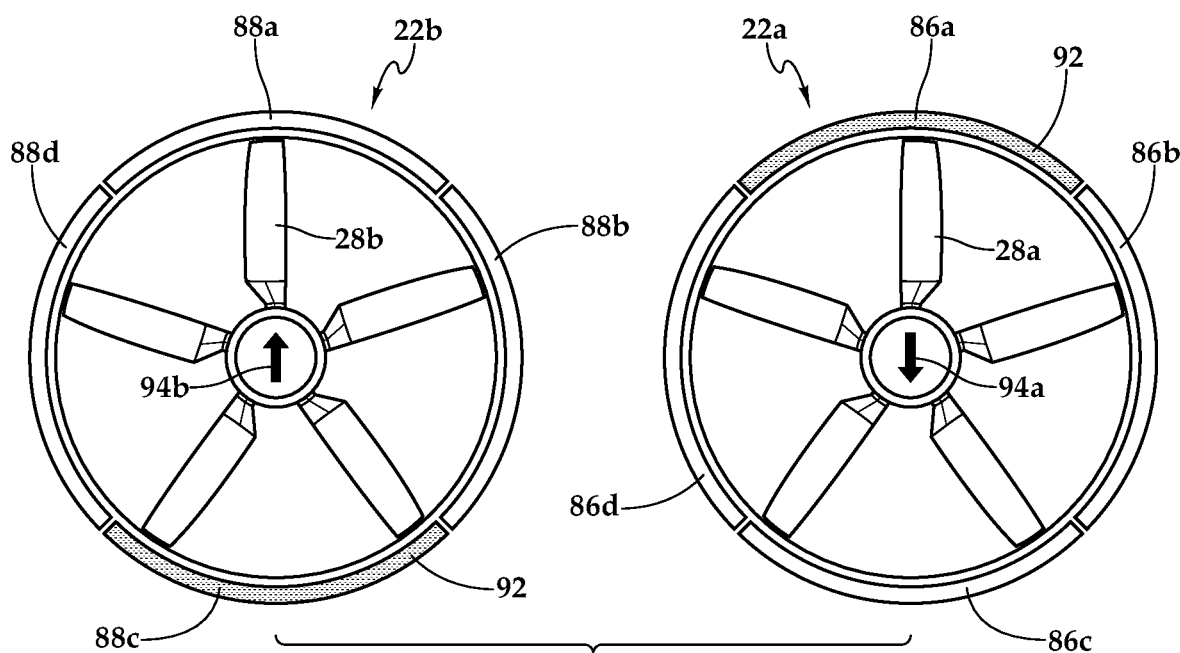
Figure 2M:
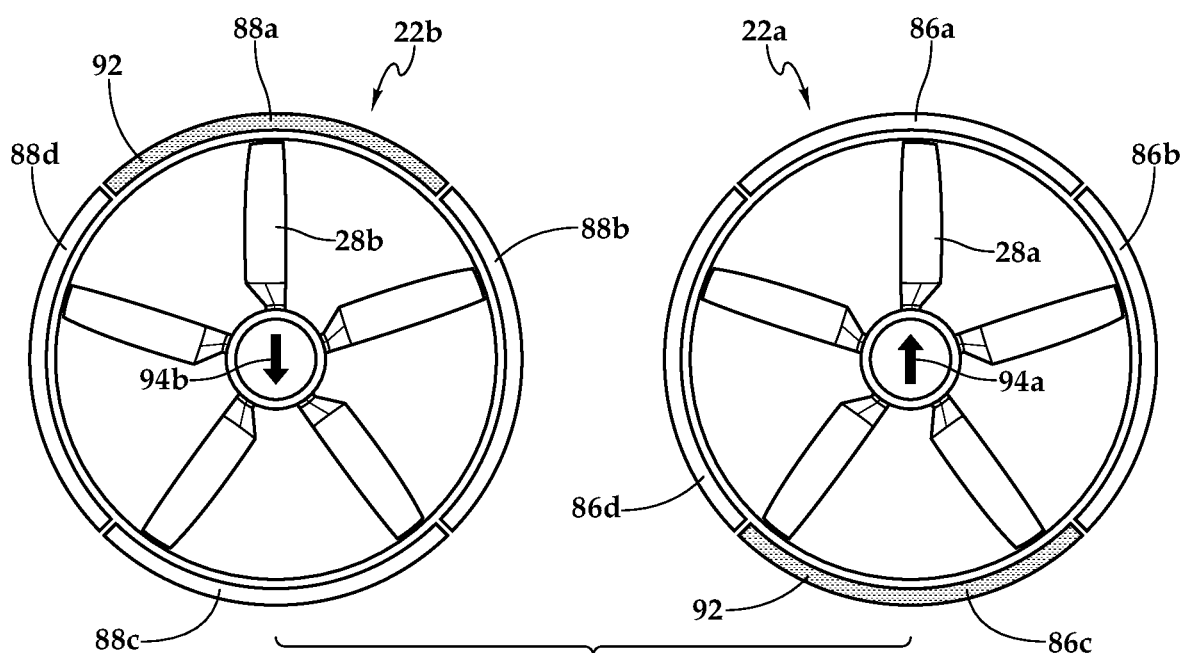
Figure 2N:
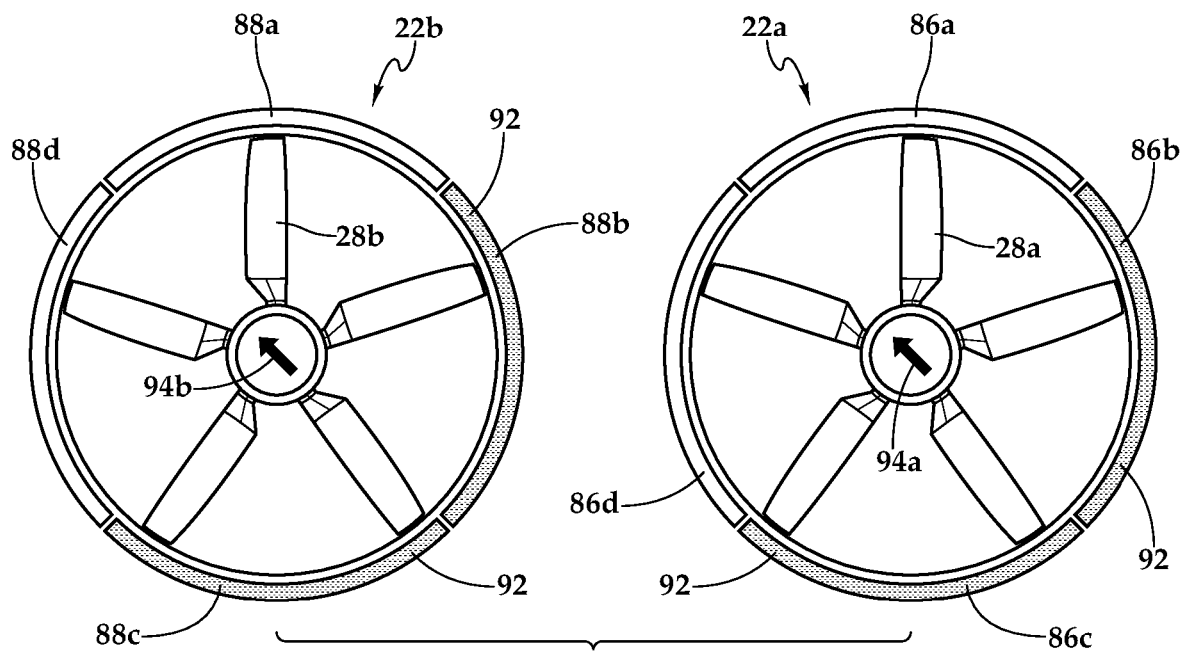
Figure 2O:
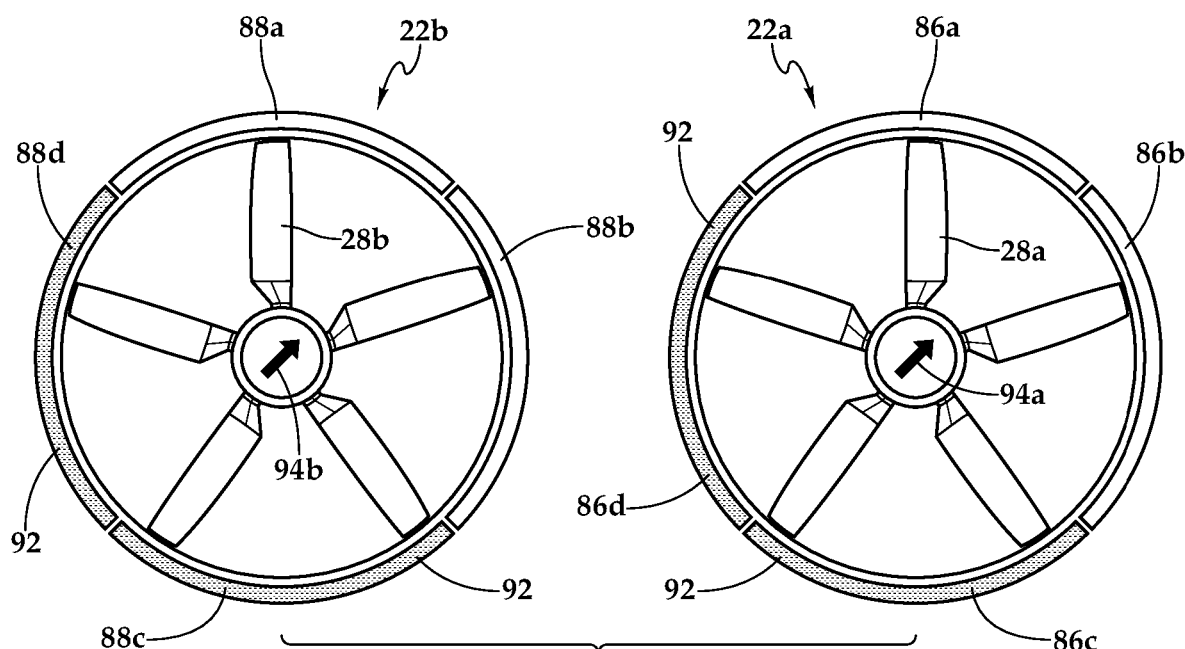
Figure 2P:
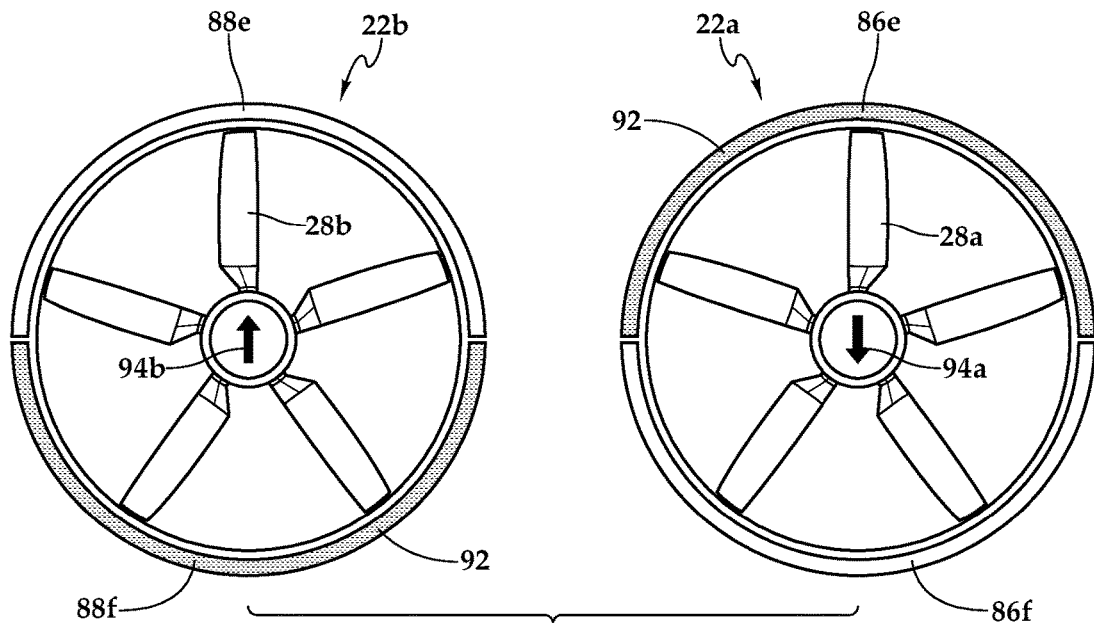
Figure 2Q:
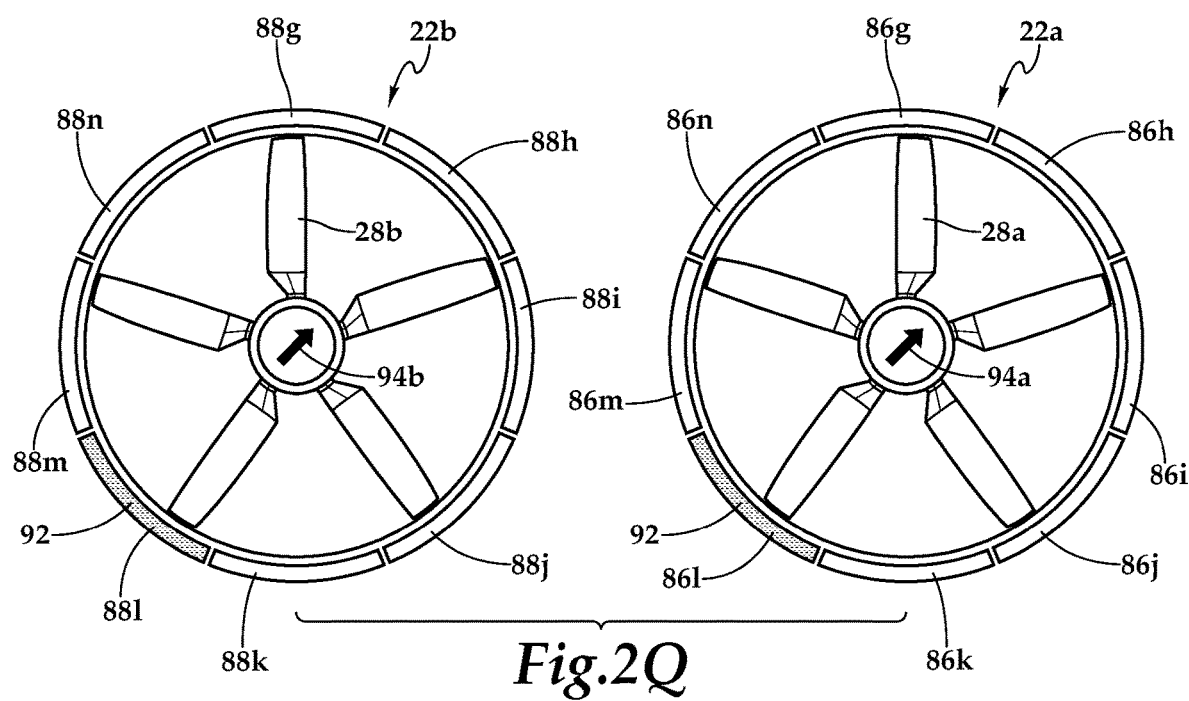

Referring additionally to FIGS. 2B-2Q, the operation of active flow control system 56 in conjunction with the lift fan system will now be described. FIG. 2B depicts a cross sectional view of lift fan 22a during VTOL operations of aircraft 10. It is noted that lift fan 22a is substantially similar to lift fan 22b therefore, for sake of efficiency, certain features have been disclosed only with regard to lift fan 22a. One having ordinary skill in the art, however, will fully appreciate an understanding of lift fan 22b based upon the disclosure herein of lift fan 22a. Lift fan 22a is depicted as a ducted fan including a duct 70 having a generally annular inner surface 72, an inlet 74, an expanding diffuser 76 and an outlet 78. In the illustrated embodiment, expanding diffuser 76 has a diffuser angle between 10 degrees and 20 degrees. In other embodiments, the diffuser angle of the duct of a lift fan could be less than 10 degrees or greater than 20 degrees. A fan depicted as rotor assembly 28a is disposed within duct 70 between inlet 74 and expanding diffuser 76. Rotor assembly 28a is configured to rotate relative to duct 70 about a fan axis 80 to generate an airflow therethrough depicted as inflow arrows 82 and outflow arrows 84. In the illustrated embodiment, active flow control system 56 includes a plurality of injection zones 86a, 86b, 86c, 86d that are uniformly and circumferentially distributed about inner surface 72 of duct 70, as best seen in FIG. 2F, which also depicts lift fan 22b having injection zones 88a, 88b, 88c, 88d.

Each of the injection zones 86a, 86b, 86c, 86d includes an injector 60a depicted as one or more slots in FIGS. 2B-2D and as a plurality of jets in FIG. 2E. Similarly, each of the injection zones 88a, 88b, 88c, 88d includes an injector 60b as represented in FIG. 2A. Each of the injectors 60a is configured to inject a high speed mass flow in the form of pressurized air into duct 70 toward outlet 78, depicted as arrows 90 in FIG. 2C-2E and as shading 92 in FIGS. 2G-2Q. In the illustrated embodiment, injectors 60a are configured to inject pressurized air 90 tangential or substantially tangential to inner surface 72 of duct 70, as best seen in FIG. 2C. In other embodiments, injectors 60a may be configured to inject pressurized air 90 tangential or substantially tangential to expanding diffuser 76.

As depicted in FIGS. 2B and 2F, active flow control system 56 is not injecting pressurized air into duct 70. As a result of the large diffuser angle of expanding diffuser 76, flow separation occurs between the airflow and duct 70 along expanding diffuser 76, as indicated by separated outflow arrow 84a in FIG. 2B. In this configuration, lift fan 22a produces thrust having a thrust vector 94a with a first magnitude and with a direction that is substantially parallel to or substantially coincident with fan axis 80. As depicted in FIGS. 2C and 2G, active flow control system 56 is injecting pressurized air into duct 70 from each of the injection zones 86a, 86b, 86c, 86d, as indicated by arrows 90 in FIG. 2C and shading 92 in FIG. 2G. As a result of the high speed mass flow injection of pressurized air substantially tangential to inner surface 72 of duct 70, flow separation between the airflow and expanding diffuser 76 is reduced and/or the airflow stays attached to expanding diffuser 76 due to the coanda effect, as indicated by attached outflow arrow 84b in FIG. 2C. In this configuration, lift fan 22a produces thrust having a thrust vector 94a with a second magnitude, which is greater than the first magnitude due to the larger expansion ratio, and with a direction that is substantially parallel to or substantially coincident with fan axis 80. During VTOL operations of aircraft 10, the standard configuration of active flow control system 56 is preferably injecting pressurized air into duct 70 from each of the injection zones 86a, 86b, 86c, 86d, as depicted in FIGS. 2C and 2G. In certain implementations, however, the standard configuration of active flow control system 56 during VTOL operations of aircraft 10 could alternatively be not injecting pressurized air into duct 70, as depicted in FIGS. 2B and 2F.

In addition to being configurable to selectively inject pressurized air into none or each of the injection zones 86a, 86b, 86c, 86d, active flow control system 56 can be configured to selectively inject pressurized air into one or more specific injection zones 86a, 86b, 86c, 86d to change the direction of thrust vector 94a. These configurations of active flow control system 56 enable translation of aircraft 10 during VTOL operations as well as the generation of yaw control moments during VTOL operations. These configurations of active flow control system 56 can be achieved by activating the desired injection zone or zones from the configuration shown in FIGS. 2B and 2F wherein no zones are active or by deactivating the required injection zone or zones from the configuration shown in FIGS. 2C and 2G wherein all zones are active.

As depicted in FIGS. 2D-2E and 2H, active flow control system 56 is injecting pressurized air into duct 70 in only the aft injection zone 86c, as indicated by arrows 90 in FIGS. 2D-2E and shading 92 in FIG. 2H. As a result of the high speed mass flow injection of pressurized air substantially tangential to inner surface 72 in injection zone 86c, flow separation between the airflow and expanding diffuser 76 downstream of injection zone 86c is reduced and/or the airflow stays attached to expanding diffuser 76 downstream of injection zone 86c, as indicated by attached outflow arrow 84b in FIGS. 2D-2E. At the same time, as no pressurized air is injected in injection zones 86a, 86b, 86d, flow separation occurs between the airflow and expanding diffuser 76 downstream of injection zones 86a, 86b, 86d as indicated by separated outflow arrow 84a in FIGS. 2D-2E. The selective injection of pressurized air into specific ones of injection zones 86a, 86b, 86c, 86d asymmetrically reduces the flow separation between the airflow and expanding diffuser 76 downstream of the injection zones in which injection is occurring. In this case, when only the aft injection zone 86c is operating, the airflow through lift fan 22a is influenced or deflected toward expanding diffuser 76 downstream of aft injection zone 86c. This changes the direction of thrust vector 94a such that thrust vector 94a has a non-zero angle relative to the direction of fan axis 80, such as an angle between 5 degrees and 10 degrees in the direction opposite aft injection zone 86c, in this case the forward direction, as indicated by the tilt of thrust vector 94a in FIGS. 2D-2E and the presentation of the forward component of thrust vector 94a in FIG. 2H. When only the aft injection zones 86c, 88c are active, as shown in FIG. 2H, thrust vectors 94a, 94b have forward components that urge aircraft 10 to translate in the forward direction during VTOL operations.

Similarly, when only the forward injection zones 86a, 88a are active, as shown in FIG. 2I, thrust vectors 94a, 94b have aft components that urge aircraft 10 to translate in the aft direction during VTOL operations. FIG. 2J illustrates active flow control system 56 injecting pressurized air into only the left injection zones 86d, 88d such that thrust vectors 94a, 94b have right components that urge aircraft 10 to translate to the right during VTOL operations. FIG. 2K illustrates active flow control system 56 injecting pressurized air into only the right injection zones 86b, 88b such that thrust vectors 94a, 94b have left components that urge aircraft 10 to translate to the left during VTOL operations. Active flow control system 56 is operable to inject the pressurized air at a variable intensity such that the rate of translation of aircraft 10 can be controlled by changing the intensity level or mass flowrate of the pressurized air.

In addition to providing translation authority to aircraft 10 during VTOL or hover operations, active flow control system 56 can be configured to provide yaw authority to aircraft 10 during VTOL or hover operations. FIG. 2L illustrates active flow control system 56 injecting pressurized air into forward injection zone 86a of lift fan 22a and into aft injection zone 88c of lift fan 22b. The selective injection of pressurized air into forward injection zone 86a asymmetrically reduces the flow separation between the airflow and expanding diffuser 76 downstream of forward injection zone 86a generating a thrust vector 94a having an aft component. The selective injection of pressurized air into aft injection zone 88c asymmetrically reduces the flow separation between the airflow and the expanding diffuser downstream of aft injection zone 88c generating a thrust vector 94b having a forward component. The aft component of thrust vector 94a and the forward component of thrust vector 94b create yaw control moments about the center of gravity of aircraft 10 such that aircraft 10 is urged to rotate right about vertical axis 10c. Similarly, FIG. 2M illustrates active flow control system 56 injecting pressurized air into aft injection zone 86c of lift fan 22a and into forward injection zone 88a of lift fan 22b. This operation causes thrust vector 94a to have a forward component and thrust vector 94b to have an aft component which create yaw control moments about the center of gravity of aircraft 10 such that aircraft 10 is urged to rotate left about vertical axis 10c. Active flow control system 56 is operable to inject the pressurized air at a variable intensity such that the rate of the yaw maneuver of aircraft 10 can be controlled by changing the intensity level or mass flowrate of the pressurized air.

While the benefits of activating a single injection zone of a four injection zones active flow control system for lift fans has been described and depicted, it should be understood by those having ordinary skill in the art that activating other combinations or permutations of injection zones in a four injection zones active flow control system for lift fans is also beneficial. For example, FIG. 2N depicts activation of injection zones 86b, 86c of lift fan 22a and injection zones 88b, 88c of lift fan 22b. This operation causes thrust vector 94a to have a forward and left component and causes thrust vector 94b to have a forward and left component which urge aircraft 10 to translate diagonally in the forward/left direction. Similarly, FIG. 2O depicts activation of injection zones 86c, 86d of lift fan 22a and injection zones 88c, 88d of lift fan 22b. This operation causes thrust vector 94a to have a forward and right component and causes thrust vector 94b to have a forward and right component which urge aircraft 10 to translate diagonally in the forward/right direction.

Even though the active flow control system 56 associated with the lift fan system has been described and depicted as including four injection zones for each lift fan, it should be understood by those having ordinary skill in the art that lift fan systems can have other numbers of active flow control injection zones both less than or greater than four. For example, FIG. 2P depicts an embodiment of lift fans 22a, 22b in which lift fan 22a has two active flow control injection zones 86e, 86f and lift fan 22b has two active flow control injection zones 88e, 88f that enable fore/aft translation in hover as well as yaw control authority in hover. Similarly, FIG. 2Q depicts an embodiment of lift fans 22a, 22b in which lift fan 22a has eight active flow control injection zones 86g-86n and lift fan 22b has eight active flow control injection zones 88g-88n that enable fore/aft translation, left/right translation and diagonal translation in hover as well as yaw control authority in hover.

FIGS. 2R-2S depict cross sectional views of wing 16 along a chord that passes through lift fan 22a during transition flight of aircraft 10 when lift fan 22a experiences edgewise flow. In the illustrated embodiment, duct 70 of lift fan 22a has a generally annular inner surface 72, an inlet 74 with a leading portion 74a, an expanding diffuser 76 with a trailing portion 76a and an outlet 78. Rotor assembly 28a is disposed within duct 70 between inlet 74 and expanding diffuser 76 and is configured to rotate relative to duct 70 about a fan axis 80 to generate an airflow therethrough depicted as streamlines 96a, 96b, 96c, 96d. In addition, streamline 96e is depicted as traveling above wing 16 and streamline 96f is depicted as traveling below wing 16. In the illustrated embodiment, active flow control system 56 utilizes an upper forward injection zone 86e and aft injection zone 86c, each of which includes an injector 60a in the form of one or more slots or a plurality of jets, as discussed herein. Injector 60a in aft injection zone 86c is configured to inject a high speed mass flow in the form of pressurized air into duct 70 tangential or substantially tangential to inner surface 72 of duct 70 toward outlet 78, depicted as arrows 90 in FIG. 2S. Injector 60a in forward injection zone 86e is configured to inject a high speed mass flow in the form of pressurized air tangential or substantially tangential to an upper surface of leading portion 74a of duct 70 toward inlet 74, depicted as arrows 98 in FIG. 2S.

Depending upon factors such as the forward airspeed of aircraft 10 that is generating the edgewise flow relative to lift fan 22a, forward injection zone 86e and aft injection zone 86c may have circumferential spans up to ninety degrees, between sixty degrees and ninety degrees, up to sixty degrees, between thirty degrees and sixty degrees or other suitable circumferential spans. It is noted that the circumferential span of forward injection zone 86e may be the same as or different from the circumferential span of aft injection zone 86c. For example, the circumferential span of forward injection zone 86e may have a ratio to the circumferential span of aft injection zone 86c of 4 to 1; 3 to 1; 2 to 1; 1 to 1; 1 to 2; 1 to 3; 1 to 4 or other suitable ratio. In one example, the circumferential span of forward injection zone 86e may be between sixty degrees and ninety degrees while the circumferential span of aft injection zone 86c may be between thirty degrees and sixty degrees.

As depicted in FIG. 2R, active flow control system 56 is not injecting pressurized air into duct 70. As a result, flow separation occurs between the airflow and duct 70 along inner surface 72 downstream of leading portion 74a as indicated by the gap between inner surface 72 and streamline 96a. Also illustrated is turbulent and/or recirculatory air 96g at the flow separation region that causes noise pollution and reduces the efficiency of lift fan 22a. Similarly, flow separation occurs between the airflow and duct 70 along expanding diffuser 76 at trailing portion 76a as indicated by the gap between expanding diffuser 76 and streamline 96d, which further reduces the efficiency of lift fan 22a.

As depicted in FIG. 2S, active flow control system 56 is injecting pressurized air into duct 70 in forward injection zone 86e and aft injection zone 86c, as indicated by arrows 98, 90, in FIG. 2S. As a result of the high speed mass flow injection of pressurized air substantially tangential to the upper surface of leading portion 74a of duct 70 toward inlet 74, flow separation between the airflow and duct 70 along inner surface 72 downstream of leading portion 74a is reduced and/or the airflow stays attached to inner surface 72 due to the coanda effect, as indicated by the reduction in the gap between inner surface 72 and streamline 96a as well as the absence of recirculatory air 96g in FIG. 2S. Similarly, as a result of the high speed mass flow injection of pressurized air substantially tangential to inner surface 72 of duct 70 toward outlet 78, flow separation between the airflow and duct 70 along expanding diffuser 76 at trailing portion 76a is reduced and/or the airflow stays attached to expanding diffuser 76 due to the coanda effect, as indicated by the reduction in the gap between expanding diffuser 76 and streamline 96d in FIG. 2S. Use of active flow control system 56 in this manner not only improves the forward flight characteristics of the lift fan system in edgewise flight by increasing thrust efficiency and allowing for smoother transition between thrust-borne lift and wing-borne flight, but also reduces power consumption and loads on the rotor systems.

Referring now to FIGS. 1B, 1H and 3A, a portion of the active flow control system that will be referred to herein as pitch effector system 100 will now be described. As best seen in FIG. 1B, pitch effector 48 is disposed proximate the trailing edge of wing 16 aft of fuselage 14. Pitch effector 48 is associated with and may be at least partially integral with the exhaust system of aircraft 10. While pitch effector 48 is most effective when aircraft 10 is operating in forward flight mode when the exhaust system is discharging a propulsive gas stream, pitch effector 48 may also be used when aircraft 10 is operating in VTOL flight mode and transition flight modes when the exhaust system may be discharging a non-propulsive gas stream. In the embodiment illustrated in FIG. 3A, pitch effector system 100 includes active flow control module 54 that is executed by flight control system 44. Pitch effector system 100 also includes engine 30 and compressor 46. A pitch manifold 102 is coupled to compressor 46 to distribute pressurized air from compressor 46 to upper pitch injector 104 and lower pitch injector 106 of pitch effector 48 which is associated with exhaust system 40 of aircraft 10 and more specifically with thruster nozzle 42. The injection of pressurized air is controlled by a pitch valve system 108 and a pitch controller system 110 that includes electro-mechanical actuators in communication with active flow control module 54 that selectively open and close the valves within pitch valve system 108 for continuous and/or intermittent mass flow injections.

Referring additionally to FIGS. 3B-3D, pitch effector 48 and thruster nozzle 42 of aircraft 10 are shown in greater detail. In the illustrated embodiment, thruster nozzle 42 may be referred to as a flat nozzle and is depicted as a diverging nozzle having an upper expansion ramp 112 and a lower expansion ramp 114 that enable thruster nozzle 42 to discharge a propulsive gas; namely, bypass air combined with engine exhaust, in an aftward direction to generate forward thrust for aircraft 10. FIG. 3C depicts an upper surface 116 of thruster nozzle 42 having upper pitch injector 104 of pitch effector 48 coupled thereto. In the illustrated embodiment, upper pitch injector 104 is depicted as a plurality of jets 118 distributed proximate the aft end of thruster nozzle 42. FIG. 3D depicts a lower surface 120 of thruster nozzle 42 having lower pitch injector 106 of pitch effector 48 coupled thereto. In the illustrated embodiment, lower pitch injector 106 is depicted as two slots 122 proximate the aft end of thruster nozzle 42. Even though upper pitch injector 104 is depicted as a plurality of jets and lower pitch injector 106 is depicted as a pair of slots, it should be understood by those have ordinary skill in the art that both upper pitch injector 104 and lower pitch injector 106 could be a plurality of jets, both upper pitch injector 104 and lower pitch injector 106 could be one or more slots or upper pitch injector 104 could be one or more slots and lower pitch injector 106 could be a plurality of jets.

Referring additionally to FIGS. 3E-3G, the operation of pitch effector 48 will now be described. FIGS. 3E-3G are schematic cross sectional views of the aft end of thruster nozzle 42 showing upper pitch injector 104, lower pitch injector 106, upper expansion ramp 112 and lower expansion ramp 114. In FIG. 3F, pitch effector 48 is not injecting pressurized air into thruster nozzle 42. As a result, propulsive gas 124 is directed aftward from thruster nozzle 42 having a forward thrust vector that is substantially parallel to longitudinal axis 10a. In this configuration, pitch effector 48 is not generating a pitch control moment. In FIG. 3E, pitch effector 48 is injecting pressurized air into thruster nozzle 42 from lower pitch injector 106 transverse to or substantially normal to the flow of propulsive gas 124, as indicated by arrow 126. As a result of the high speed mass flow injection of pressurized air, the stream of propulsive gas 124 is deflected or diverted toward upper expansion ramp 112 such that propulsive gas 124 exits thruster nozzle 42 having an aftward and upward direction which generates a thrust vector having a downward component, as indicated by arrow 128, which is aft of the center of gravity of aircraft 10, thereby generating a pitch up control moment.

In FIG. 3G, pitch effector 48 is injecting pressurized air into thruster nozzle 42 from upper pitch injector 104 transverse to or substantially normal to the flow of propulsive gas 124, as indicated by arrow 130. As a result of the high speed mass flow injection of pressurized air, the stream of propulsive gas 124 is deflected or diverted toward lower expansion ramp 114 such that propulsive gas 124 exits thruster nozzle 42 having an aftward and downward direction which generates a thrust vector having an upward component, as indicated by arrow 132, which is aft of the center of gravity of aircraft 10, thereby generating a pitch down control moment. In this manner, pitch effector 48 acts as a fluidic thrust vectoring system that selectively directs the stream of propulsive gas 124 upward or downward as propulsive gas 124 exits thruster nozzle 42 to generate pitch control moments. It is noted that pitch effector 48 is operable to inject the pressurized air at a variable intensity such that the rate of pitch maneuvers of aircraft 10 can be controlled by changing the intensity level or mass flowrate of the pressurized air.

Referring now to FIGS. 3H-3J, another embodiment of pitch effector 48 will now be described. FIGS. 3H-3J are schematic cross sectional views of the aft end of a thruster nozzle 140 having a lower pitch injector 142 and a lower expansion ramp 144. In FIG. 3J, pitch effector 48 is not injecting pressurized air into thruster nozzle 140. As a result, propulsive gas 124 tends to attach to lower expansion ramp 144 such that propulsive gas 124 exits thruster nozzle 140 having an aftward and downward direction that generates a thrust vector having an upward component, as indicated by arrow 146, which is aft of the center of gravity of aircraft 10, thereby generating a pitch down control moment. In FIG. 3I, pitch effector 48 is injecting pressurized air into thruster nozzle 140 from lower pitch injector 142 transverse to or substantially normal to the flow of propulsive gas 124 at a first intensity, as indicated by small arrow 148. As a result of the high speed mass flow injection of pressurized air, the stream of propulsive gas 124 is deflected or diverted away from lower expansion ramp 144 such that propulsive gas 124 exits thruster nozzle 140 directed aftward from thruster nozzle 140 having a forward thrust vector that is substantially parallel to longitudinal axis 10a. In this configuration, pitch effector 48 is not generating a pitch control moment. In FIG. 3H, pitch effector 48 is injecting pressurized air into thruster nozzle 140 from lower pitch injector 142 transverse to or substantially normal to the flow of propulsive gas 124 at a second intensity that is greater than the first intensity, as indicated by large arrow 150. As a result of the high speed mass flow injection of pressurized air, the stream of propulsive gas 124 is deflected or diverted farther away from lower expansion ramp 114 such that propulsive gas 124 exits thruster nozzle 140 having an aftward and upward direction that generates a thrust vector having a downward component, as indicated by arrow 152, which is aft of the center of gravity of aircraft 10, thereby generating a pitch up control moment. In this manner, pitch effector 48 acts as a fluidic thrust vectoring system that selectively directs the stream of propulsive gas 124 upward as propulsive gas 124 exits thruster nozzle 140 to generate pitch control moments. It is noted that when pitch effector 48 is used with thruster nozzle 140, pitch effector 48 defaults to the configuration shown in FIG. 3I such that no pitch control moment is being generated.

Referring now to FIGS. 3K-3M, the operation a further embodiment of pitch effector 48 will now be described. FIGS. 3K-3M are schematic cross sectional views of the aft end of thruster nozzle 160 having a diverter 162 disposed therein that includes an upper pitch injector 164, a lower pitch injector 166, an upper surface 168, a lower surface 170 and coanda surface 172. In FIG. 3L, pitch effector 48 is not injecting pressurized air. As a result, propulsive gas 124 is directed around diverter 162 and aftward from thruster nozzle 160 having a forward thrust vector that is substantially parallel to longitudinal axis 10*a*. In this configuration, pitch effector 48 is not generating a pitch control moment. In FIG. 3K, pitch effector 48 is injecting pressurized air into thruster nozzle 160 from lower pitch injector 166 substantially tangential to lower surface 170, as indicated by arrow 174. As a result of the high speed mass flow injection of pressurized air, the stream of propulsive gas 124 tends to attach to coanda surface 172 such that propulsive gas 124 exits thruster nozzle 160 having an aftward and upward direction that generates a thrust vector having a downward component, as indicated by arrow 176, which is aft of the center of gravity of aircraft 10, thereby generating a pitch up control moment. In FIG. 3M, pitch effector 48 is injecting pressurized air into thruster nozzle 160 from upper pitch injector 164 substantially tangential to upper surface 168, as indicated by arrow 178. As a result of the high speed mass flow injection of pressurized air, the stream of propulsive gas 124 tends to attach to coanda surface 172 such that propulsive gas 124 exits thruster nozzle 160 having an aftward and downward direction that generates a thrust vector having an upward component, as indicated by arrow 180, which is aft of the center of gravity of aircraft 10, thereby generating a pitch down control moment. In this manner, pitch effector 48 acts as a fluidic thrust vectoring system that selectively influences the stream of propulsive gas 124 to turn upward or downward as propulsive gas 124 exits thruster nozzle 160 to generate pitch control moments. It is noted that pitch effector 48 is operable to inject the pressurized air at a variable intensity such that the rate of pitch maneuvers of aircraft 10 can be controlled by changing the intensity level or mass flowrate of the pressurized air.

Figure 4A:
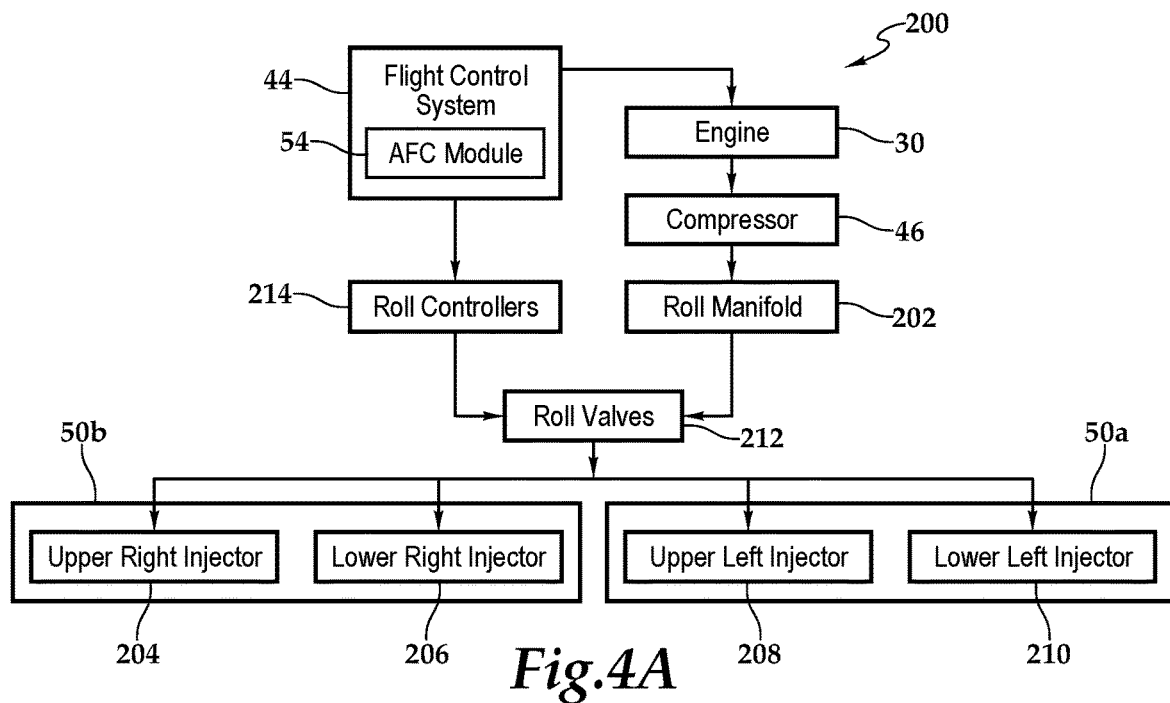
FIGS. 4A-4D are schematic illustrations of a roll effector system and component parts thereof for a fan-in-wing blended wing body aircraft in accordance with embodiments of the present disclosure.

Referring now to FIGS. 1B, 1H and 4A, a portion of the active flow control system that will be referred to herein as roll effector system 200 will now be described. As best seen in FIG. 1B, roll effectors 50*a*, 50*b* are disposed proximate the trailing edge of wing 16 inboard of winglets 20*a*, 20*b*, respectively. While roll effectors 50*a*, 50*b* are most effective when aircraft 10 is operating in forward flight mode, roll effectors 50*a*, 50*b* may also be used when aircraft 10 is operating in VTOL flight mode and transition flight modes. It is noted that when aircraft 10 is operating in VTOL flight mode and transition flight modes, differential thrust generated by lift fans 22*a*, 22*b* may be used to effectively provide roll control authority. In the embodiment illustrated in FIG. 4A, roll effector system 200 includes active flow control module 54 that is executed by flight control system 44. Roll effector system 200 also includes engine 30 and compressor 46. A roll manifold 202 is coupled to compressor 46 to distribute pressurized air from compressor 46 to upper right injector 204 and lower right injector 206 of roll effector 50*b* and upper left injector 208 and lower left injector 210 of roll effector 50*a*. As discussed herein, each of injectors 204, 206, 208, 210 may be formed from one or more slots or may be formed from a plurality of jets. The injection of pressurized air is controlled by a roll valve system 212 and a roll controller system 214 that includes electro-mechanical actuators in communication with active flow control module 54 that selectively open and close valves within roll valve system 212 for continuous and/or intermittent mass flow injections.

Figure 4B:
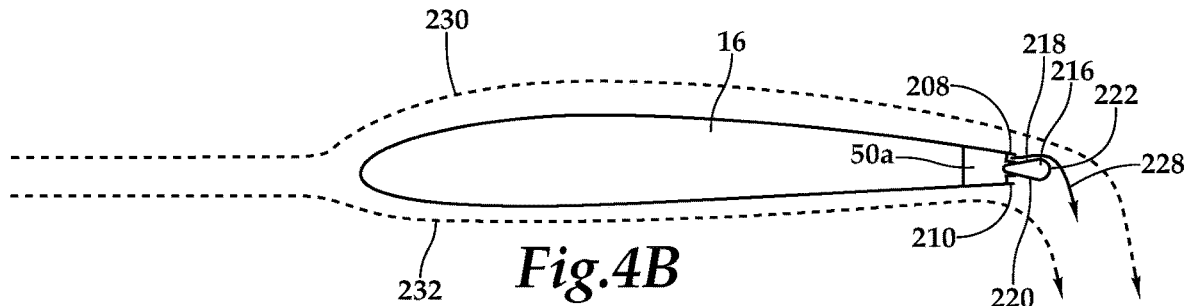
Figure 4C:
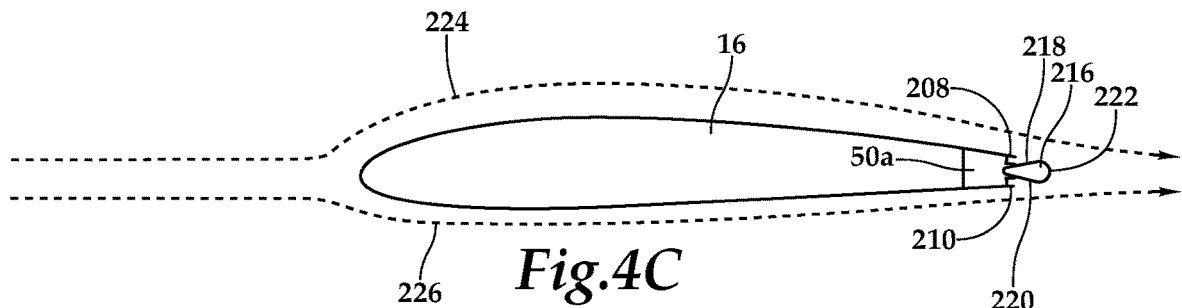
Figure 4D:
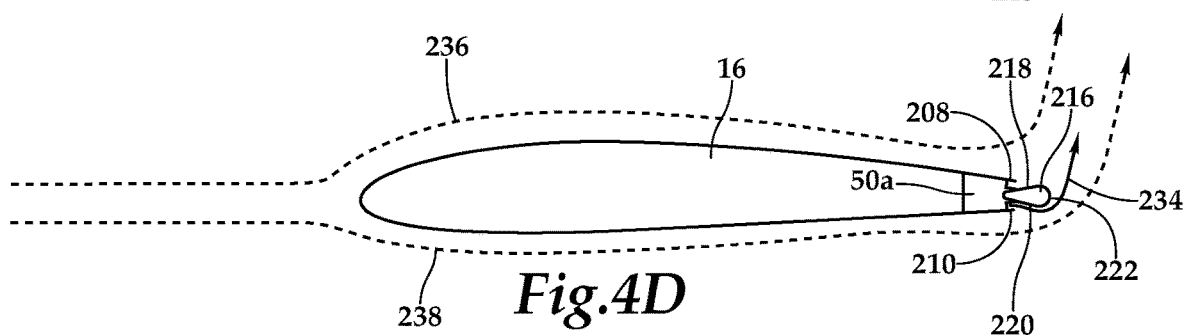

Referring now to FIGS. 4B-4D, the operation of roll effector 50*a* will now be described. It is noted that roll effector 50*a* is substantially similar to roll effector 50*b* therefore, for sake of efficiency, certain features have been disclosed only with regard to roll effector 50*a*. One having ordinary skill in the art, however, will fully appreciate an understanding of roll effector 50*b* based upon the disclosure herein of roll effector 50*a*. FIGS. 4B-4D are schematic cross sectional views of wing 16 of aircraft 10 along a chord that passes through roll effector 50*a*. In the illustrated embodiment, roll effector 50*a* forms a lateral slot in the trailing edge of wing 16 having a generally laterally extending diverter 216 positioned therein. Diverter 216 is disposed between upper left injector 208 and lower left injector 210. Diverter 216 has an upper surface 218, a lower surface 220 and coanda surface 222. In FIG. 4C, roll effector 50*a* is not injecting pressurized air. As a result, airflow across wing 16, as depicted by streamlines 224, 226, is uninfluenced by roll effector 50*a* such that roll effector 50*a* is not generating a roll control moment. In FIG. 4B, roll effector 50*a* is injecting pressurized air from upper left injector 208 substantially tangential to upper surface 218, as indicated by arrow 228. As a result of the high speed mass flow injection of pressurized air, airflow across wing 16 is diverted downwardly due to the coanda effect, as indicated by the trailing ends of streamlines 230, 232, which increases the lift generated by wing 16 proximate roll effector 50*a*, thereby generating a roll right control moment for aircraft 10.

In FIG. 4D, roll effector 50*a* is injecting pressurized air from lower left injector 210 substantially tangential to lower surface 220, as indicated by arrow 234. As a result of the high speed mass flow injection of pressurized air, airflow across wing 16 is diverted upwardly due to the coanda effect, as indicated by the trailing ends of streamlines 236, 238, which decreases the lift generated by wing 16 proximate roll effector 50*a*, thereby generating a roll left control moment. Preferably, roll effectors 50*a*, 50*b* are operated differentially such that when it is desired to generate a roll left control moment, roll effector 50*a* injects pressurized air from lower left injector 210 and roll effector 50*b* injects pressurized air from upper right injector 204 to generate symmetric roll left control moments. Likewise, when it is desired to generate a roll right control moment, roll effector 50*a* injects pressurized air from upper left injector 208 and roll effector 50*b* injects pressurized air from lower right injector 206 to generate symmetric roll right control moments. In this manner, roll effectors 50a, 50b selectively direct the airflow across wing 16 upward or downward to generate roll control moments. It is noted that roll effectors 50a, 50b are operable to inject the pressurized air at a variable intensity such that the rate of roll maneuvers of aircraft 10 can be controlled by changing the intensity level or mass flowrate of the pressurized air.

Figure 5A:
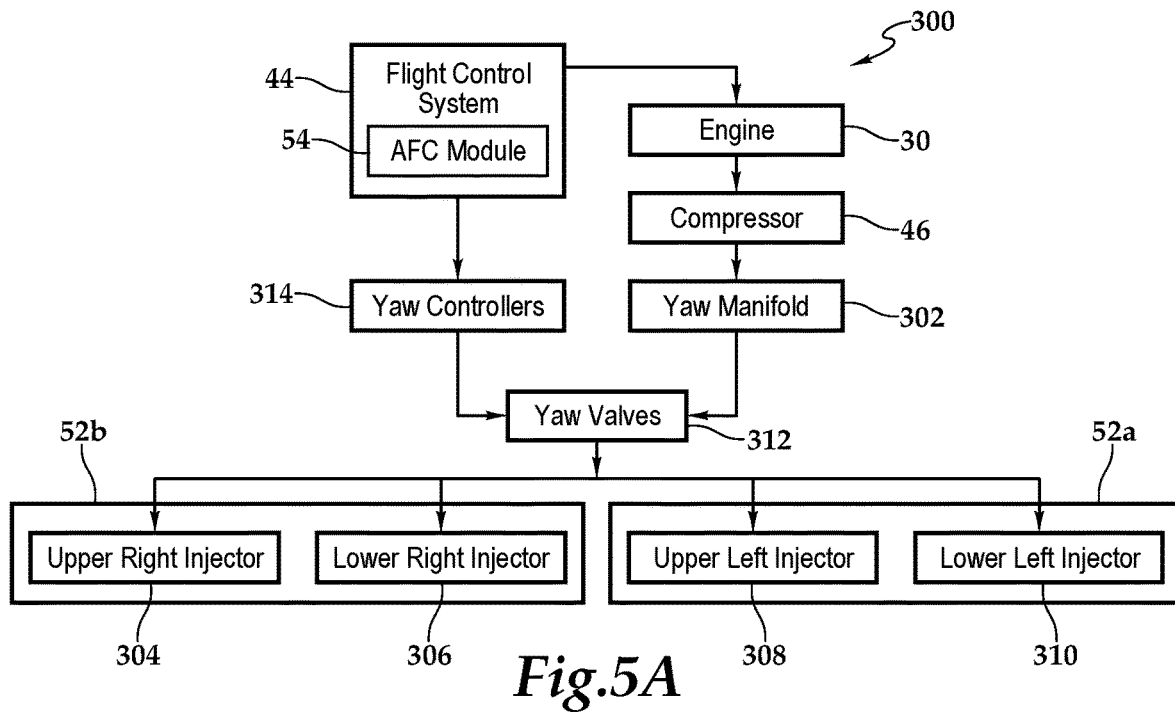
Figure 5B:
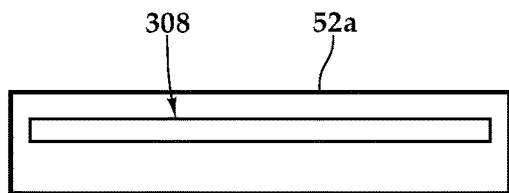
Figure 5C:
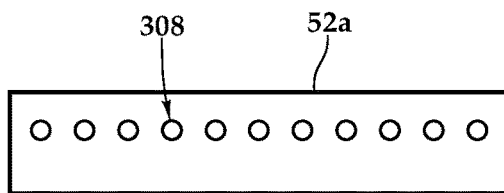
Figure 5G:
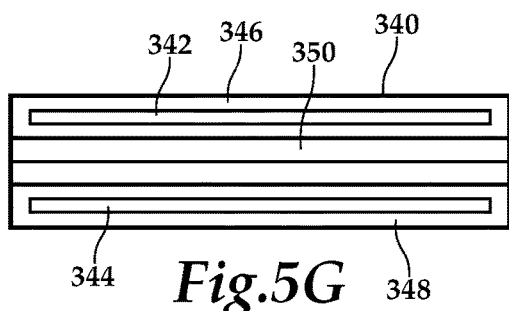
Figure 5H:
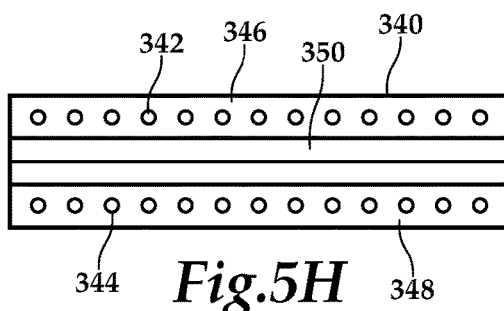

Referring now to FIGS. 1B, 1H and 5A, a portion of the active flow control system that will be referred to herein as yaw effector system 300 will now be described. As best seen in FIG. 1B, yaw effectors 52a, 52b are disposed proximate the trailing edge of winglets 20a, 20b, respectively. While yaw effectors 52a, 52b are most effective when aircraft 10 is operating in forward flight mode; yaw effectors 52a, 52b also have functionality in VTOL flight mode and transition flight modes, as discussed herein. It is noted that when aircraft 10 is operating in VTOL flight mode and transition flight modes, the active flow control system associated with lift fans 22a, 22b may be used to effectively provide yaw control authority. In the embodiment illustrated in FIG. 5A, yaw effector system 300 includes active flow control module 54 that is executed by flight control system 44. Yaw effector system 300 also includes engine 30 and compressor 46. A yaw manifold 302 is coupled to compressor 46 to distribute pressurized air from compressor 46 to upper right injector 304 and lower right injector 306 of yaw effector 52b and upper left injector 308 and lower left injector 310 of yaw effector 52a. As discussed herein, each of injectors 304, 306, 308, 310 may be in the form of one or more slots or a plurality of jets. For example, FIG. 5B is a top view of an embodiment of yaw effector 52a wherein upper left injector 308 is depicted as a single slot. As another example, FIG. 5C is a top view of another embodiment of yaw effector 52a wherein upper left injector 308 is depicted as a plurality of jets. The injection of pressurized air by yaw effector system 300 is controlled by a yaw valve system 312 and a yaw controller system 314 that includes electro-mechanical actuators in communication with active flow control module 54 that selectively open and close valves within yaw valve system 312 for continuous and/or intermittent mass flow injections.

Referring now to FIGS. 5D-5F, the operation a yaw effector 52a will now be described. It is noted that yaw effector 52a is substantially similar to yaw effector 52b therefore, for sake of efficiency, certain features have been disclosed only with regard to yaw effector 52a. One having ordinary skill in the art, however, will fully appreciate an understanding of yaw effector 52b based upon the disclosure herein of yaw effector 52a. FIGS. 5D-5F are schematic cross sectional views of wing 16 of aircraft 10 along a chord that passes through yaw effector 52a. In the illustrated embodiment, yaw effector 52a includes upper left injector 308 and lower left injector 310. In FIG. 5D, yaw effector 52a is not injecting pressurized air from upper left injector 308 or lower left injector 310 such that the airflow across wing 16 is uninfluenced by yaw effector 52a, as indicated by streamlines 316, 318 passing over and under wing 16. In this configuration, yaw effector 52a is not generating a yaw control moment. In FIG. 5E, yaw effector 52a is injecting pressurized air from upper left injector 308 and lower left injector 310 transverse to or substantially normal to the airflow across wing 16 at a first intensity, as indicated by small arrows 320, 322. As a result of the high speed mass flow injection of pressurized air, the airflow above wing 16 proximate yaw effector 52a is deflected or diverted upward, as indicated by the trailing end of streamline 324 and the airflow below wing 16 proximate yaw effector 52a is deflected or diverted downward, as indicated by the trailing end of streamline 326. In this configuration, yaw effector 52a is disrupting the airflow across wing 16 proximate yaw effector 52a creating a drag rudder in the form of a fluidic split flap, thereby generating a yaw left control moment.

It is noted that yaw effectors 52a, 52b are operable to inject the pressurized air at a variable intensity such that the rate of yaw maneuvers of aircraft 10 can be controlled by changing the intensity level or mass flowrate of the pressurized air. For example, as illustrated in FIG. 5F, yaw effector 52a is injecting pressurized air from upper left injector 308 and lower left injector 310 transverse to or substantially normal to the airflow across wing 16 at a second intensity that is greater than the first intensity, as indicated by large arrows 328, 330. As a result of the high speed mass flow injection of pressurized air, the airflow above wing 16 proximate yaw effector 52a is deflected or diverted upward, as indicated by the trailing end of streamline 332 and the airflow below wing 16 proximate yaw effector 52a is deflected or diverted downward, as indicated by the trailing end of streamline 334. In this configuration, yaw effector 52a creates a larger disruption in the airflow across wing 16 proximate yaw effector 52a creating a larger drag rudder and thus a larger yaw left control moment.

For effective yaw authority, the operation of yaw effectors 52a, 52b is coordinated such that when a yaw left control moment is desired, left yaw effector 52a injects pressurized air while right yaw effector 52b does not inject pressurized air or left yaw effector 52a injects pressurized air at a greater intensity than right yaw effector 52b. Similarly, when a yaw right control moment is desired, right yaw effector 52b injects pressurized air while left yaw effector 52a does not inject pressurized air or right yaw effector 52b injects pressurized air at a greater intensity than left yaw effector 52a. In this manner, yaw effectors 52a, 52b selectively direct the airflow across wing 16 upward and downward to generate yaw control moments.

In addition to generating yaw control moments during forward flight, yaw effectors 52a, 52b are also configurable to generate roll control moments in hover. For example, to generate roll right control moments, yaw effector 52a injects pressurized air from lower left injector 310 while at the same time, yaw effector 52b injects pressurized air from upper right injector 304. As a result of the high speed mass flow of pressurized air injected from yaw effectors 52a, 52b, aircraft 10 is urged to rotate about longitudinal axis 10a in a roll right maneuver during hover. Similarly, to generate roll left control moments, yaw effector 52a injects pressurized air from upper left injector 308 while at the same time, yaw effector 52b injects pressurized air from lower right injector 306. As a result of the high speed mass flow of pressurized air injected from yaw effectors 52a, 52b, aircraft 10 is urged to rotate about longitudinal axis 10a in a roll left maneuver during hover. In this manner, differential operation of yaw effectors 52a, 52 can be used to generate roll control moments in hover. During this operation, yaw effectors 52a, 52 could also be referred to as roll effectors 52a, 52b. It is noted that roll effectors 52a, 52b are operable to inject the pressurized air at a variable intensity such that the rate of roll maneuvers of aircraft 10 can be controlled by changing the intensity level or mass flowrate of the pressurized air.

Referring now to FIGS. 5G-5K, another embodiment of a yaw effector 340 will now be described. It is noted that one yaw effector 340 would preferably be used as the left yaw effector while another yaw effector 340 is being used as the right yaw effector. Yaw effector 340 includes an upper injector 342 and lower injector 344 that are depicted as slots in FIG. 5G and as a plurality of jets in FIG. 5H. Yaw effector 340 also includes an upper flow disrupter 346, a lower flow disrupter 348 and an aftwardly extending airfoil extension 350, as best seen in FIGS. 5I-5K. In the illustrated embodiment, upper flow disrupter 346 and lower flow disrupter 348 are discontinuities or step changes in the airfoil surface of wing 16 which cause airflow across wing 16 at yaw effector 340 to separate from the wing surface and/or become turbulent. In FIG. 5K, yaw effector 340 is not injecting pressurized air from upper injector 342 or lower injector 344. As a result, airflow across wing 16 is influenced by upper flow disrupter 346 and lower flow disrupter 348, as indicated by the separation and/or turbulence at the trailing ends of streamlines 352, 354 passing over and under wing 16. This flow separation and/or turbulence creates a drag rudder proximate yaw effector 340 generating a yaw control moment.

In FIG. 5J, yaw effector 340 is injecting pressurized air from upper injector 342 and lower injector 344 tangential or substantially tangential to airfoil extension 350 at a first intensity, as indicated by small arrows 356, 358. As a result of the high speed mass flow injection of pressurized air, the flow separation and/or turbulence of the airflow above and below wing 16 proximate yaw effector 52a is significantly reduced, as indicated by the trailing end of streamlines 360, 362 passing over and under wing 16. The reduction in flow separation and/or turbulence lowers the drag proximate yaw effector 340 such that yaw effector 340 forms a fluidic airfoil extension. This configuration is preferably the default configuration of yaw effector 340 during forward flight in which yaw effector 340 is not generating a yaw control moment. In FIG. 5I, yaw effector 340 is injecting pressurized air from upper injector 342 and lower injector 344 tangential or substantially tangential to airfoil extension 350 at a second intensity that is greater than the first intensity, as indicated by large arrows 364, 366. As a result of the high speed mass flow injection of pressurized air, the flow separation and/or turbulence of the airflow above and below wing 16 proximate yaw effector 52a is not only eliminated, as indicated by the trailing end of streamlines 366, 368 passing over and under wing 16, but the mass flow of the pressurized air generates substantial forward thrust. This added forward thrust created by yaw effector 340 generates a yaw control moment.

For effective yaw authority, the operation of a left yaw effector 340 and a right yaw effector 340 are coordinated such that when a yaw left control moment is desired, left yaw effector 340 transitions from injecting pressurized air at the first intensity (FIG. 5J) to not injecting pressurized air (FIG. 5K) and/or right yaw effector 340 transitions from injecting pressurized air at the first intensity (FIG. 5J) to injecting pressurized air at the second intensity (FIG. 5I). Similarly, when a yaw right control moment is desired, left yaw effector 340 transitions from injecting pressurized air at the first intensity (FIG. 5J) to injecting pressurized air at the second intensity (FIG. 5I) and/or right yaw effector 340 transitions from injecting pressurized air at the first intensity (FIG. 5J) to not injecting pressurized air (FIG. 5K). In this manner, an aircraft with using yaw effectors 340 selectively adjusts the amount of drag created as the airflow across wing 16 passes over and under yaw effectors 340 to generate yaw control moments.

In addition to generating yaw control moments during forward flight, yaw effectors 340 are also configurable to generate yaw control moments in hover. For example, when a yaw right control moment is desired, left yaw effector 340 would inject pressurized air aftwardly from upper injector 342 and lower injector 344 at the second intensity while right yaw effector 340 would not inject pressurized air. Similarly, when a yaw left control moment is desired, right yaw effector 340 would inject pressurized air aftwardly from upper injector 342 and lower injector 344 at the second intensity while left yaw effector 340 would not inject pressurized air. In this manner, the selective aftward injection of high speed mass flows of pressurized air from yaw effectors 340 generates yaw control moments during hover.

Even though aircraft 10 has been described and depicted as having an active flow control system that controls high speed mass flow injections of pressurized air to the lift fan injector system, the pitch effector system, the roll effector system and the yaw effector system to influence lift coefficients, generate control moments and generate thrust vectors, it should be understood by those having ordinary skill in the art that pitch, roll and yaw authority in certain flight modes could alternatively or additionally be provided using mechanical deflectors such as ailerons, elevators, rudders, flaps or other aerodynamic surfaces. For example, pitch control authority could be achieved by collectively shifting upper expansion ramp 112 and lower expansion ramp 114 of thruster nozzle 42 to direct propulsive gas 124 upward and downward to generate pitch control moments.

Figure 6B:
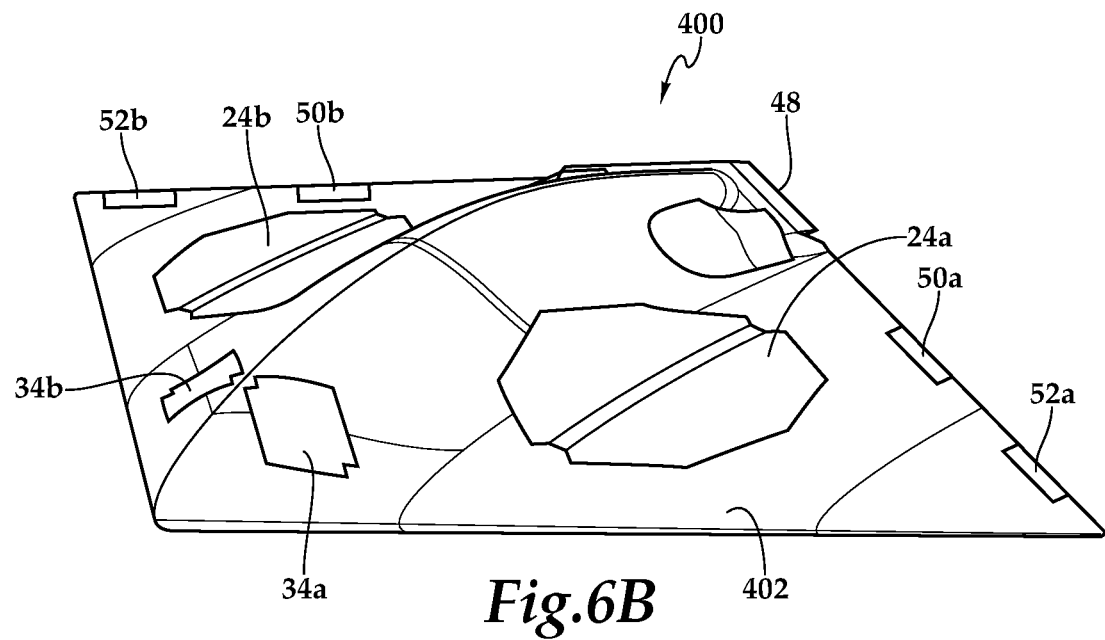
FIGS. 6A-6F are schematic illustrations of a fan-in-wing blended wing body aircraft and component parts thereof in accordance with embodiments of the present disclosure.
Figure 6A:
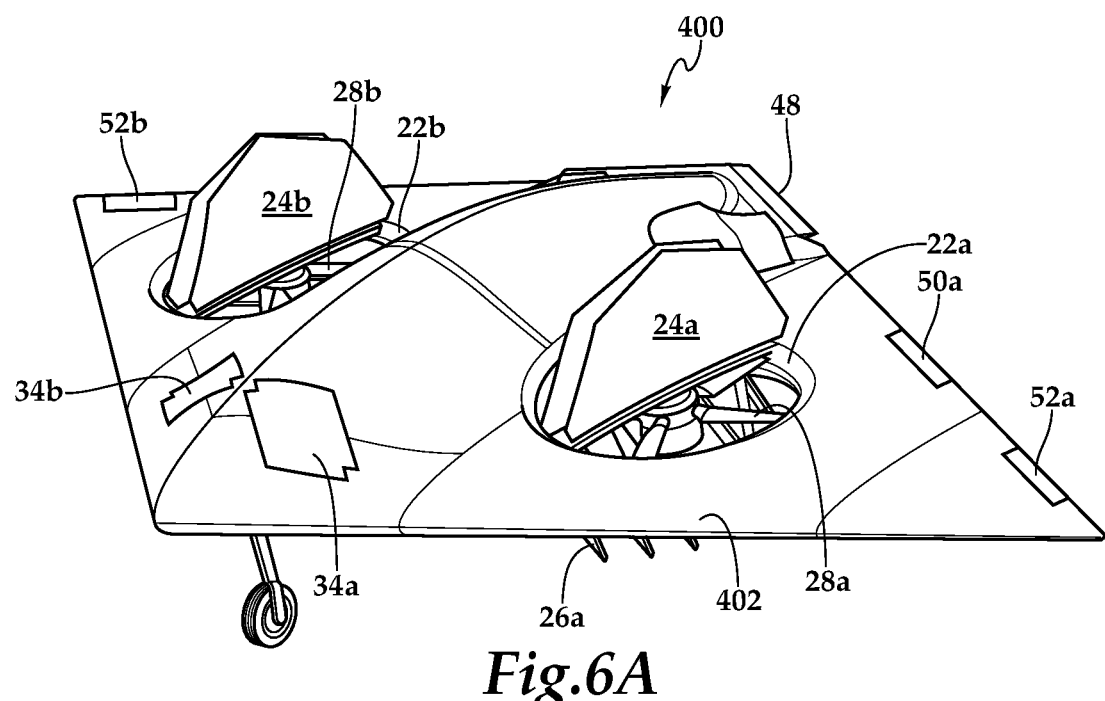
Figure 6D:
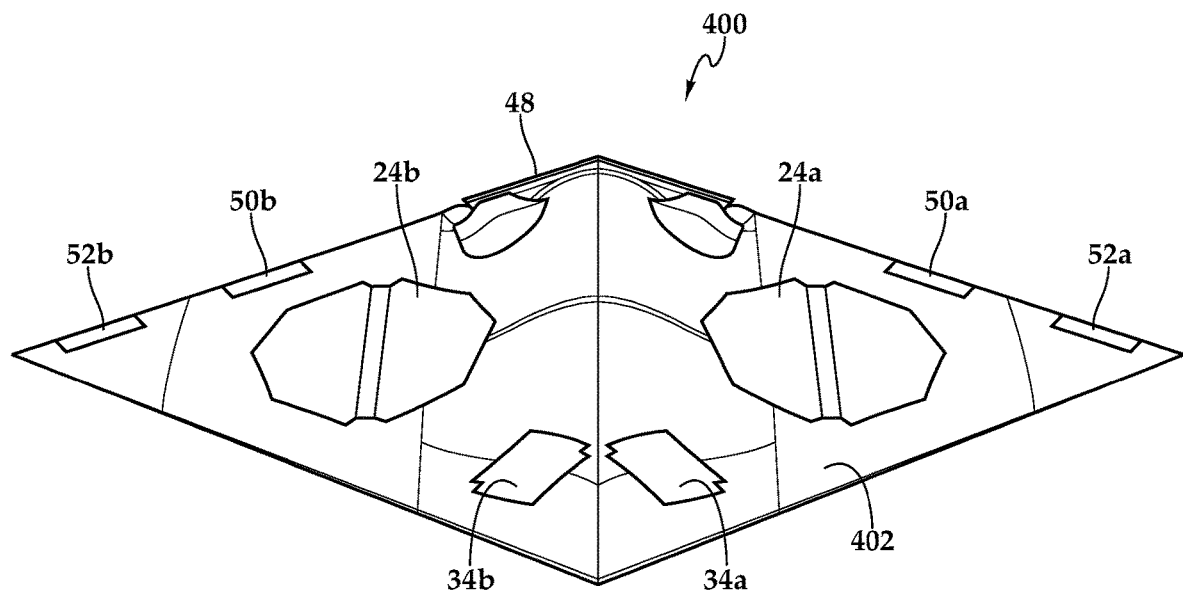
Figure 6C:
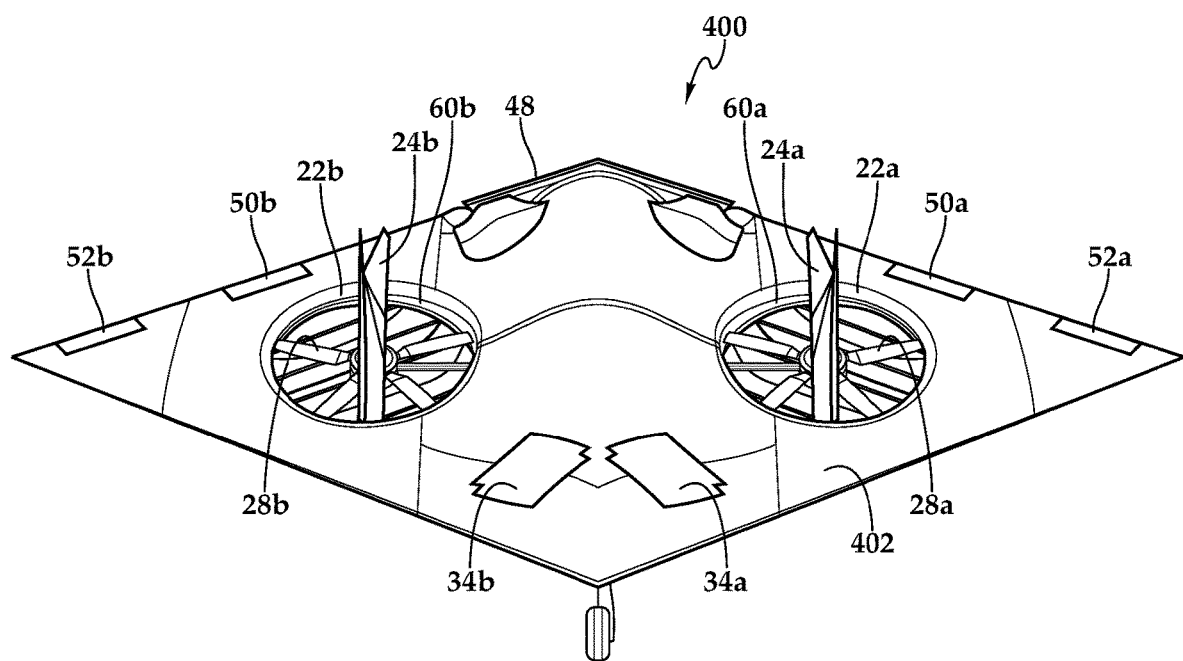
Figure 6F:
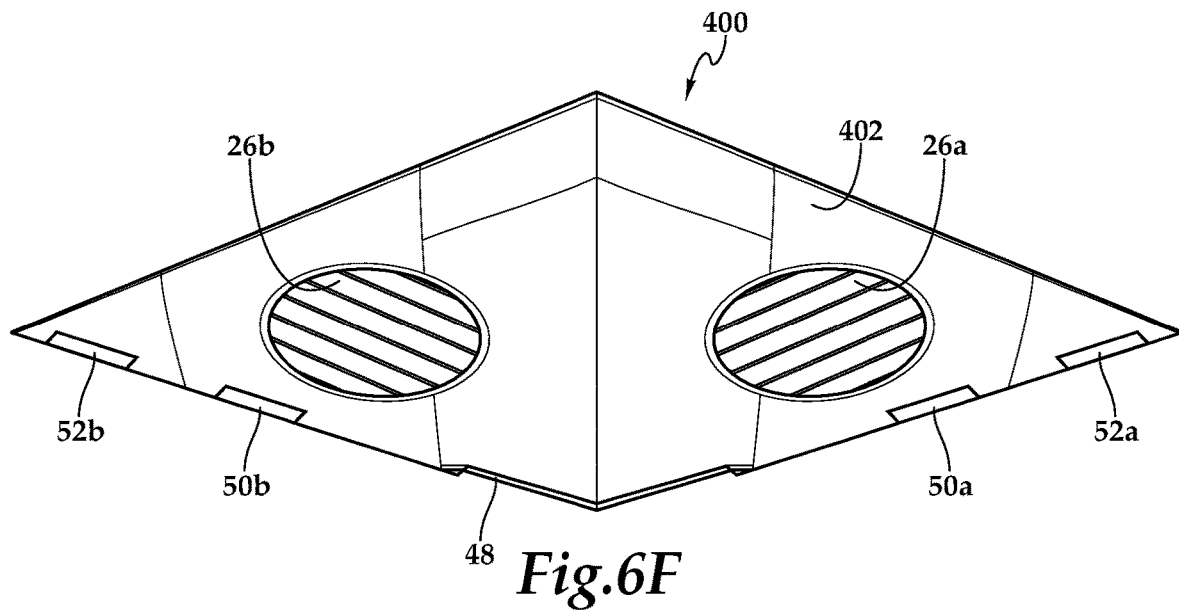
Figure 6E:
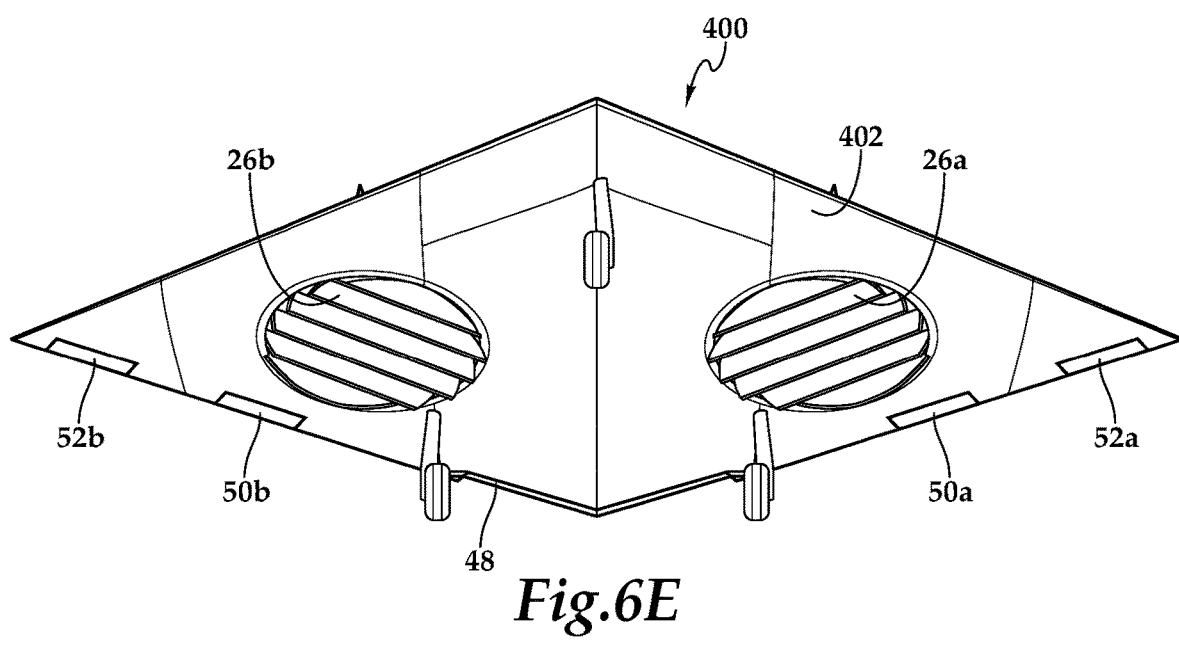

Referring next to FIGS. 6A-6F in the drawings, various views of a fan-in-wing blended wing body aircraft 400 operable to transition between thrust-borne lift in a VTOL orientation and wing-borne lift in a forward flight orientation are depicted. FIGS. 6A, 6C and 6E depict aircraft 400 in the VTOL orientation wherein a lift fan system provides thrust-borne lift to the aircraft. FIGS. 6B, 6D and 6F depict aircraft 400 in the forward flight orientation wherein a forced air bypass system provides bypass air that combines with engine exhaust to generate forward thrust with the forward airspeed of aircraft 400 providing wing-borne lift enabling aircraft 400 to have a high speed, high endurance, low observable forward flight mode. Aircraft 400 shares many common elements with aircraft 10 with the exception that the blended wing body airframe 402 of aircraft 400 has a rhombus shaped body without the winglets of aircraft 10. Similar to aircraft 10 and with reference to FIGS. 1H-1G, aircraft 400 has a lift fan system including lift fans 22a, 22b in a tandem lateral orientation, butterfly doors 24a, 24b, louvers 26a, 26b, rotor assemblies 28a, 28b, a turboshaft engine 30 and a transmission 32. Aircraft 400 also has a forced air bypass system that includes inlets 34a, 34b, bypass fans 36a, 36b and bypass ducts 38a, 38b that are coupled to an exhaust system 40 configured with a thruster nozzle 42.

Referring also to FIGS. 2A, 3A, 4A and 5A, aircraft 400 has an active flow control system that includes an active flow control module 54 executed by flight control system 44, engine 30 and compressor 46 as well as manifold systems, valve systems and controller systems that regulate the flow of high pressure air to the lift fan injector system including lift fan injectors 60a, 60b, the pitch effector system including pitch effector 48, the roll effector system including roll effectors 50a, 50b and the yaw effector system including yaw effectors 52a, 52b. The active flow control system controls the selective high speed mass flow injections of pressurized air that influence lift coefficients, generate control moments and generate thrust vectors for aircraft 400 during VTOL, forward and transition flight modes, as discussed herein.

Certain flight control operations of aircraft 400 are substantially similar to that of aircraft 10. For example, pitch control authority in VTOL mode, forward flight mode and transition modes is provided by pitch effector 48. Roll control authority in VTOL mode is provided by lift fans 22a, 22b. Roll control authority in forward flight mode is provided by roll effectors 50a, 50b. Roll control authority in transition modes is provided by lift fans 22a, 22b and/or roll effectors 50a, 50b. Yaw control authority in VTOL and transition modes is provided by lift fans 22a, 22b and/or yaw effectors 52a, 52b. Yaw control authority in forward flight mode is provided by yaw effectors 52a, 52b. Translation authority in VTOL mode is provided by lift fans 22a, 22b.

Figure 7B:
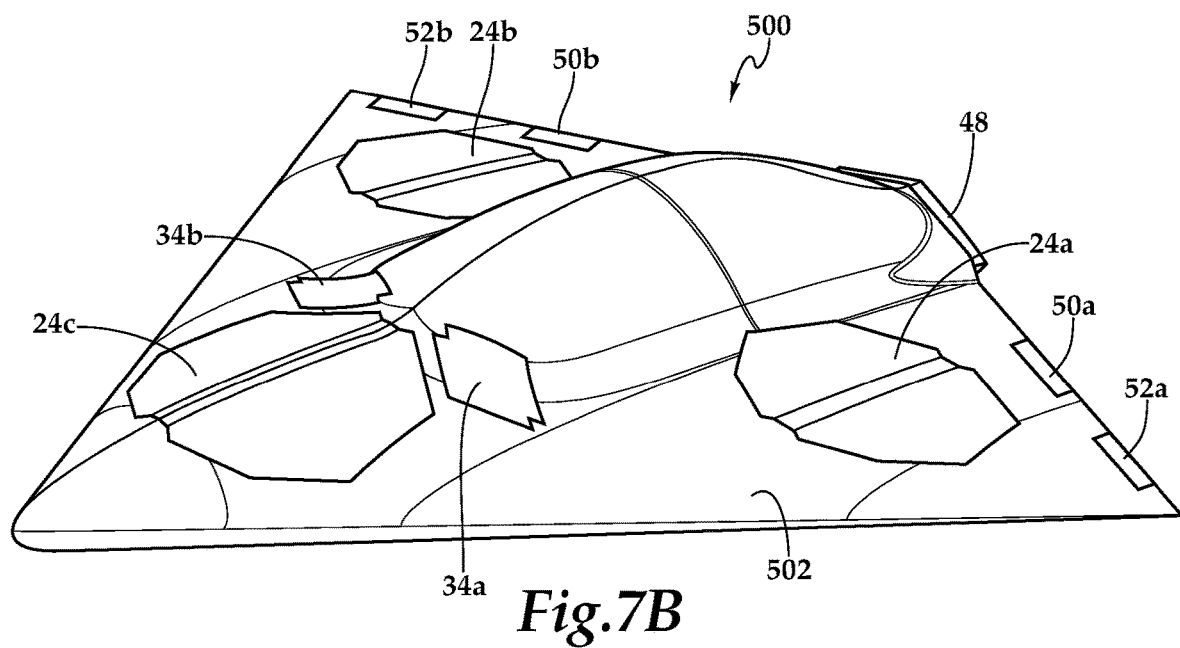
FIGS. 7A-7I are schematic illustrations of a fan-in-wing blended wing body aircraft and component parts thereof in accordance with embodiments of the present disclosure.
Figure 7A:
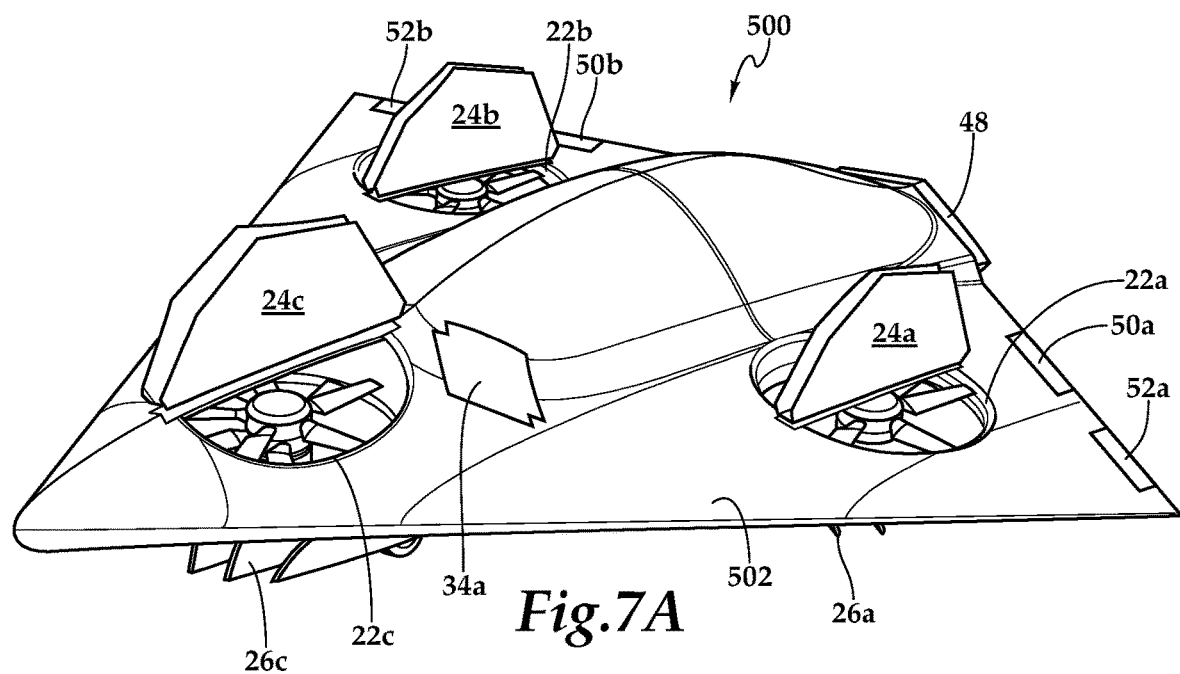
Figure 7D:
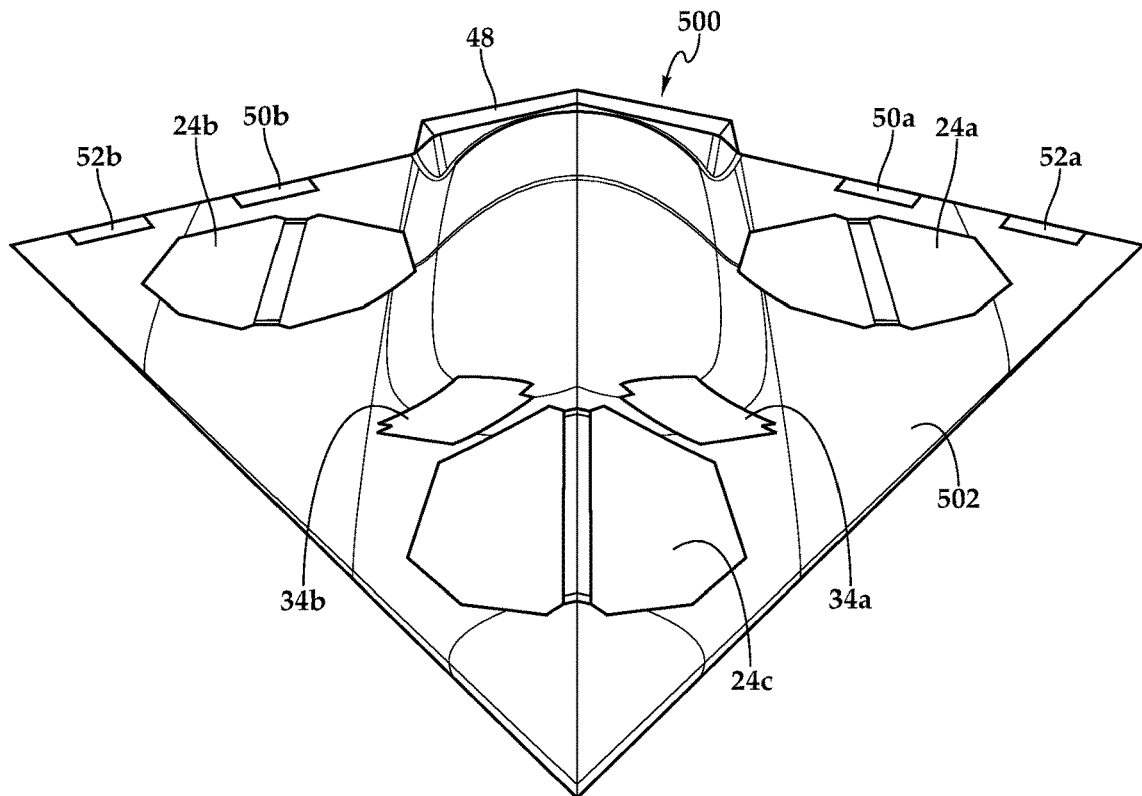
Figure 7C:
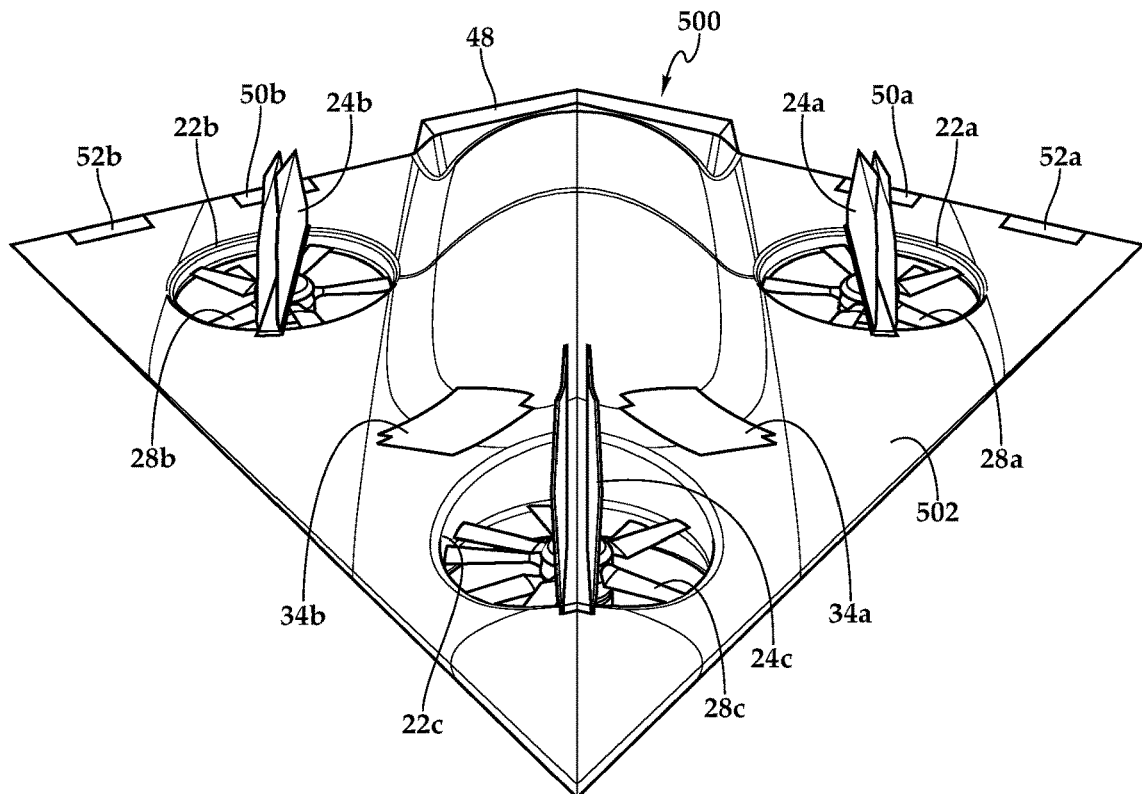
Figure 7F:
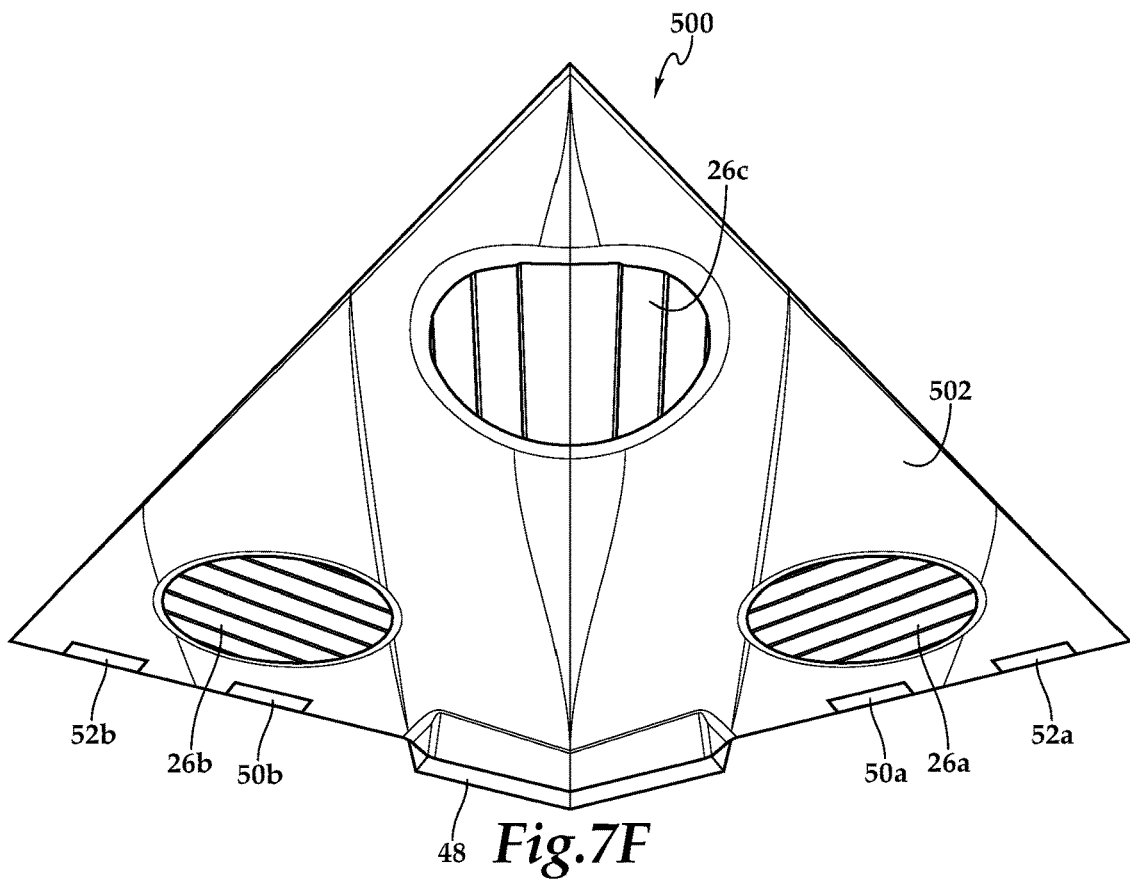
Figure 7E:
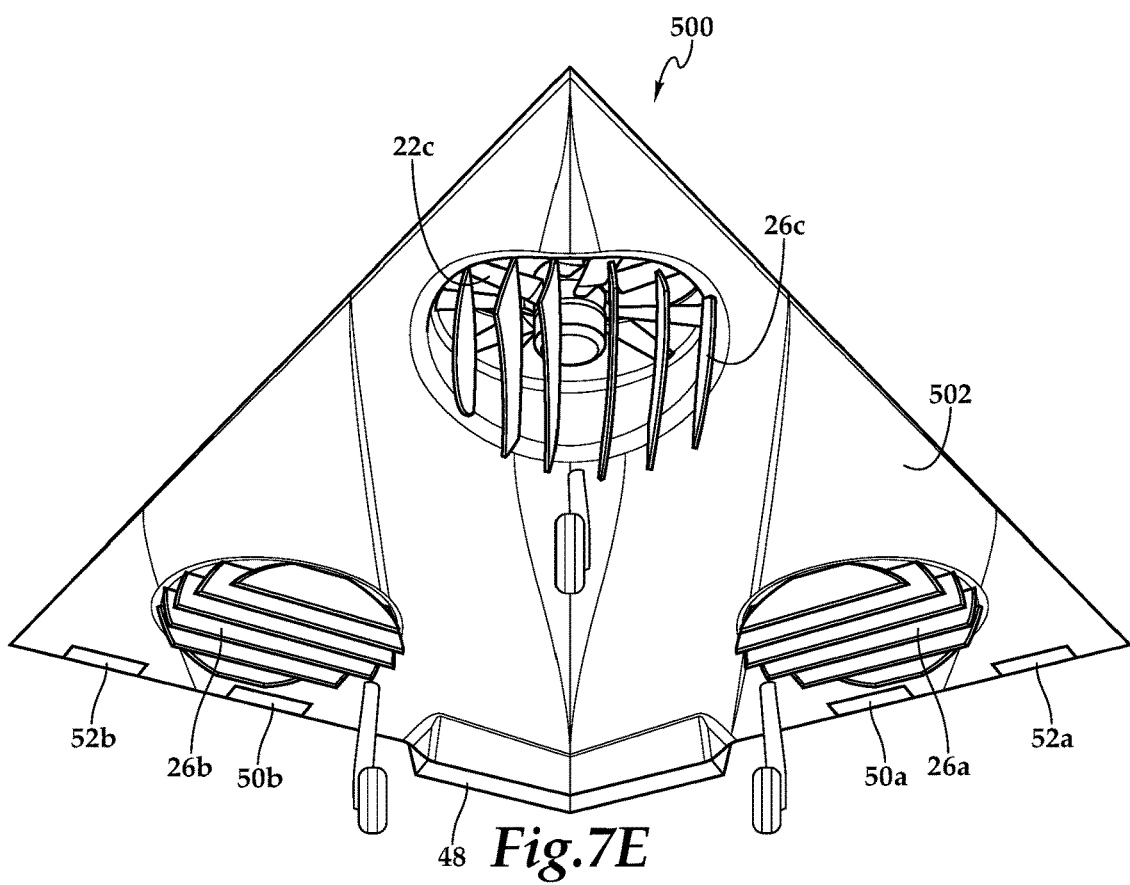
Figure 7G:
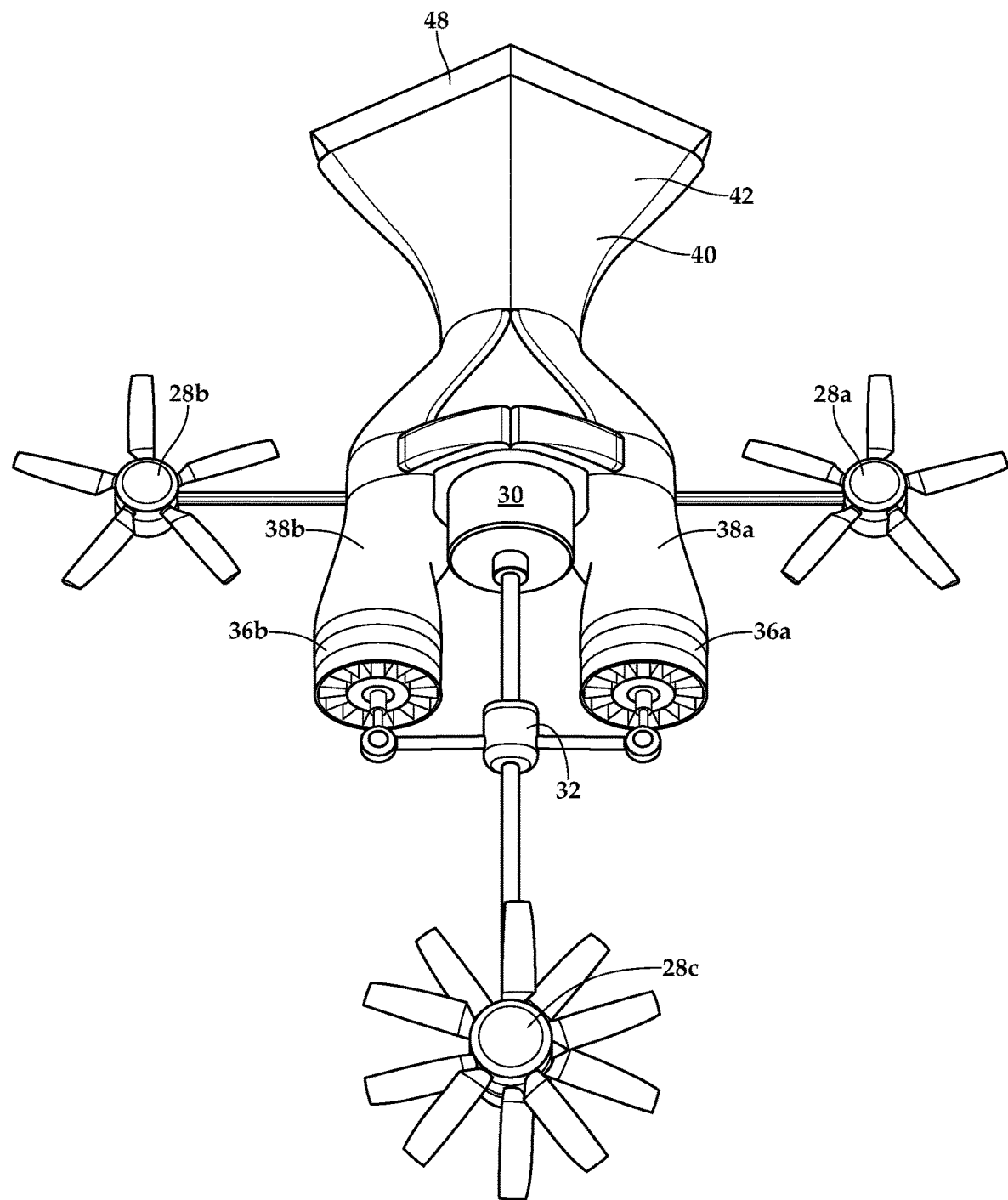
Figure 7I:
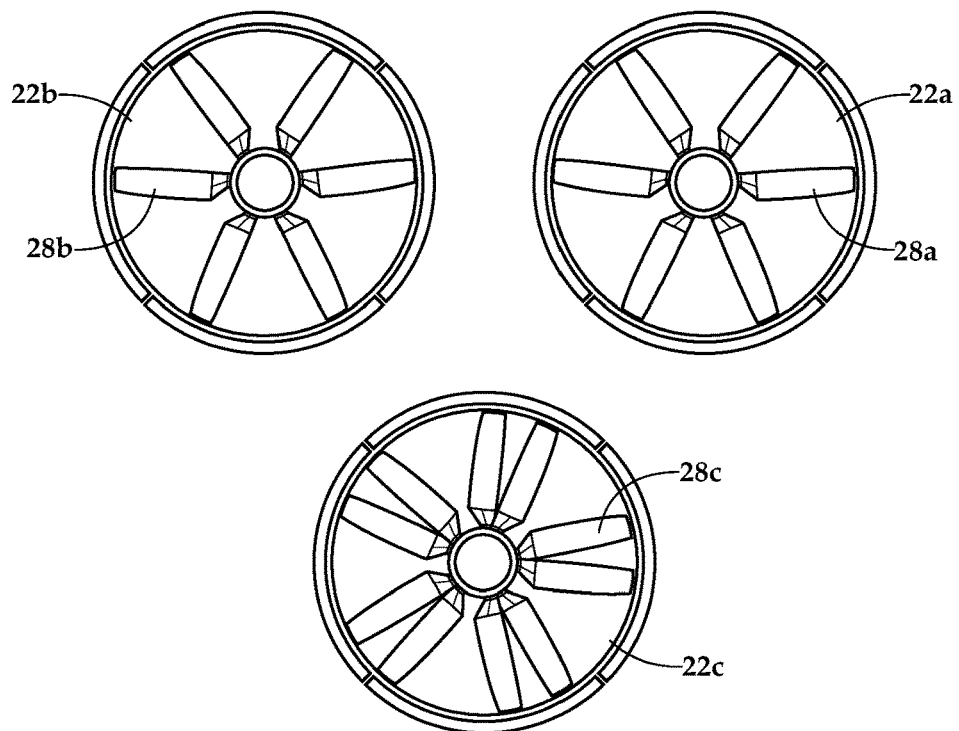
Figure 7H:
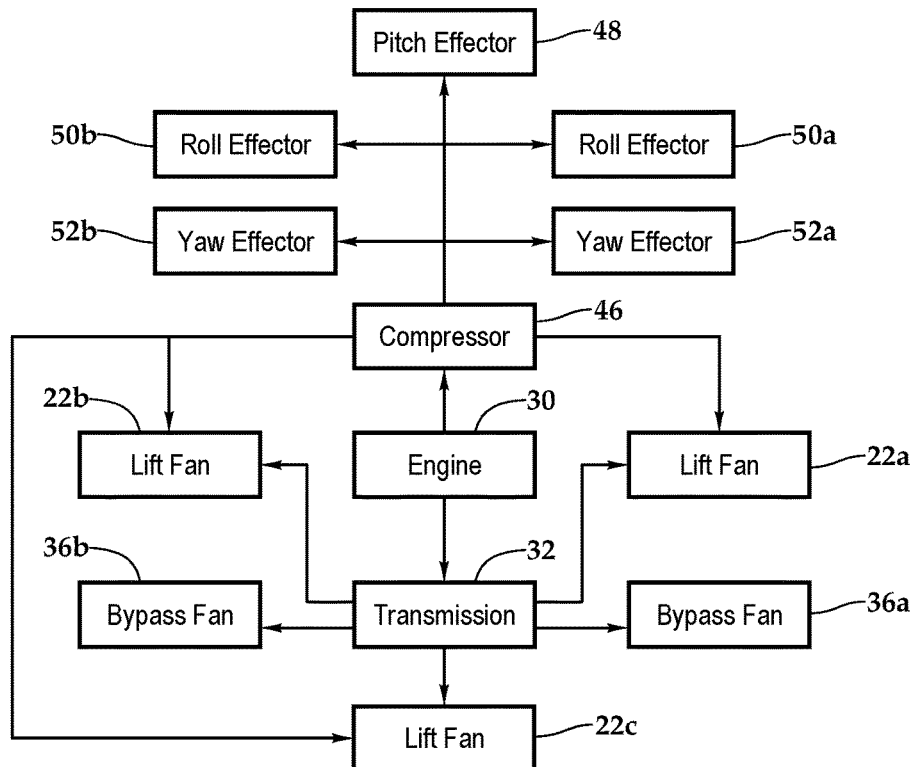

Referring next to FIGS. 7A-7I in the drawings, various views of a fan-in-wing blended wing body aircraft 500 operable to transition between thrust-borne lift in a VTOL orientation and wing-borne lift in a forward flight orientation are depicted. FIGS. 7A, 7C and 7E depict aircraft 500 in the VTOL orientation wherein a lift fan system provides thrust-borne lift to the aircraft. FIGS. 7B, 7D and 7F depict aircraft 500 in the forward flight orientation wherein a forced air bypass system provides bypass air that combines with engine exhaust to generate forward thrust with the forward airspeed of aircraft 500 providing wing-borne lift enabling aircraft 500 to have a high speed, high endurance, low observable forward flight mode. Aircraft 500 shares many common elements with aircraft 10 with the exception that the blended wing body airframe 502 of aircraft 500 has a kite shaped body without the winglets of aircraft 10 and aircraft 500 has a lift fan system with three lift fans. Specifically, the lift fan system of aircraft 500 includes lift fans 22a, 22b, 22c in a tandem lateral and forward orientation, butterfly doors 24a, 24b, 24c, louvers 26a, 26b, 26c, rotor assemblies 28a, 28b, 28c, turboshaft engine 30 and transmission 32. In the illustrated embodiment, rotor assemblies 28a, 28b are depicted as having a single rotor system while rotor assembly 28c is depicted as having a coaxial rotor system with two counter-rotating rotor assemblies. Aircraft 500 also has a forced air bypass system that includes inlets 34a, 34b, bypass fans 36a, 36b and bypass ducts 38a, 38b that are coupled to an exhaust system 40 configured with a thruster nozzle 42.

Similar to aircraft 10, aircraft 500 has an active flow control system that includes an active flow control module 54 executed by flight control system 44, engine 30 and compressor 46 as well as manifold systems, valve systems and controller systems (see also FIGS. 2A, 3A, 4A and 5A) that regulate the flow of high pressure air to the lift fan injector system, the pitch effector system including pitch effector 48, the roll effector system including roll effectors 50a, 50b and the yaw effector system including yaw effectors 52a, 52b. The active flow control system controls the selective high speed mass flow injections of pressurized air that influence lift coefficients, generate control moments and generate thrust vectors for aircraft 500 during VTOL, forward and transition flight modes, as discussed herein.

Certain flight control operations of aircraft 500 will now be described. Pitch control authority in VTOL mode is provided by lift fan 22c. Pitch control authority in forward flight mode is provided by pitch effector 48. Pitch authority in transition modes is provided by lift fan 22c and/or pitch effector 48. Roll control authority in VTOL mode is provided by lift fans 22a, 22b. Roll control authority in forward flight mode is provided by roll effectors 50a, 50b. Roll control authority in transition modes is provided by lift fans 22a, 22b and/or roll effectors 50a, 50b. Yaw control authority in VTOL and transition modes is provided by lift fans 22a, 22b, 22c and/or yaw effectors 52a, 52b. Yaw control authority in forward flight mode is provided by yaw effectors 52a, 52b. Translation authority in VTOL mode is provided by lift fans 22a, 22b, 22c.

Figure 8B:
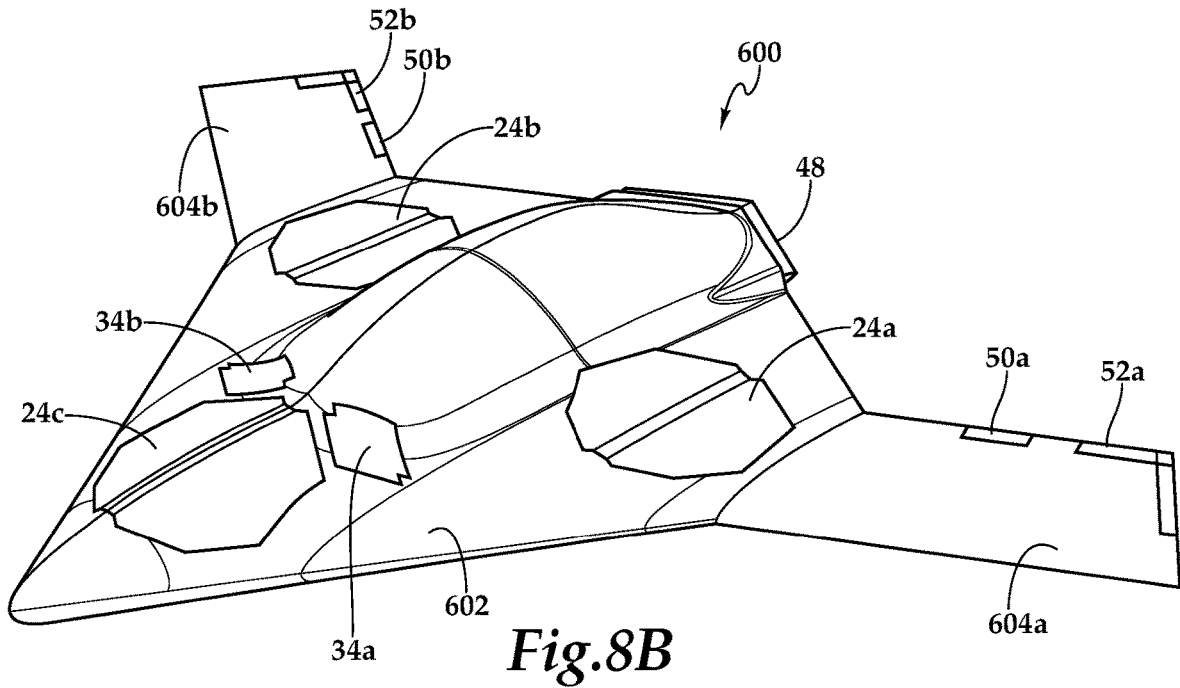
FIGS. 8A-8F are schematic illustrations of a fan-in-wing blended wing body aircraft in accordance with embodiments of the present disclosure.
Figure 8A:
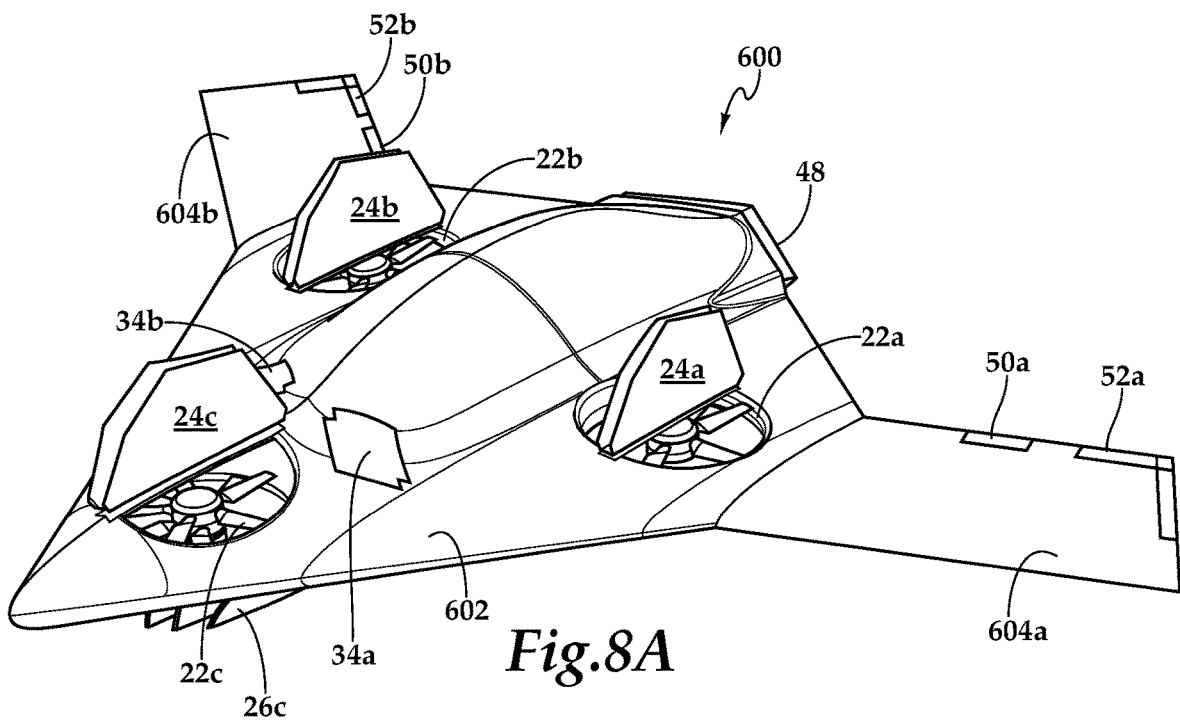
Figure 8D:
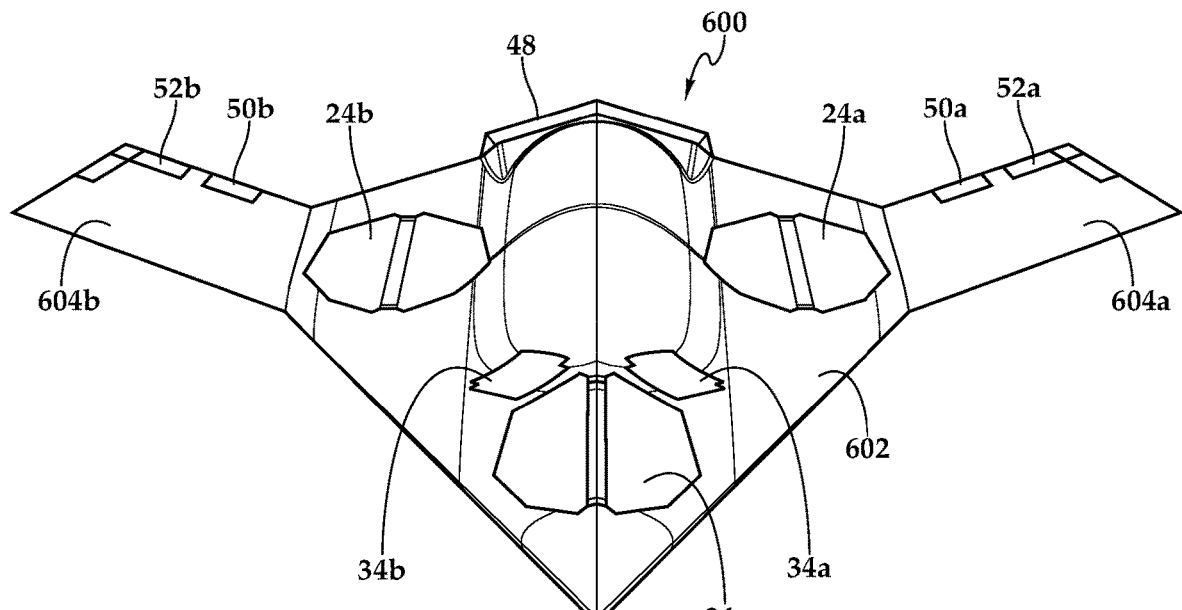
Figure 8C:
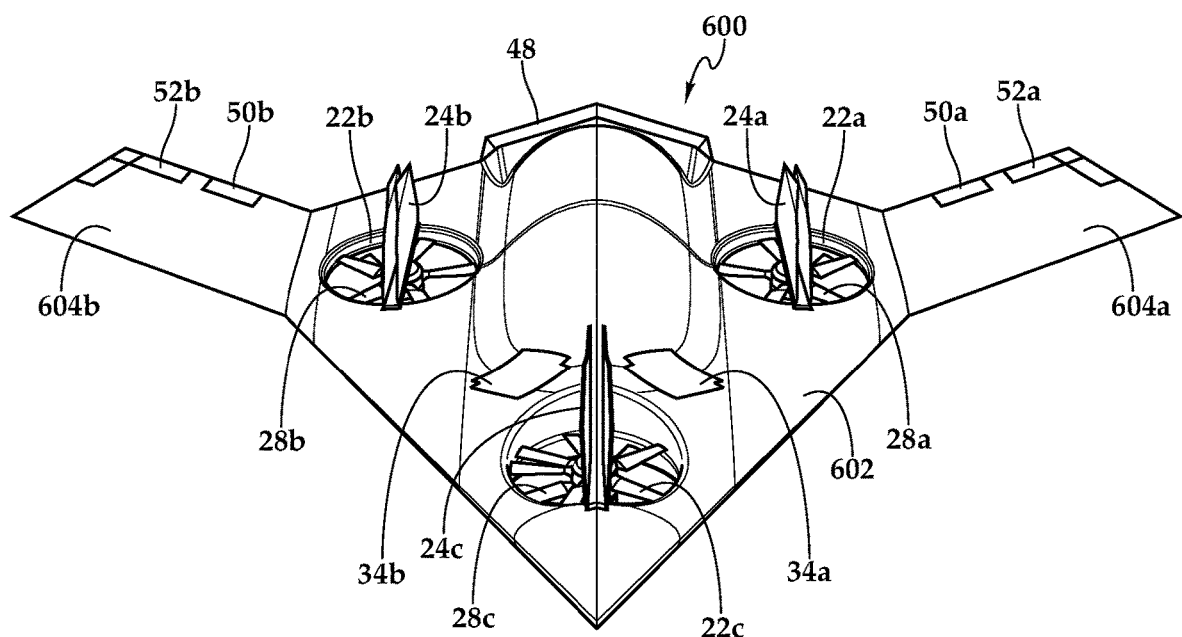
Figure 8F:
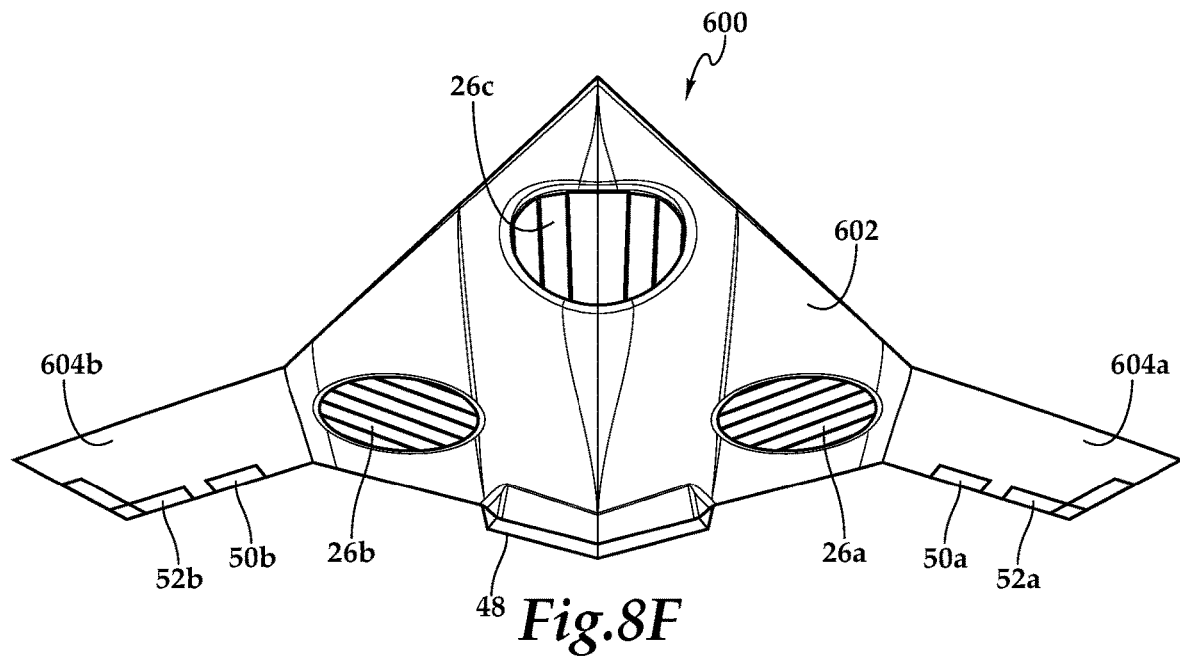
Figure 8E:
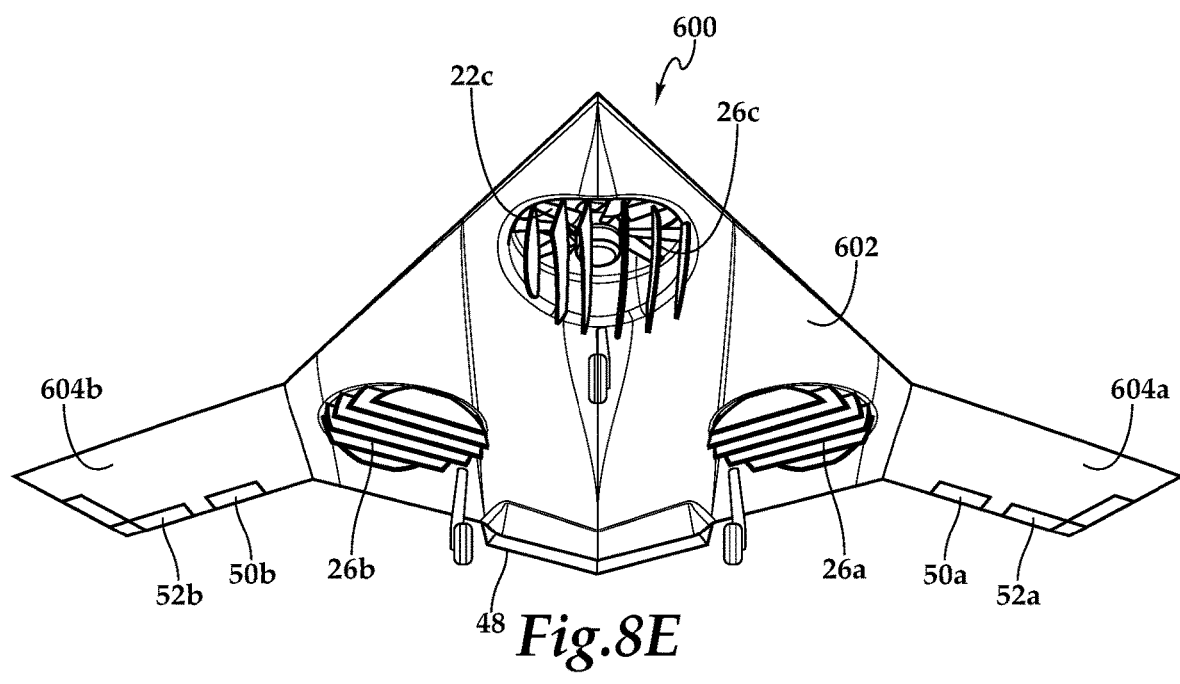

Referring next to FIGS. 8A-8F in the drawings, various views of a fan-in-wing blended wing body aircraft 600 operable to transition between thrust-borne lift in a VTOL orientation and wing-borne lift in a forward flight orientation are depicted. FIGS. 8A, 8C and 8E depict aircraft 600 in the VTOL orientation wherein a lift fan system provides thrust-borne lift to the aircraft. FIGS. 8B, 8D and 8F depict aircraft 600 in the forward flight orientation wherein a forced air bypass system provides bypass air that combines with engine exhaust to generate forward thrust with the forward airspeed of aircraft 600 providing wing-borne lift enabling aircraft 600 to have a high speed, high endurance, low observable forward flight mode. Aircraft 600 shares many common elements with aircraft 500 with the exception that the blended wing body airframe 602 of aircraft 600 has a kite shaped body with winglets 604a, 604b. Aircraft 600 has a lift fan system including lift fans 22a, 22b, 22c in a tandem lateral and forward orientation, butterfly doors 24a, 24b, 24c, louvers 26a, 26b, 26c, rotor assemblies 28a, 28b, 28c, turboshaft engine 30 and transmission 32 (see also FIGS. 7G-7I). Aircraft 600 also has a forced air bypass system that includes inlets 34a, 34b, bypass fans 36a, 36b and bypass ducts 38a, 38b that are coupled to an exhaust system 40 configured with a thruster nozzle 42.

Aircraft 600 has an active flow control system that includes an active flow control module 54 executed by flight control system 44, engine 30 and compressor 46 as well as manifold systems, valve systems and controller systems (see also FIGS. 2A, 3A, 4A and 5A) that regulate the flow of high pressure air to the lift fan injector system, the pitch effector system including pitch effector 48, the roll effector system including roll effectors 50a, 50b and the yaw effector system including yaw effectors 52a, 52b. The active flow control system controls the selective high speed mass flow injections of pressurized air that influence lift coefficients, generate control moments and generate thrust vectors for aircraft 600 during VTOL, forward and transition flight modes, as discussed herein.

Certain flight control operations of aircraft 600 will now be described. Pitch control authority in VTOL mode is provided by lift fan 22c. Pitch control authority in forward flight mode is provided by pitch effector 48. Pitch authority in transition modes is provided by lift fan 22c and/or pitch effector 48. Roll control authority in VTOL mode is provided by lift fans 22a, 22b. Roll control authority in forward flight mode is provided by roll effectors 50a, 50b. Roll control authority in transition modes is provided by lift fans 22a, 22b and/or roll effectors 50a, 50b. Yaw control authority in VTOL and transition modes is provided by lift fans 22a, 22b, 22c and/or yaw effectors 52a, 52b. Yaw control authority in forward flight mode is provided by yaw effectors 52a, 52b. Translation authority in VTOL mode is provided by lift fans 22a, 22b, 22c.

Figure 9B:
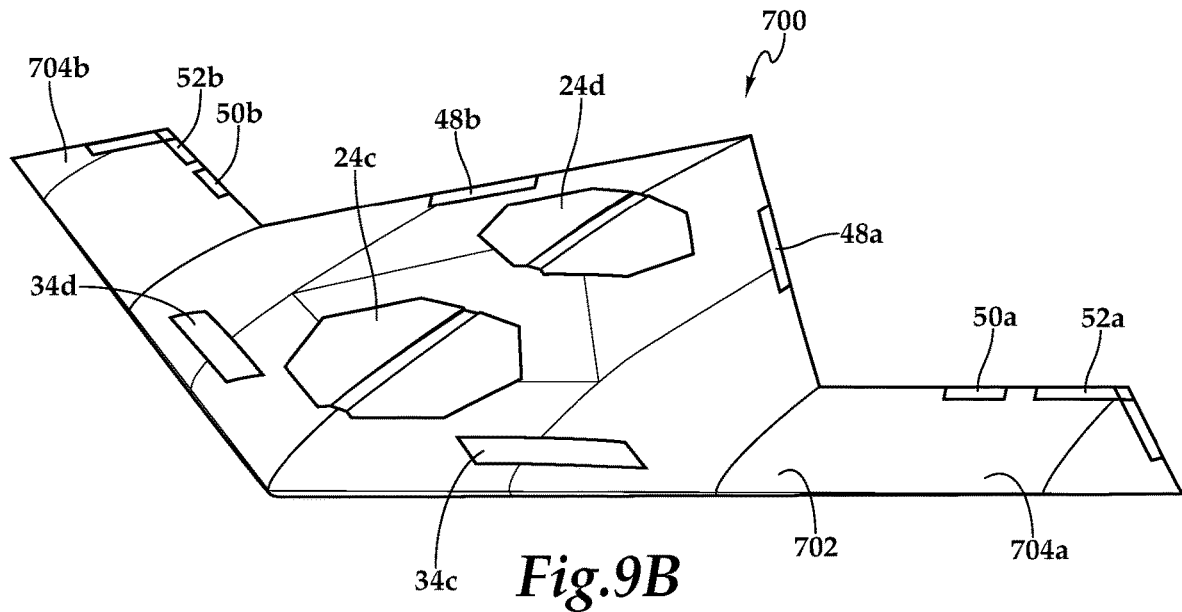
FIGS. 9A-9I are schematic illustrations of a fan-in-wing blended wing body aircraft and component parts thereof in accordance with embodiments of the present disclosure.
Figure 9A:
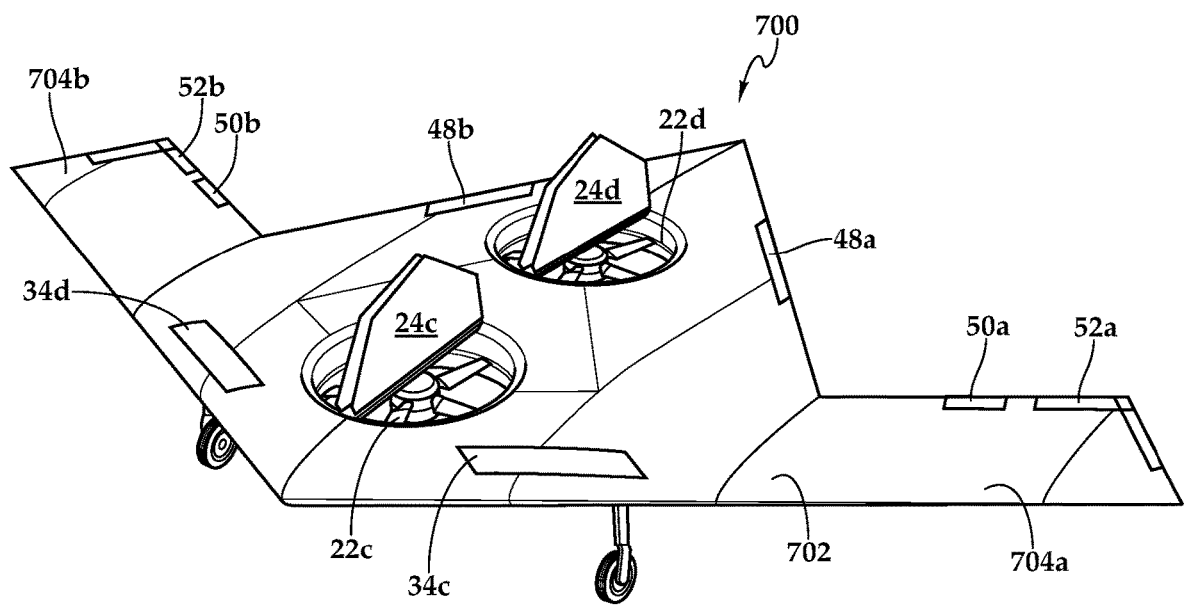
Figure 9D:
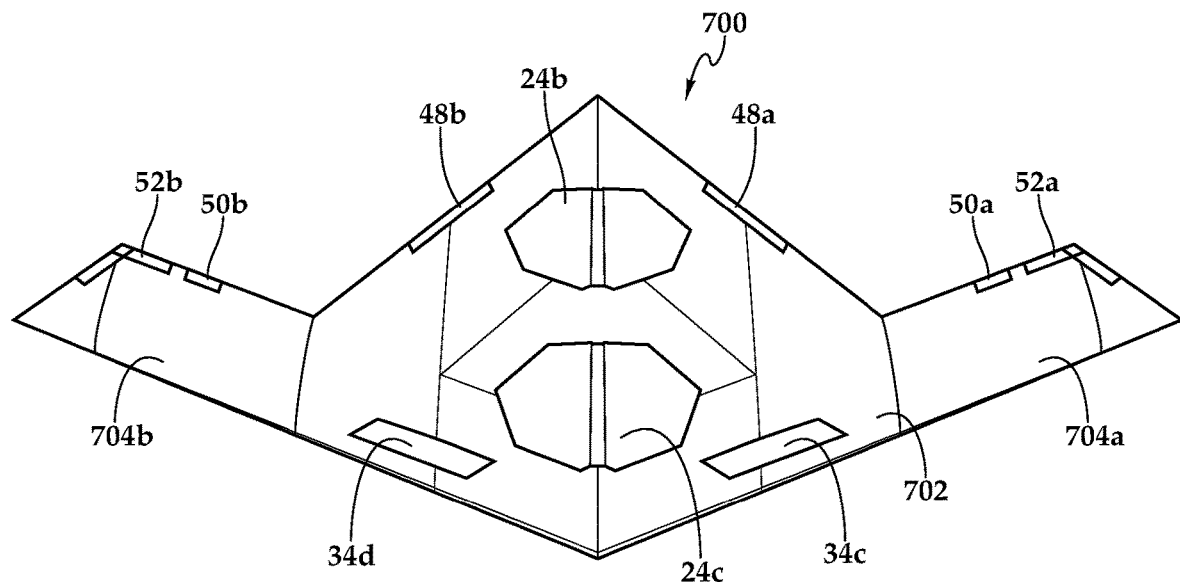
Figure 9C:
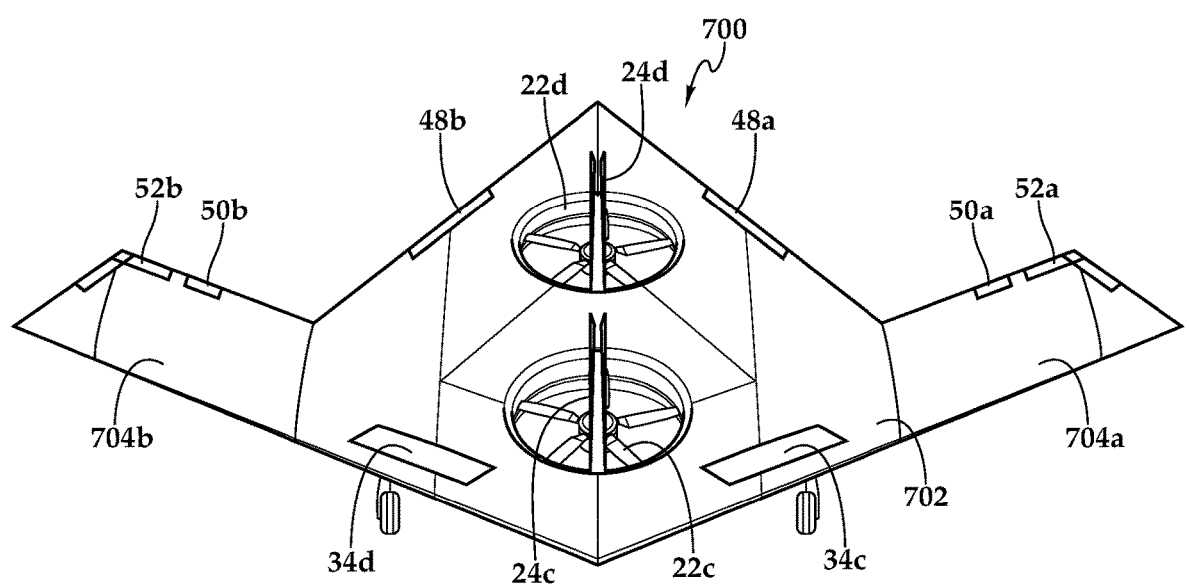
Figure 9F:
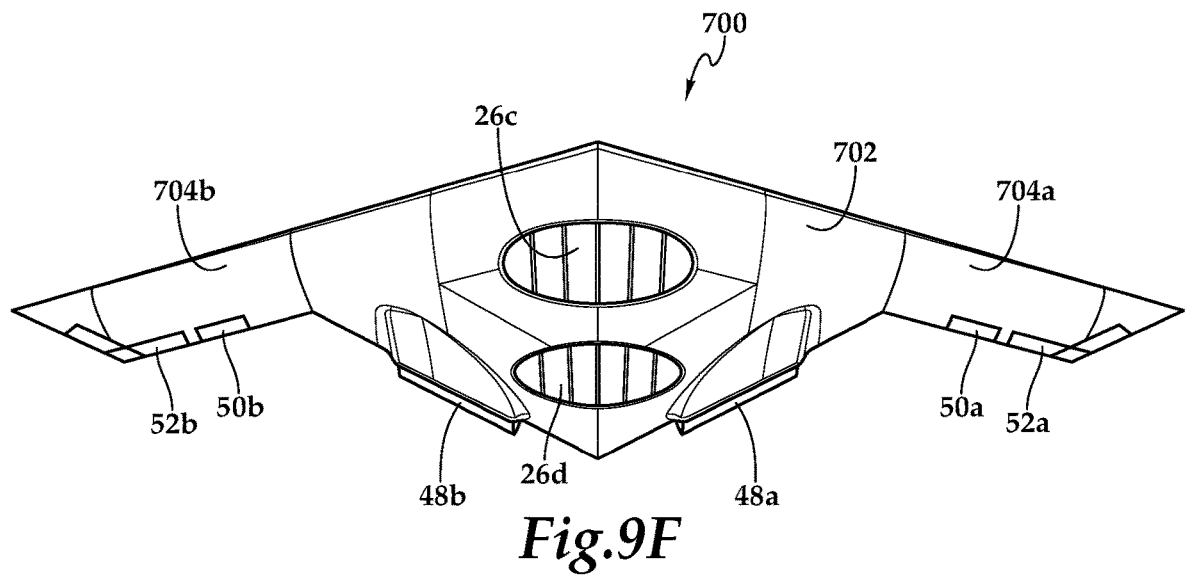
Figure 9E:
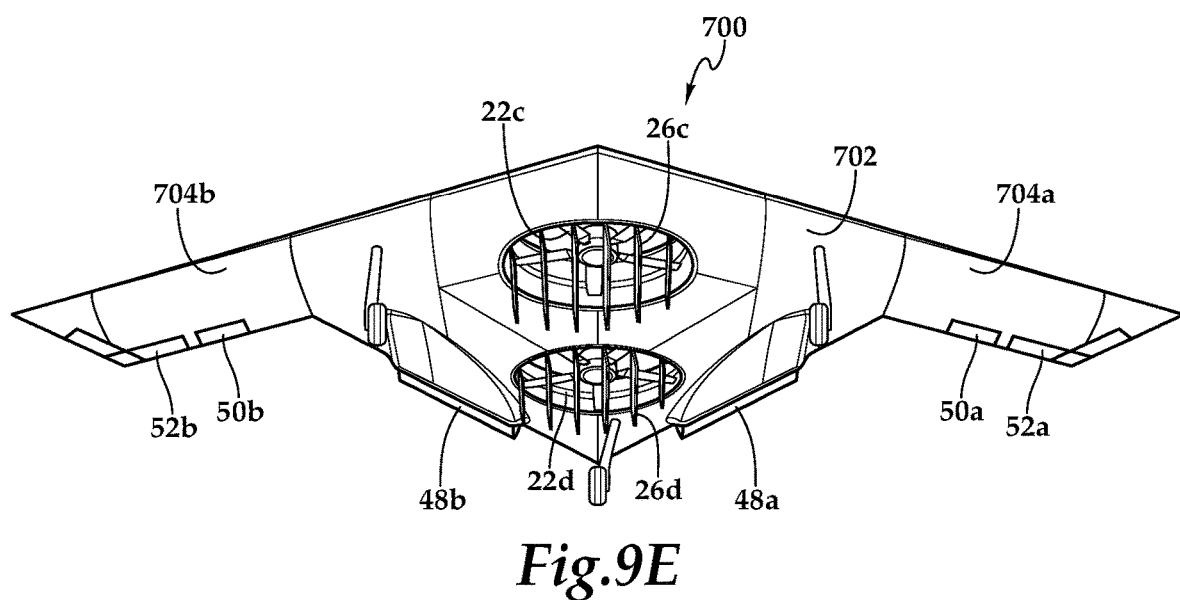
Figure 9G:
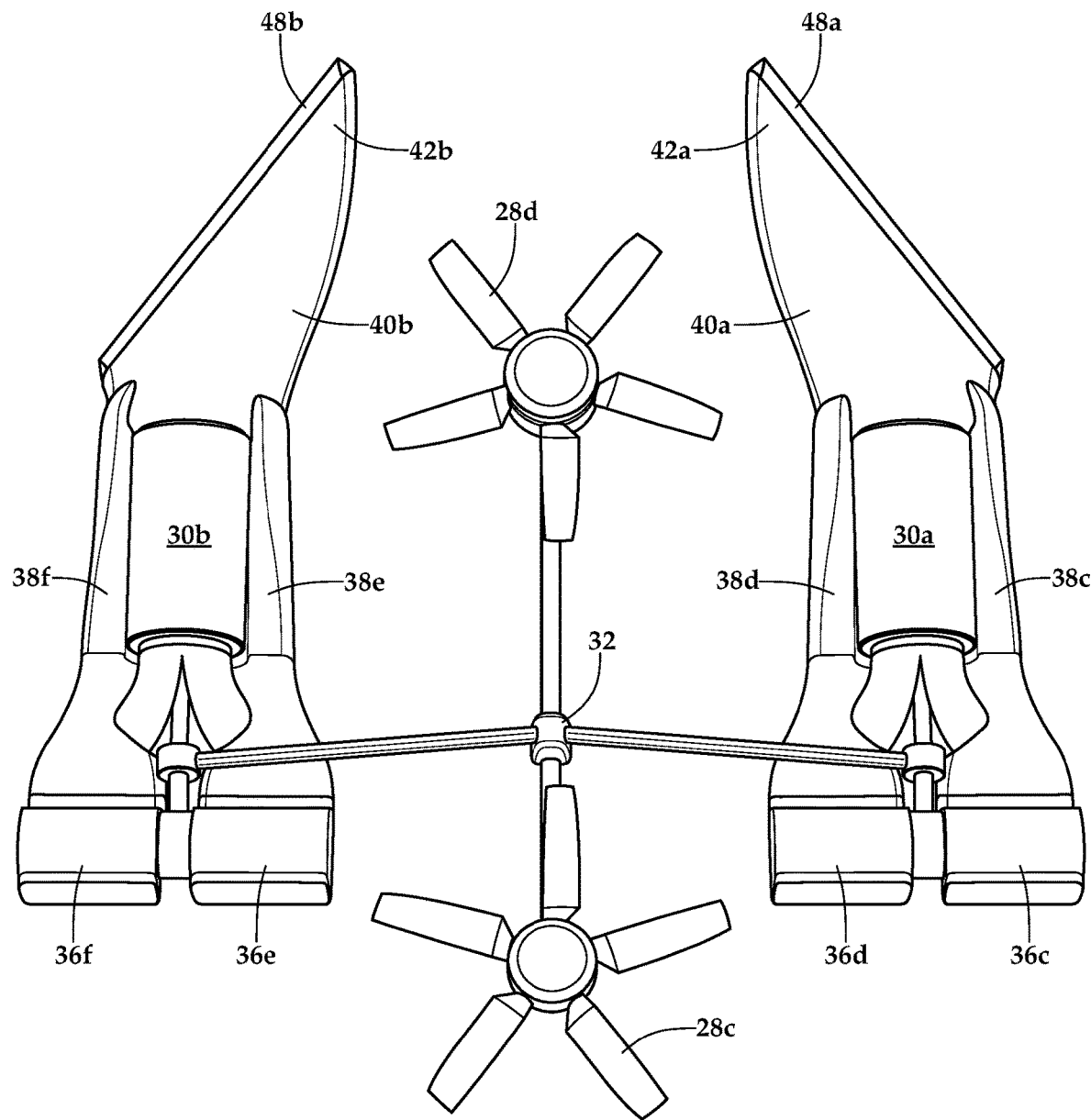
Figure 9I:
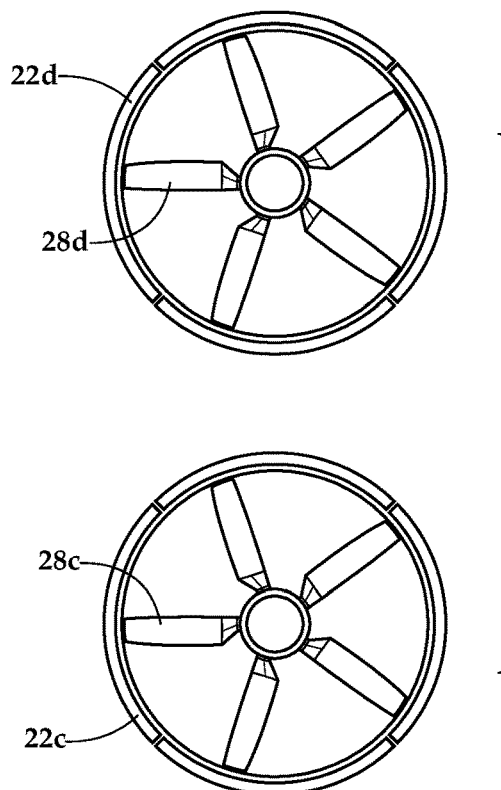
Figure 9H:
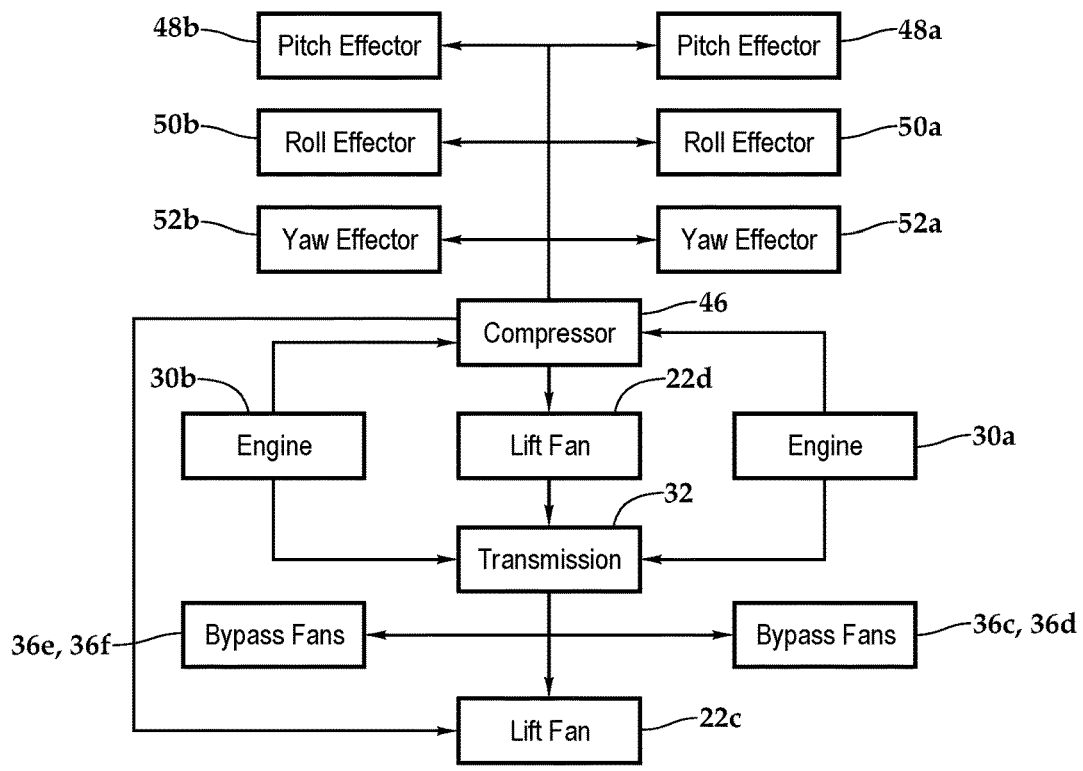

Referring next to FIGS. 9A-9I in the drawings, various views of a fan-in-wing blended wing body aircraft 700 operable to transition between thrust-borne lift in a VTOL orientation and wing-borne lift in a forward flight orientation are depicted. FIGS. 9A, 9C and 9E depict aircraft 700 in the VTOL orientation wherein a lift fan system provides thrust-borne lift to the aircraft. FIGS. 9B, 9D and 9F depict aircraft 700 in the forward flight orientation wherein a forced air bypass system provides bypass air that combines with engine exhaust to generate forward thrust with the forward airspeed of aircraft 700 providing wing-borne lift enabling aircraft 700 to have a high speed, high endurance, low observable forward flight mode. Aircraft 700 shares many common elements with aircraft 10 with the exceptions that the blended wing body airframe 702 of aircraft 700 has a kite shaped body with forward winglets 704*a*, 704*b*, aircraft 700 has a lift fan system with lift fans in a tandem longitudinal orientation and aircraft 700 has a binary engine system. Specifically, the lift fan system of aircraft 700 includes lift fans 22*c*, 22*d* in a tandem longitudinal orientation, butterfly doors 24*c*, 24*d*, louvers 26*c*, 26*d*, rotor assemblies 28*c*, 28*d*, turboshaft engines 30*a*, 30*b* and transmission 32. Aircraft 700 also has a forced air bypass system that includes inlets 34*c*, 34*d*, bypass fans 36*c*, 36*d*, 36*e*, 36*f* and bypass ducts 38*c*, 38*d*, 38*e*, 38*f* that are coupled to exhaust systems 40*a*, 40*b* configured with thruster nozzles 42*a*, 42*b*.

Similar to aircraft 10, aircraft 700 has an active flow control system that includes an active flow control module 54 executed by flight control system 44, engine 30 and compressor 46 as well as manifold systems, valve systems and controller systems (see also FIGS. 2A, 3A, 4A and 5A) that regulate the flow of high pressure air to the lift fan injector system, the pitch effector system including pitch effectors 48*a*, 48*b*, the roll effector system including roll effectors 50*a*, 50*b* and the yaw effector system including yaw effectors 52*a*, 52*b*. The active flow control system controls the selective high speed mass flow injections of pressurized air that influence lift coefficients, generate control moments and generate thrust vectors for aircraft 700 during VTOL, forward and transition flight modes, as discussed herein.

Certain flight control operations of aircraft 700 will now be described. Pitch control authority in VTOL mode is provided by lift fans 22*c*, 22*d*. Pitch control authority in forward flight mode is provided by pitch effectors 48*a*, 48*b*. Pitch authority in transition modes is provided by lift fans 22*c*, 22*d* and/or pitch effectors 48*a*, 48*b*. Roll control authority in VTOL mode is provided by yaw effectors 52*a*, 52*b* acting as roll effectors. Roll control authority in forward flight and transition modes is provided by roll effectors 50*a*, 50*b*. Yaw control authority in VTOL mode is provided by lift fans 22*c*, 22*d*. Yaw control authority in forward flight mode is provided by yaw effectors 52*a*, 52*b*. Yaw control authority in transition modes is provided by lift fans 22*c*, 22*d* and/or yaw effectors 52*a*, 52*b*. Translation authority in VTOL mode is provided by lift fans 22*c*, 22*d*.

Figure 10B:
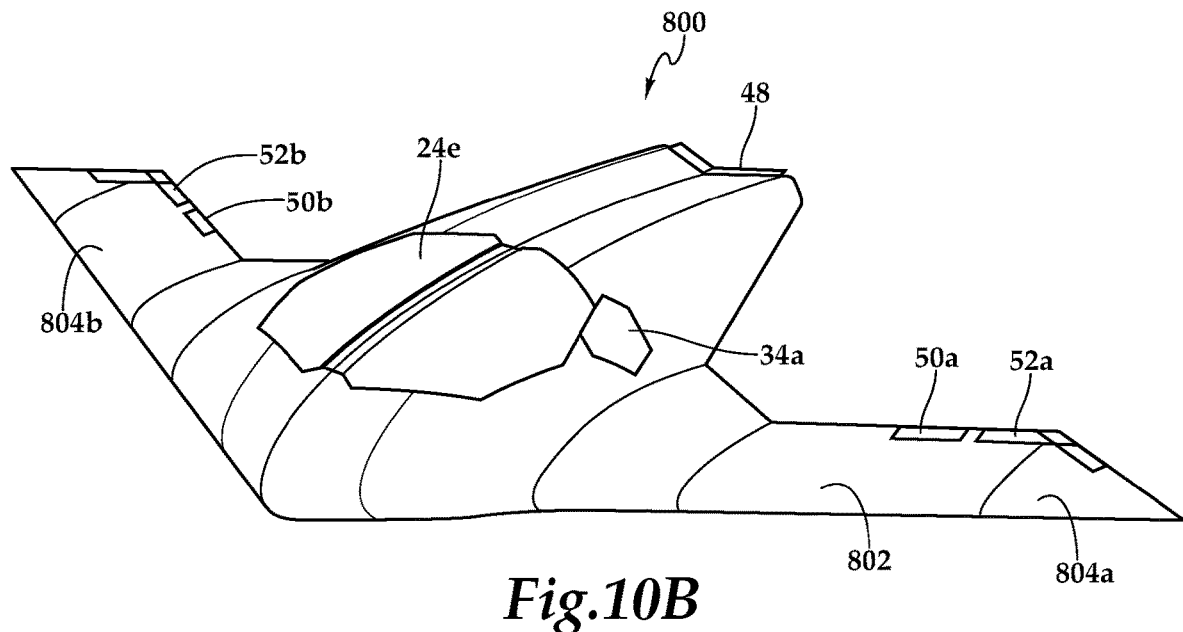
FIGS. 10A-10I are schematic illustrations of a fan-in-wing blended wing body aircraft and component parts thereof in accordance with embodiments of the present disclosure.
Figure 10A:
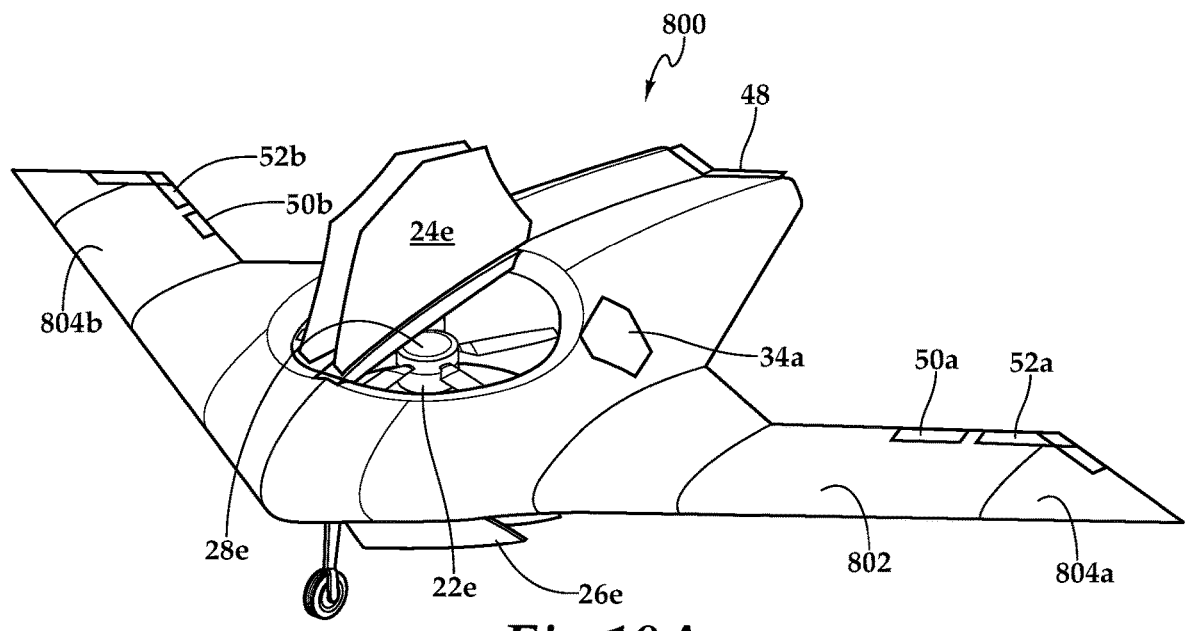
Figure 10D:
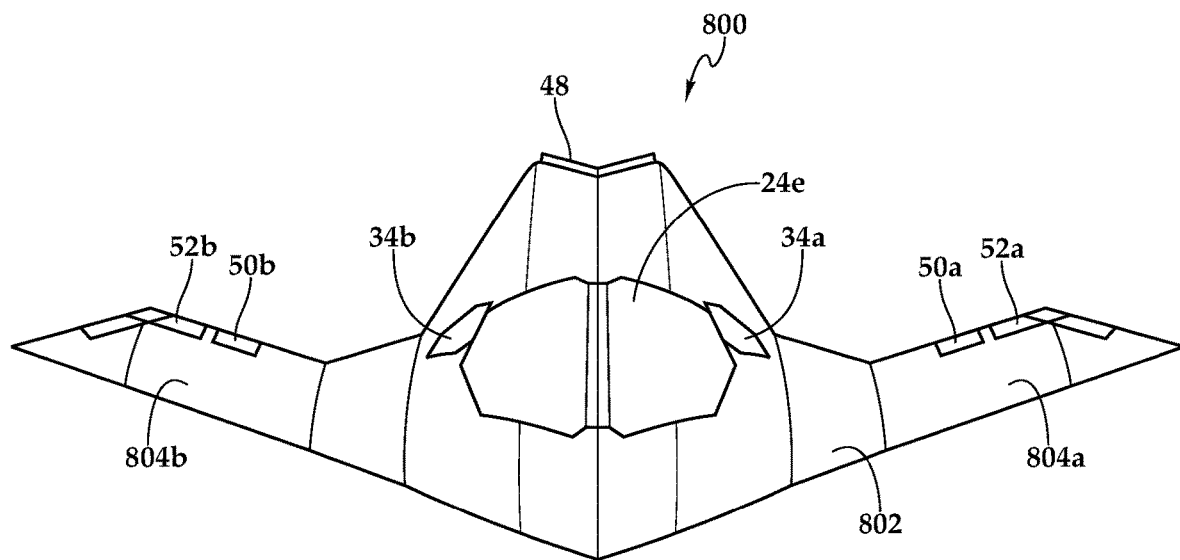
Figure 10C:
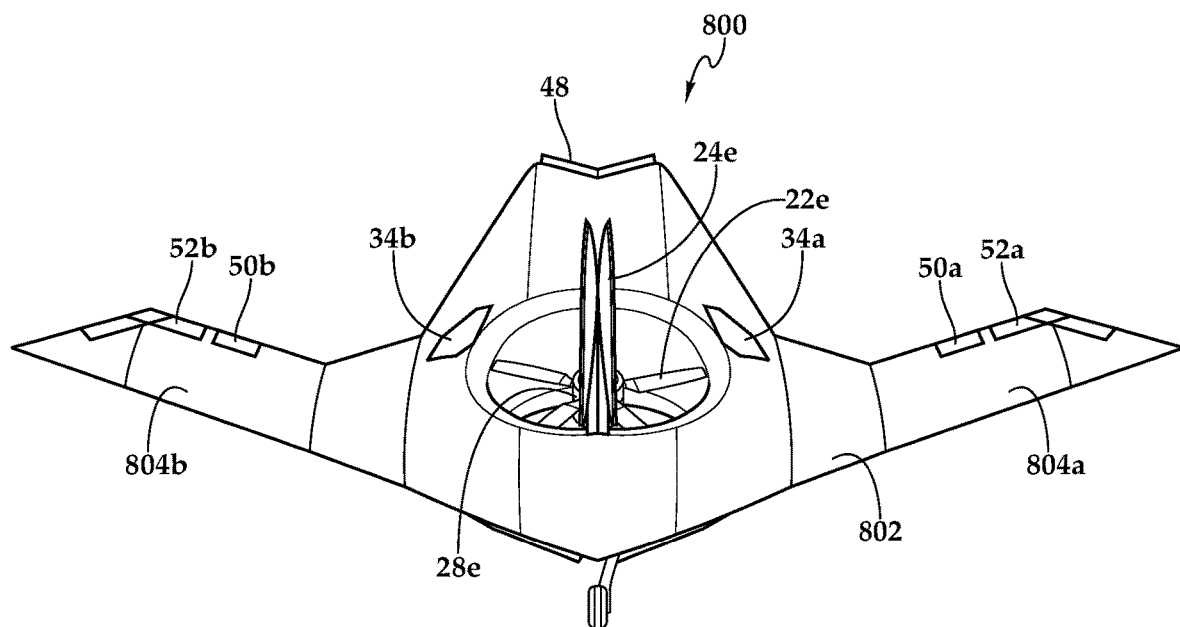
Figure 10F:
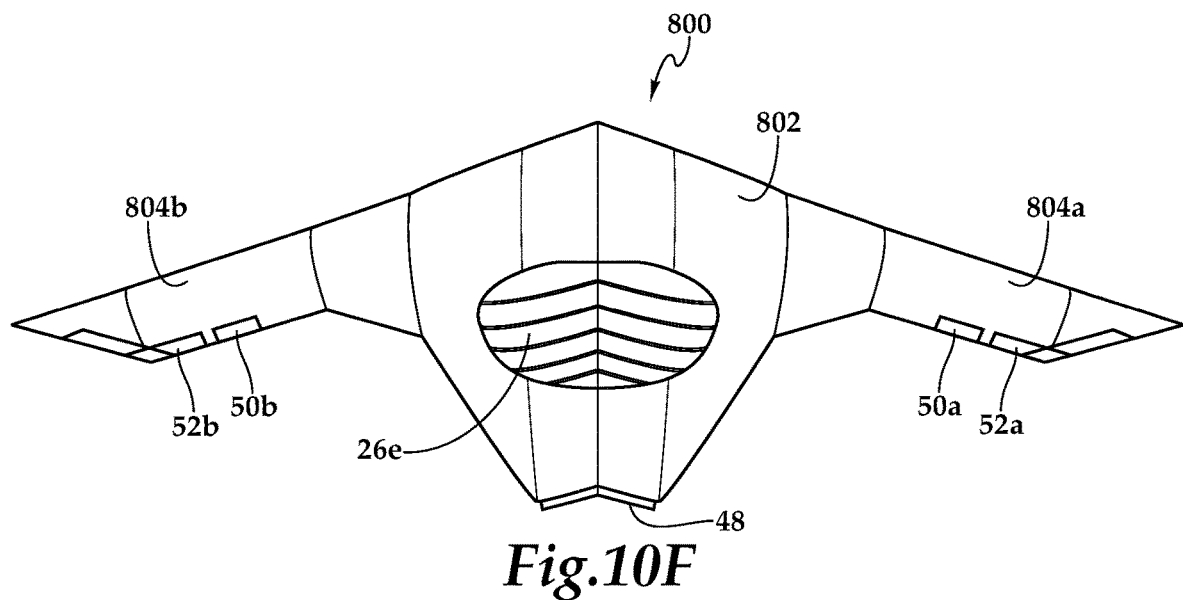
Figure 10E:
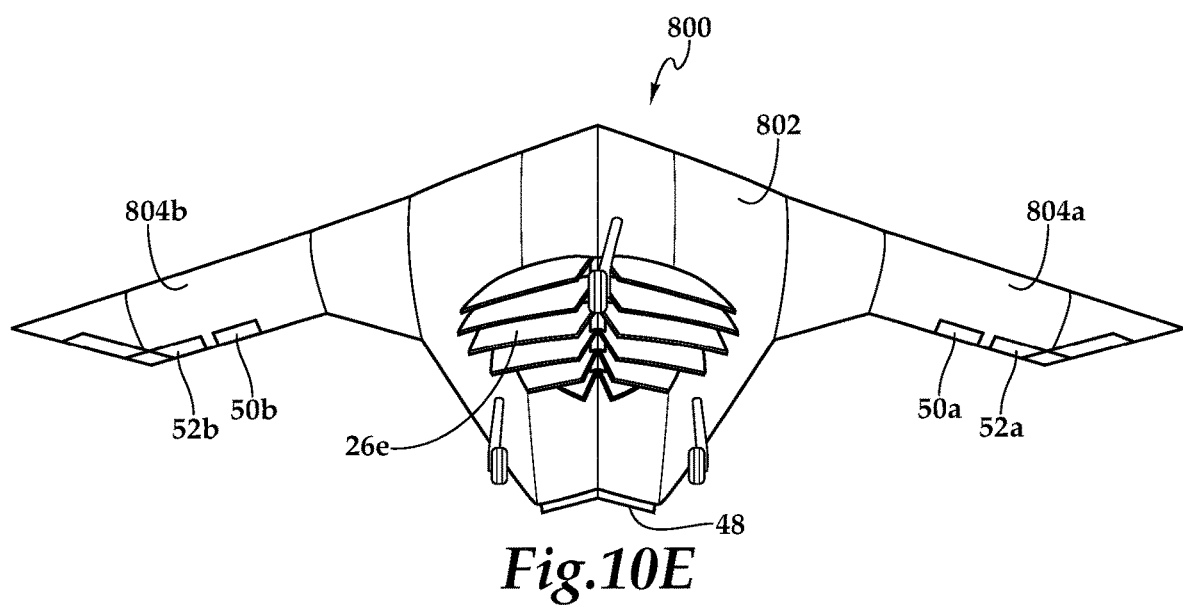
Figure 10G:
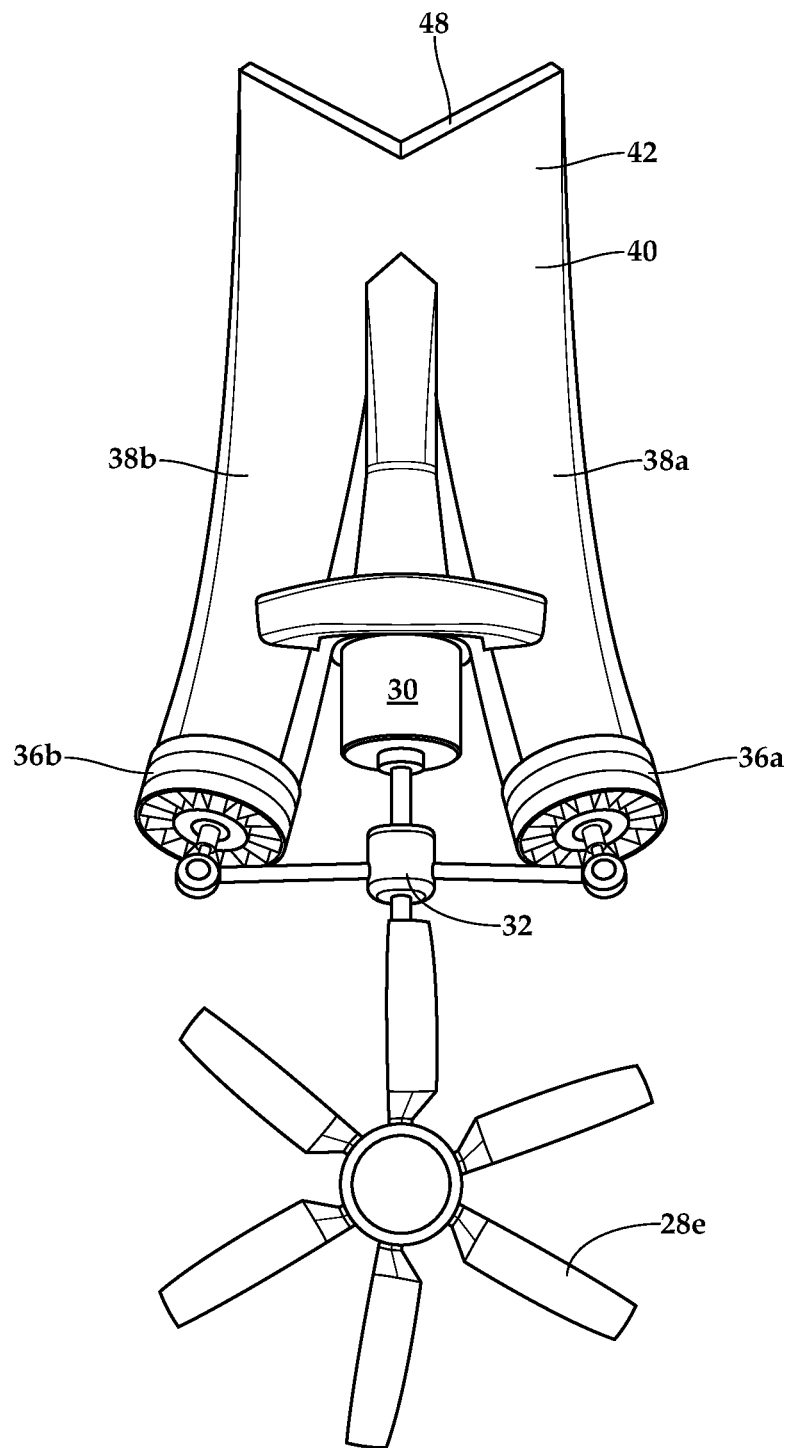
Figure 10I:
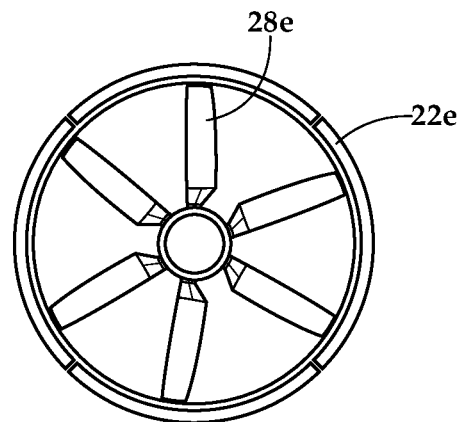
Figure 10H:
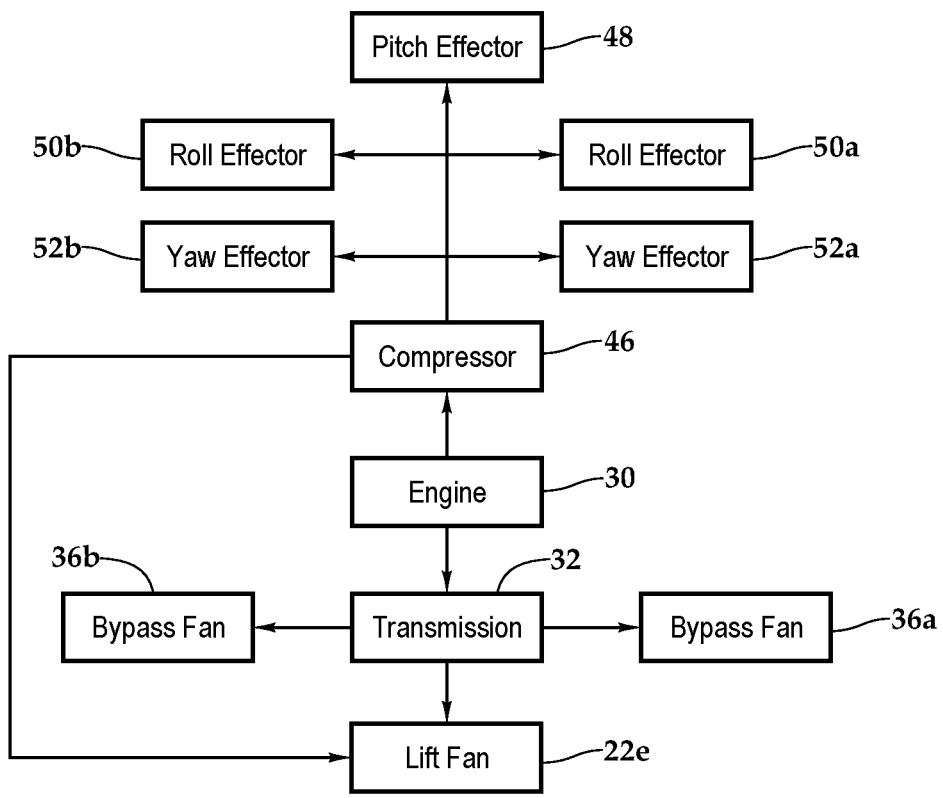

Referring next to FIGS. 10A-10I in the drawings, various views of a fan-in-wing blended wing body aircraft 800 operable to transition between thrust-borne lift in a VTOL orientation and wing-borne lift in a forward flight orientation are depicted. FIGS. 10A, 10C and 10E depict aircraft 800 in the VTOL orientation wherein a lift fan system provides thrust-borne lift to the aircraft. FIGS. 10B, 10D and 10F depict aircraft 800 in the forward flight orientation wherein a forced air bypass system provides bypass air that combines with engine exhaust to generate forward thrust with the forward airspeed of aircraft 800 providing wing-borne lift enabling aircraft 800 to have a high speed, high endurance, low observable forward flight mode. Aircraft 800 shares many common elements with aircraft 10 with the exceptions that the blended wing body airframe 802 of aircraft 800 has a kite shaped body with forward winglets 804*a*, 804*b*, and aircraft 800 has a lift fan system with a unitary lift fan. Specifically, the lift fan system of aircraft 800 includes a single lift fan 22*e*, butterfly doors 24*e*, louvers 26*e*, a rotor assembly 28*e*, turboshaft engine 30 and transmission 32. In the illustrated embodiment, rotor assembly 28*e* is depicted as having a coaxial rotor system with two counter-rotating rotor assemblies. Aircraft 800 also has a forced air bypass system that includes inlets 34*a*, 34*b*, bypass fans 36*a*, 36*b* and bypass ducts 38*a*, 38*b* that are coupled to exhaust system 40 configured with thruster nozzle 42.

Similar to aircraft 10, aircraft 800 has an active flow control system that includes an active flow control module 54 executed by flight control system 44, engine 30 and compressor 46 as well as manifold systems, valve systems and controller systems (see also FIGS. 2A, 3A, 4A and 5A) that regulate the flow of high pressure air to the lift fan injector system, the pitch effector system including pitch effector 48, the roll effector system including roll effectors 50*a*, 50*b* and the yaw effector system including yaw effectors 52*a*, 52*b*. The active flow control system controls the selective high speed mass flow injections of pressurized air that influence lift coefficients, generate control moments and generate thrust vectors for aircraft 800 during VTOL, forward and transition flight modes, as discussed herein.

Certain flight control operations of aircraft 800 will now be described. Pitch control authority in VTOL mode, forward flight mode and transition modes is provided by pitch effector 48. Roll control authority in VTOL mode is provided by yaw effectors 52*a*, 52*b* acting as roll effectors. Roll control authority in forward flight and transition modes is provided by roll effectors 50*a*, 50*b*. Yaw control authority in VTOL mode and transition modes is provided by differential operations for the coaxial rotor system of lift fan 22*e* and/or yaw effectors 52*a*, 52*b*. Yaw control authority in forward flight mode is provided by yaw effectors 52*a*, 52*b*. Translation authority in VTOL mode is provided by lift fans 22*e*.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft operable to transition between thrust-borne lift in a VTOL orientation and wing-borne lift in a forward flight orientation, the aircraft comprising:
   a blended wing body;
   an engine disposed within the body, the engine having a turboshaft mode and a turbofan mode, the engine configured to generate engine exhaust;
   a binary lift fan system disposed within the body, the lift fan system including ducted fans in a tandem lateral orientation;
   a forced air bypass system disposed within the body, the forced air bypass system configured to generate bypass air;
   a transmission disposed between the engine and the forced air bypass system, the transmission engaging the engine with the forced air bypass system when the engine is in the turbofan mode and disengaging the engine from the forced air bypass system when the engine is in the turboshaft mode; and an exhaust system coupled to the engine and the forced air bypass system;

wherein, in the VTOL orientation, the engine is in the turboshaft mode coupled to the lift fan system such that the engine provides rotational energy to the ducted fans generating the thrust-borne lift; and wherein, in the forward flight orientation, the engine is in the turbofan mode coupled to the forced air bypass system such that the bypass air combines with the engine exhaust in the exhaust system to provide forward thrust generating the wing-borne lift.

2. The aircraft as recited in claim 1 wherein the blended wing body further comprises a fuselage and a wing.

3. The aircraft as recited in claim 1 wherein the blended wing body further comprises a rhombus shaped body.

4. The aircraft as recited in claim 1 wherein the blended wing body further comprises a rhombus shaped body with winglets.

5. The aircraft as recited in claim 1 wherein each of the ducted fans further comprises a rotor assembly having a plurality of variable pitch rotor blades.

6. The aircraft as recited in claim 1 wherein the tandem lateral orientation of the ducted fans is configured to generate roll control moments in the VTOL orientation.

7. The aircraft as recited in claim 1 wherein the forced air bypass system further comprises an inlet, a bypass fan disposed within the body downstream of the inlet and a bypass duct disposed within the body downstream of the bypass fan, the bypass duct coupled to the exhaust system.

8. The aircraft as recited in claim 1 wherein the forced air bypass system further comprises:

first and second inlets;

first and second bypass fans disposed within the body downstream of the first and second inlets, respectively; and first and second bypass ducts disposed within the body downstream of the first and second bypass fans, respectively, the first and second bypass ducts coupled to the exhaust system.

9. The aircraft as recited in claim 1 wherein the exhaust system further comprises a mixing nozzle.

10. The aircraft as recited in claim 1 wherein the exhaust system further comprises a film cooled nozzle.

11. The aircraft as recited in claim 1 wherein the transmission engages the engine with the lift fan system when the engine is in the turboshaft mode and disengages the engine from the lift fan system when the engine is in the turbofan mode.

12. The aircraft as recited in claim 1 wherein, in the forward flight orientation, the forced air bypass system is configured to generate a bypass ratio of between 8 to 1 and 12 to 1.

13. The aircraft as recited in claim 1 further comprising an active flow control system configured to generate control moments in the VTOL orientation and the forward flight orientation.

14. The aircraft as recited in claim 13 wherein at least a portion of the active flow control system is integral with the binary lift fan system.

15. The aircraft as recited in claim 13 wherein at least a portion of the active flow control system is integral with the exhaust system.

16. The aircraft as recited in claim 13 wherein the active flow control system further comprises a pitch effector configured to generate pitch control moments in the VTOL orientation and the forward flight orientation.

17. The aircraft as recited in claim 13 wherein the active flow control system further comprises roll effectors configured to generate roll control moments in the forward flight orientation.

18. The aircraft as recited in claim 13 wherein the active flow control system further comprises yaw effectors configured to generate yaw control moments in the VTOL orientation and the forward flight orientation.

19. An aircraft operable to transition between thrust-borne lift in a VTOL orientation and wing-borne lift in a forward flight orientation, the aircraft comprising:

a blended wing body;

an engine disposed within the body, the engine having a turboshaft mode and a turbofan mode, the engine configured to generate engine exhaust;

a binary lift fan system disposed within the body, the lift fan system including ducted fans in a tandem lateral orientation configured to generate roll control moments in the VTOL orientation;

a forced air bypass system disposed within the body, the forced air bypass system configured to generate bypass air;

a transmission disposed between the engine and the forced air bypass system, the transmission engaging the engine with the forced air bypass system when the engine is in the turbofan mode and disengaging the engine from the forced air bypass system when the engine is in the turboshaft mode;

an exhaust system coupled to the engine and the forced air bypass system; and an active flow control system configured to generate pitch and yaw control moments in the VTOL orientation and pitch, roll and yaw control moments in the forward flight orientation;

wherein, in the VTOL orientation, the engine is in the turboshaft mode coupled to the lift fan system such that the engine provides rotational energy to the ducted fans generating the thrust-borne lift; and wherein, in the forward flight orientation, the engine is in the turbofan mode coupled to the forced air bypass system such that the bypass air combines with the engine exhaust in the exhaust system to provide forward thrust generating the wing-borne lift.

\* \* \* \* \*